US011767252B2

(12) United States Patent
Murayama et al.

(10) Patent No.: US 11,767,252 B2
(45) Date of Patent: *Sep. 26, 2023

(54) CHEMICALLY STRENGTHENED GLASS, AND GLASS FOR CHEMICAL STRENGTHENING

(71) Applicant: AGC Inc., Tokyo (JP)

(72) Inventors: Suguru Murayama, Tokyo (JP); Seiki Ohara, Tokyo (JP); Qing Li, Tokyo (JP); Shusaku Akiba, Tokyo (JP)

(73) Assignee: AGC Inc., Tokyo (JP)

( * ) Notice: Subject to any disclaimer, the term of this patent is extended or adjusted under 35 U.S.C. 154(b) by 116 days.

This patent is subject to a terminal disclaimer.

(21) Appl. No.: 17/024,109

(22) Filed: Sep. 17, 2020

(65) Prior Publication Data

US 2021/0053867 A1    Feb. 25, 2021

Related U.S. Application Data

(60) Continuation of application No. 16/291,407, filed on Mar. 4, 2019, now abandoned, which is a division of application No. 15/908,227, filed on Feb. 28, 2018, now Pat. No. 10,384,974, which is a continuation of application No. PCT/JP2017/001755, filed on Jan. 19, 2017.

(30) Foreign Application Priority Data

| Jan. 21, 2016 | (JP) | ................................. 2016-010002 |
| Oct. 18, 2016 | (JP) | ................................. 2016-204745 |

(51) Int. Cl.
| C03C 3/085 | (2006.01) |
| C03C 21/00 | (2006.01) |
| C03C 3/083 | (2006.01) |
| C03C 3/087 | (2006.01) |
| C03C 3/091 | (2006.01) |
| C03C 3/093 | (2006.01) |
| C03C 3/097 | (2006.01) |
| C03C 4/18 | (2006.01) |

(52) U.S. Cl.
CPC .............. *C03C 3/085* (2013.01); *C03C 3/083* (2013.01); *C03C 3/087* (2013.01); *C03C 3/091* (2013.01); *C03C 3/093* (2013.01); *C03C 3/097* (2013.01); *C03C 4/18* (2013.01); *C03C 21/00* (2013.01); *C03C 21/002* (2013.01)

(58) Field of Classification Search
CPC ......... C03C 3/083; C03C 3/085; C03C 3/087; C03C 3/091; C03C 3/093; C03C 3/097; C03C 21/00; C03C 21/002
See application file for complete search history.

(56) References Cited

U.S. PATENT DOCUMENTS

| 4,156,755 | A | 5/1979 | Rinehart |
| 5,674,790 | A | 10/1997 | Araujo |
| 5,972,460 | A | 10/1999 | Tachiwana |
| 6,333,285 | B1 | 12/2001 | Chopinet et al. |
| 6,440,531 | B1 | 8/2002 | Kurachi et al. |
| 6,518,211 | B1 | 2/2003 | Bradshaw et al. |
| 8,075,999 | B2 | 12/2011 | Barefoot et al. |
| 10,370,287 | B2 * | 8/2019 | Murayama .............. C03C 3/085 |
| 10,384,974 | B2 * | 8/2019 | Murayama .............. C03C 21/00 |
| 10,472,272 | B2 * | 11/2019 | Murayama .............. C03C 21/00 |
| 2001/0049327 | A1 | 12/2001 | Hachitani |
| 2003/0064196 | A1 | 4/2003 | Kurachi et al. |
| 2003/0109370 | A1 | 6/2003 | Ikenishi et al. |
| 2004/0180239 | A1 | 9/2004 | Ikenishi et al. |
| 2005/0090377 | A1 | 4/2005 | Shelestak et al. |
| 2006/0063009 | A1 | 3/2006 | Naitou et al. |
| 2006/0205584 | A1 | 9/2006 | Ikenishi et al. |
| 2007/0060465 | A1 | 3/2007 | Varshneya et al. |
| 2009/0220824 | A1 | 9/2009 | Ikenishi et al. |
| 2009/0263662 | A1 | 10/2009 | Shelestak et al. |
| 2010/0160141 | A1 | 6/2010 | Ikenishi et al. |
| 2010/0167091 | A1 | 7/2010 | Tachiwana et al. |

(Continued)

FOREIGN PATENT DOCUMENTS

| CN | 101522584 A | 9/2009 |
| CN | 102718401 | 10/2012 |

(Continued)

OTHER PUBLICATIONS

Qiu Guan-ming et al, "Rare-Earth Optical Glass", The Publishing House of Ordnance Industry, vol. 1, p. 255, Oct. 31, 1989 (with English Abstract).

International Search Report dated Apr. 25, 2017 in PCT/JP2017/001755 filed Jan. 19, 2017.

A.J. Burggraaf, "The strengthening of glass by ion exchange. Part 2. Stress formation and . . . in connection with structural changes in the glass", Physics and Chemistry if Glasses, England, Society of Glass Technology, Oct. 1966, vol. 7, No. 5, p. 169-172.

M.D. Ingram et al. "Origins of anomalous mixed-alkali effects in ion-exchanged glasses" , Glass Science and Technology, Germany, Verlag der Deutschen Glastechnischen Gesellschaft;, Apr. 2000, vol. 73, No. 4, p. 89-104.

(Continued)

*Primary Examiner* — Elizabeth A. Bolden
(74) *Attorney, Agent, or Firm* — Oblon, McClelland, Maier & Neustadt, L.L.P.

(57) ABSTRACT

A glass for chemical strengthening contains, in mole percentage on an oxide basis, 58 to 80% of $SiO_2$, 13 to 18% of $Al_2O_3$, 0 to 5% of $B_2O_3$, 0.5 to 4% of $P_2O_5$, 4 to 10% of $Li_2O$, 5 to 14% of $Na_2O$, 0 to 2% of $K_2O$, 0 to 11% of MgO, 0 to 5% of CaO, 0 to 20% of SrO, 0 to 15% of BaO, 0 to 10% of ZnO, 0 to 1% of $TiO_2$, and 0 to 2% of $ZrO_2$. A value of X is 30000 or more. The value of X is calculated based on the formula, $X = SiO_2 \times 329 + Al_2O_3 \times 786 + B_2O_3 \times 627 + P_2O_5 \times (-941) + Li_2O \times 927 + Na_2O \times 47.5 + K_2O \times (-371) + MgO \times 1230 + CaO \times 1154 + SrO \times 733 + ZrO_2 \times 51.8$, by using the contents in mole percentage on an oxide basis of components.

11 Claims, 16 Drawing Sheets

(56) References Cited

U.S. PATENT DOCUMENTS

| | | |
|---|---|---|
| 2010/0233407 A1 | 9/2010 | Shelestak et al. |
| 2011/0045961 A1 | 2/2011 | Dejneka et al. |
| 2011/0079048 A1 | 4/2011 | Shelestak et al. |
| 2011/0294648 A1 | 12/2011 | Chapman et al. |
| 2011/0294649 A1 | 12/2011 | Gomez et al. |
| 2011/0312483 A1 | 12/2011 | Nakashima et al. |
| 2012/0021892 A1 | 1/2012 | Tachiwana et al. |
| 2012/0052271 A1 | 3/2012 | Gomez et al. |
| 2012/0135226 A1 | 5/2012 | Bookbinder et al. |
| 2012/0264585 A1 | 10/2012 | Ohara et al. |
| 2012/0321898 A1 | 12/2012 | Meinhardt et al. |
| 2012/0328907 A1 | 12/2012 | Tachiwana et al. |
| 2013/0004758 A1 | 1/2013 | Dejneka et al. |
| 2013/0040169 A1 | 2/2013 | Ikenishi et al. |
| 2013/0045375 A1 | 2/2013 | Gross |
| 2013/0122284 A1 | 5/2013 | Gross |
| 2013/0122313 A1 | 5/2013 | Gross |
| 2013/0183512 A1 | 7/2013 | Gy et al. |
| 2013/0186140 A1 | 7/2013 | Brix et al. |
| 2013/0189486 A1 | 7/2013 | Wang et al. |
| 2014/0023865 A1 | 1/2014 | Comte et al. |
| 2014/0302346 A1 | 10/2014 | Tachiwana et al. |
| 2014/0308526 A1 | 10/2014 | Chapman et al. |
| 2014/0356576 A1 | 12/2014 | Dejneka et al. |
| 2014/0364298 A1 | 12/2014 | Ohara et al. |
| 2015/0024210 A1 | 1/2015 | Dejneka et al. |
| 2015/0030840 A1 | 1/2015 | Gomez et al. |
| 2015/0074974 A1 | 3/2015 | Pesansky et al. |
| 2015/0259244 A1 | 9/2015 | Amin et al. |
| 2015/0344351 A1 | 12/2015 | Comte et al. |
| 2015/0368150 A1 | 12/2015 | Gross |
| 2016/0102011 A1 | 4/2016 | Hu et al. |
| 2016/0102014 A1 | 4/2016 | Hu et al. |
| 2016/0229736 A1 | 8/2016 | Gross |
| 2016/0257603 A1 | 9/2016 | Bookbinder et al. |
| 2016/0347655 A1 | 12/2016 | Meinhardt et al. |
| 2017/0022092 A1 | 1/2017 | Demartino et al. |
| 2018/0002223 A1 | 1/2018 | Hu et al. |
| 2018/0022636 A1 | 1/2018 | Pesansky et al. |
| 2018/0022637 A1 | 1/2018 | Gross |
| 2018/0022638 A1 | 1/2018 | Comte et al. |
| 2018/0029932 A1 | 2/2018 | Hu et al. |
| 2018/0057401 A1 | 3/2018 | Hu et al. |
| 2018/0186685 A1 | 7/2018 | Murayama et al. |
| 2018/0265397 A1 | 9/2018 | Murayama et al. |
| 2018/0290916 A1 | 10/2018 | Bookbinder et al. |
| 2018/0327304 A1 | 11/2018 | Murayama et al. |
| 2019/0016632 A1 | 1/2019 | Hu et al. |
| 2019/0210916 A1 | 7/2019 | Hu et al. |
| 2020/0385305 A1 | 12/2020 | Hu et al. |
| 2021/0002167 A1 | 1/2021 | Hu et al. |
| 2021/0130233 A1 | 5/2021 | Hu et al. |

FOREIGN PATENT DOCUMENTS

| | | |
|---|---|---|
| CN | 105753314 A | 7/2016 |
| JP | S48-006608 A | 1/1973 |
| JP | S50-000732 A | 1/1975 |
| JP | 60-180936 A | 9/1985 |
| JP | 11-232627 A | 8/1999 |
| JP | 11232627 A | 8/1999 |
| JP | 2000-516903 A | 12/2000 |
| JP | 2001-302278 A | 10/2001 |
| JP | 2002-507538 A | 3/2002 |
| JP | 2002-174810 A | 6/2002 |
| JP | 2002-358626 A | 12/2002 |
| JP | 2002358626 A | 12/2002 |
| JP | 2004-131314 A | 4/2004 |
| JP | 2005-302289 A | 10/2005 |
| JP | 2005302289 A | 10/2005 |
| JP | 2006-83045 A | 3/2006 |
| JP | 3959588 B2 | 8/2007 |
| JP | 2007-527354 A | 9/2007 |
| JP | 2008-1590 A | 1/2008 |
| JP | 2010-116276 A | 5/2010 |
| JP | 2010-168233 A | 8/2010 |
| JP | 2010-202514 A | 9/2010 |
| JP | 2011-111364 A | 6/2011 |
| JP | 2011-138895 A | 7/2011 |
| JP | 2012-020921 A | 2/2012 |
| JP | 2012232882 A | 11/2012 |
| JP | 2013-028512 A | 2/2013 |
| JP | 2013028512 A | 2/2013 |
| JP | 2013-520385 A | 6/2013 |
| JP | 2013-520387 A | 6/2013 |
| JP | 2013-520388 A | 6/2013 |
| JP | 2013-527115 A | 6/2013 |
| JP | 2013-533838 | 8/2013 |
| JP | 2013-533838 A | 8/2013 |
| JP | 2013-536155 A | 9/2013 |
| JP | 2013-542159 A | 11/2013 |
| JP | 2013-544227 A | 12/2013 |
| JP | 2015-500194 A | 1/2015 |
| JP | 2015-024954 A | 2/2015 |
| JP | 2015-527970 A | 9/2015 |
| JP | 2018-519228 A | 7/2018 |
| KR | 10-2011-0138149 A | 12/2011 |
| KR | 20110138149 A | 12/2011 |
| TW | 201004885 A1 | 2/2010 |
| TW | 201527249 A | 7/2015 |
| TW | 201602040 A | 1/2016 |
| WO | WO 2005/043512 A1 | 5/2005 |
| WO | WO 2007/142324 A1 | 12/2007 |
| WO | WO 2012/126394 A1 | 9/2012 |
| WO | WO 2015/127483 A2 | 8/2015 |
| WO | WO 2017/126607 A1 | 7/2017 |

OTHER PUBLICATIONS

I.W.Donald, "Methods for improving the mechanical properties of oxide glasses", Journal of Materials Science, NL, Kluwer Academic Publishers, Dec. 1, 1989, vol. 24, No. 12, p. 4177-4208.

Akio Makishima et al., "Glass Materials Design System: VitrES", Fujitsu,Nov. 10, 1993 (Nov. 10, 1993), vol. 44, No. 6, pp. 560 to 565, ISSN:0016-2515. H. M. Garfinkel et al. "Ion Concentration and Stress in a Chemically Tempered Glass", Journal of the American Ceramic Society, US, The American Ceramic Society, Dec. 1970, vol. 53, No. 12, pp. 686-691.

International Search Report dated Mar. 21, 2017, in PCT/JP2017/001742 (w/ English translation).

Written Opinion dated Mar. 21, 2017, in PCT/JP2017/001742 (w/ English translation).

Changyu et al., "Handbook of Glass Property and Technology", Beijing Chemical Industry Press, Jan. 30, 2014, pp. 84-87 (7 total pages) (with English Abstract).

* cited by examiner

CHEMICALLY STRENGTHENED GLASS, AND GLASS FOR CHEMICAL STRENGTHENING

CROSS-REFERENCE TO RELATED APPLICATIONS

The present application is continuation of U.S. application Ser. No. 16/291,407, filed Mar. 4, 2019, which is a divisional of U.S. application Ser. No. 15/908,227 filed Feb. 28, 2018, which is a continuation Application of International Application No. PCT/JP2017/001755, filed Jan. 19, 2017, which claims priority to Japanese Patent Application No. 2016-010002, filed Jan. 21, 2016, and to Japanese Patent Application No. 2016-204745, filed Oct. 18, 2016. The contents of these applications are incorporated herein by reference in their entirety.

TECHNICAL FIELD

The present invention relates to a chemically strengthened glass.

BACKGROUND ART

In recent years, a cover glass constituted by a chemically strengthened glass is used to increase protection and beauty of a display device of mobile devices such as a mobile phone, a smart phone, a personal digital assistant (PDA), and a tablet terminal.

A chemically strengthened glass has a tendency that strength increases as surface compressive stress (value) (CS) and a depth of a compressive stress layer (DOL) increase. On the other hand, to maintain a balance with surface compressive stress, internal tensile stress (CT) is generated inside a glass, and as a result, CT increases as CS and DOL are large. When a glass having large CT cracks, the cracking manner is vigorous with a lot of fragments, and as a result, the risk that the fragments scatter increases.

In view of the above, for example, Patent Document 1 discloses the formula (10) indicating acceptable limit of internal tensile stress of a chemically strengthened glass, and discloses that a chemically strengthened glass in which the number of fragments scattered is small is obtained by adjusting the following CT' even though strength of the chemically strengthened glass is increased. Internal tensile stress CT' described in Patent Document 1 is derived by the following formula (11) using measurement values of CS and DOL'.

$$CT' \leq -38.7 \times \ln(t) + 48.2 \quad (10)$$

$$CS \times DOL' = (t - 2 \times DOL') \times CT' \quad (11)$$

Here, DOL' corresponds to a depth of an ion exchange layer.

PRIOR ART DOCUMENTS

Patent Document

Patent Document 1: U.S. Pat. No. 8,075,999

SUMMARY OF THE INVENTION

Problems that the Invention is to Solve

According to the studies by the present inventors, there was a case that strength of a chemically strengthened glass is insufficient in the method of Patent Document 1. It is considered that this is because the influence of a glass composition is not sufficiently considered, a stress profile is approximated in linear in the above formula for obtaining CT', it assumes that the point at which stress is zero is equal to a depth of an ion diffusion layer, and the like. The present invention provides a chemically strengthened glass that improves those problems and further enhances strength.

Means for Solving the Problems

A first aspect of the present invention is a chemically strengthened glass, having a surface compressive stress (CS) of 300 MPa or more, in which a compressive stress value ($CS_{90}$) in a portion at a depth of 90 μm from a glass surface is 25 MPa or more or a compressive stress value ($CS_{100}$) in a portion at a depth of 100 μm from the glass surface is MPa or more, in which a value of X is 30000 or more, the value of X being calculated based on the following formula by using contents in mole percentage on an oxide basis of components of $SiO_2$, $Al_2O_3$, $B_2O_3$, $P_2O_5$, $Li_2O$, $Na_2$, $K_2O$, MgO, CaO, SrO, BaO, and $ZrO_2$ in a matrix composition of the chemically strengthened glass.

$$X=SiO_2\times329+Al_2O_3\times786+B_2O_3\times627+P_2O_5\times(-941)+Li_2O\times927+Na_2O\times47.5+K_2O\times(-371)+MgO\times1230+CaO\times1154+SrO\times733+ZrO_2\times51.8$$

The first aspect of the present invention may be a chemically strengthened glass, having a surface compressive stress (CS) of 300 MPa or more, in which a compressive stress value ($CS_{90}$) in a portion at a depth of 90 μm from a glass surface is 25 MPa or more or a compressive stress value ($CS_{100}$) in a portion at a depth of 100 μm from the glass surface is 15 MPa or more, in which a value of Z is 20000 or more, the value of Z being calculated based on the following formula by using contents in mole percentage on an oxide basis of components of $SiO_2$, $Al_2O_3$, $B_2O_3$, $P_2O_5$, $Li_2O$, $Na_2$, $K_2O$, MgO, CaO, SrO, BaO, and $ZrO_2$ in a matrix composition of the chemically strengthened glass.

$$Z=SiO_2\times237+Al_2O_3\times524+B_2O_3\times228+P_2O_5\times(-756)+Li_2O\times538+Na_2O\times44.2+K_2O\times(-387)+MgO\times660+CaO\times569+SrO\times291+ZrO_2\times510$$

The chemically strengthened glass of the first aspect preferably has a sheet shape with a sheet thickness t of 2 mm or less.

A second aspect of the present invention is a chemically strengthened glass, having a surface compressive stress (CS) of 300 MPa or more and satisfying the following formulae (1) and (2).

$$StL(t) \geq a \times t + 7000 (\text{unit:MPa·μm}) \quad (1)$$

$$a \geq 30000 (\text{unit: MPa·μm/mm}) \quad (2)$$

(Here, t is a sheet thickness (mm) and StL(t) is a value of St Limit at the sheet thickness t.)

The chemically strengthened glass of the second aspect preferably satisfies $a \geq 35000$.

Furthermore, the second aspect may be a chemically strengthened glass, having a surface compressive stress (CS) of 300 MPa or more and satisfying the following formulae (3), (4) and (5).

$$CTL(t) \geq -b \times \ln(t) + c (\text{unit:MPa}) \quad (3)$$

$$b \geq 14 (\text{unit:MPa}) \quad (4)$$

$$c \geq 48.4 (\text{unit:MPa}) \quad (5)$$

(Here, t is a sheet thickness (mm) and CTL(t) is a value of CT Limit at the sheet thickness t.)

The chemically strengthened glass of the second aspect preferably has a sheet shape with a sheet thickness t of 2 mm or less.

It is preferred in the chemically strengthened glass of the second aspect that a compressive stress value ($CS_{90}$) in a portion at a depth of 90 μm from a glass surface is 25 MPa or more or a compressive stress value ($CS_{100}$) in a portion at a depth of 100 μm from the glass surface is 15 MPa or more.

A third aspect of the present invention is a chemically strengthened glass, having an average cracking height in a drop-on-sand test described hereinafter of 250 mm or more, a number of fragments in an indentation fracture test described hereinafter of 30 or less, a sheet thickness t of 0.4 to 2 mm, a surface compressive stress (CS) of 300 MPa or more, and a depth of a compressive stress layer (DOL) of 100 μm or more.

It is preferred in the chemically strengthened glass of the present invention that a product ($CS_{100} \times t^2$) of a compressive stress value in a portion at a depth of 100 μm from a glass surface and a square of a sheet thickness t (mm) is 5 MPa·mm$^2$ or more.

It is preferred in the chemically strengthened glass of the present invention that an area Sc (MPa·μm) of a compressive stress layer is 30000 MPa·μm or more.

It is preferred in the chemically strengthened glass of the present invention that a depth $d_h$ of a portion at which a magnitude of an internal compressive stress reaches ½ of the surface compressive stress (CS) is 8 μm or more.

It is preferred in the chemically strengthened glass of the present invention that a position $d_M$ at which a compressive stress is maximum is in a range of up to 5 μm from a glass surface.

It is preferred in the chemically strengthened glass of the present invention that a depth of the compressive stress layer (DOL) is 110 μm or more.

It is preferred in the chemically strengthened glass of the present invention that $\Delta CS_{DOL-20}$ (unit: MPa/μm) is 0.4 or more, the $\Delta CS_{DOL-20}$ being calculated by the following formula by using a compressive stress value $CS_{DOL-20}$ at a depth of 20 μm glass surface side from the DOL.

$$\Delta CS_{DOL-20} = CS_{DOL-20}/20$$

It is preferred in the chemically strengthened glass of the present invention that $\Delta CS_{100-90}$ (unit: MPa/μm) calculated by the following formula by using the $CS_{90}$ and the $CS_{100}$ is 0.4 or more.

$$\Delta CS_{100-90} = (CS_{90} - CS_{100})/(100-90)$$

It is preferred in the chemically strengthened glass of the present invention that a glass having the matrix composition of the chemically strengthened glass has a fracture toughness value (K1c) of 0.7 MPa·m$^{1/2}$ or more.

The chemically strengthened glass of the present invention preferably has an area St (MPa·μm) of an internal tensile layer of equal to or less than StL(t) (MPa·μm).

(Here, t is a sheet thickness (mm) and StL(t) is a value of St Limit at the sheet thickness t.)

The chemically strengthened glass of the present invention preferably has an internal tensile layer stress CT (MPa) of equal to or less than CTL(t) (MPa).

(Here, t is a sheet thickness (mm) and CTL(t) is a value of CT Limit at the sheet thickness t.)

It is preferred in the chemically strengthened glass of the present invention that a matrix composition of the chemically strengthened glass contains, in mole percentage on an oxide basis, 50 to 80% of $SiO_2$, 1 to 30% of $Al_2O_3$, 0 to 6% of $B_2O_3$, 0 to 6% of $P_2O_5$, 0 to 20% of $Li_2O$, 0 to 8% of $Na_2O$, 0 to 10% of $K_2O$, 0 to 20% of MgO, 0 to 20% of CaO, 0 to 20% of SrO, 0 to 15% of BaO, 0 to 10% of ZnO, 0 to 5% of $TiO_2$, and 0 to 8% of $ZrO_2$.

The present invention further relates to a glass for chemical strengthening, containing, in mole percentage on an oxide basis, 63 to 80% of $SiO_2$, 7 to 30% of $Al_2O_3$, 0 to 5% of $B_2O_3$, 0 to 4% of $P_2O_5$, 5 to 15% of $Li_2O$, 4 to 8% of $Na_2O$, 0 to 2% of $K_2O$, 3 to 10% of MgO, 0 to 5% of CaO, 0 to 20% of SrO, 0 to 15% of BaO, 0 to 10% of ZnO, 0 to 1% of $TiO_2$, and 0 to 8% of $ZrO_2$, and not containing $Ta_2O_5$, $Gd_2O_3$, $As_2O_3$, and $Sb_2O_3$, in which a value of X is 30000 or more, the value of X being calculated based on the following formula by using contents in mole percentage on an oxide basis of components of $SiO_2$, $Al_2O_3$, $B_2O_3$, $P_2O_5$, $Li_2O$, $Na_2$, $K_2O$, MgO, CaO, SrO, BaO, and $ZrO_2$.

$$X = SiO_2 \times 329 + Al_2O_3 \times 786 + B_2O_3 \times 627 + P_2O_5 \times (-941) + Li_2O \times 927 + Na_2O \times 47.5 + K_2O \times (-371) + MgO \times 1230 + CaO \times 1154 + SrO \times 733 + ZrO_2 \times 51.8$$

In the above glass for chemical strengthening, the content of $ZrO_2$ in mole percentage on an oxide basis is preferably 1.2% or less.

The content of $K_2O$ in mole percentage on an oxide basis is preferably 0.5% or more.

The content of $B_2O_3$ in mole percentage on an oxide basis is preferably 1% or less.

The content of $Al_2O_3$ in mole percentage on an oxide basis is preferably 11% or less.

A devitrification temperature T is preferably equal to or lower than a temperature T4 at which a viscosity reaches $10^4$ dPa·s.

Advantageous Effects of the Invention

The present invention provides a chemically strengthened glass having high strength in which scattering of fragments by fracture has been suppressed.

MODE FOR CARRYING OUT THE INVENTION

Figure 1A:
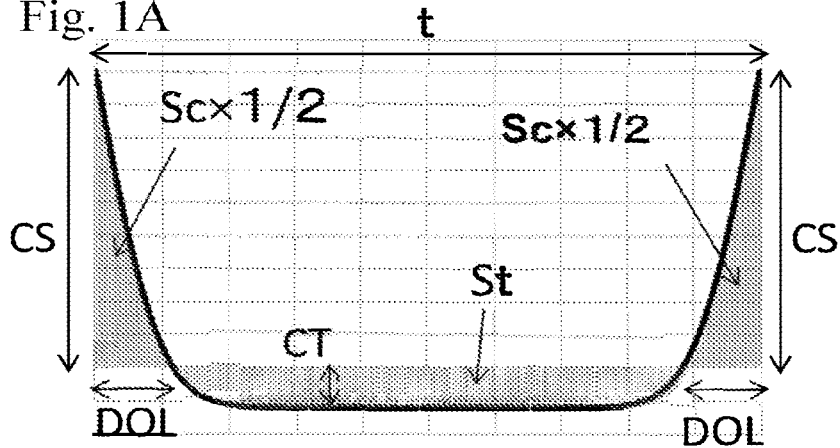
FIG. 1 is a conceptual diagram illustrating a stress profile of a chemically strengthened glass, in which (a) is a view illustrating an example of a stress profile of a chemically strengthened glass, (b) is an enlarged view of a left halt of the stress profile (a), and (c) is a view illustrating depths at positions at which the compressive stresses of each of the profiles A and B are maximum.

The chemically strengthened glass of the present invention is described in detail below.
<First Aspect>
The chemically strengthened glass according to a first aspect is described.

The first aspect is a chemically strengthened glass having surface compressive stress (CS) of 300 MPa or more, in which a compressive stress value ($CS_{90}$) in the portion at a depth of 90 μm from a glass surface is 25 MPa or more, or a compressive stress value ($CS_{100}$) in the portion at a depth of 100 μm from the glass surface is 15 MPa or more.

In the present aspect, the value of X calculated based on the following formula by using the contents in mole percentage on an oxide basis of components of $SiO_2$, $Al_2O_3$, $B_2O_3$, $P_2O_5$, $Li_2O$, $Na_2O$, $K_2O$, MgO, CaO, SrO, BaO, and $ZrO_2$ in a matrix composition of the chemically strengthened glass is 30000 or more, and/or the value of Z calculated based on the following formula is 20000 or more.

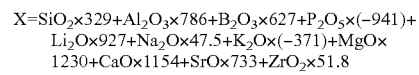

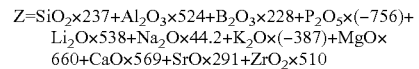

The chemically strengthened glass of the first aspect has a compressive stress layer formed by a chemical strengthening treatment (ion exchange treatment) on the surface thereof. In the chemical strengthening treatment, the surface of a glass is ion-exchanged to form a surface layer having residual compressive stress therein. Specifically, alkali metal ions (typically, Li ions or Na ions) having small ionic radius present in the vicinity of the surface of a glass sheet are substituted with alkali ions (typically, Na ions or K ions for Li ions, and K ions for Na ions) having larger ionic radius by ion exchange at a temperature equal to or lower than a glass transition point. By this, compressive stress remains on the surface of a glass, and strength of a glass is enhanced.

In the first aspect, the surface compressive stress (CS) of the chemically strengthened glass is 300 MPa or more. When a smart phone or a tablet PC has been dropped, tensile stress is generated on the surface of a cover glass, and the magnitude thereof reaches about 350 MPa. In this case, when CS is 300 MPa or more, tensile stress generated by dropping is cancelled, and the cover glass is difficult to be fractured, which is preferable. The CS of the chemically strengthened glass is preferably 350 MPa or more, more preferably 400 MPa or more, and still more preferably 450 MPa or more.

On the other hand, the upper limit of CS of the chemically strengthened glass is not particularly limited. However, when CS is too large, in the case where the glass has been fractured, the danger of, for example, scattering of fragments increases. Therefore, from the standpoint of safety when fractured, it is, for example, 2000 MPa or less, preferably 1500 MPa or less, more preferably 1000 MPa or less, and still more preferably 800 MPa or less.

The CS of the chemically strengthened glass can be appropriately adjusted by adjusting chemical strengthening conditions, the composition of a glass and the like.

The CS of the chemically strengthened glass in the first aspect is defined as follows by the values $CS_F$ and $CS_A$ by the following two kinds of measurement methods. The same is applied to a compressive stress value ($CS_X$) in the portion at a depth of x μm from a glass surface.

$$CS = CS_F = 1.28 \times CS_A$$

The $CS_F$ is a value measured by a surface stress meter FSM-6000 manufactured by Orihara Manufacturing Co., Ltd. and obtained by an attachment program Fsm V of the surface stress meter.

Figure 2:
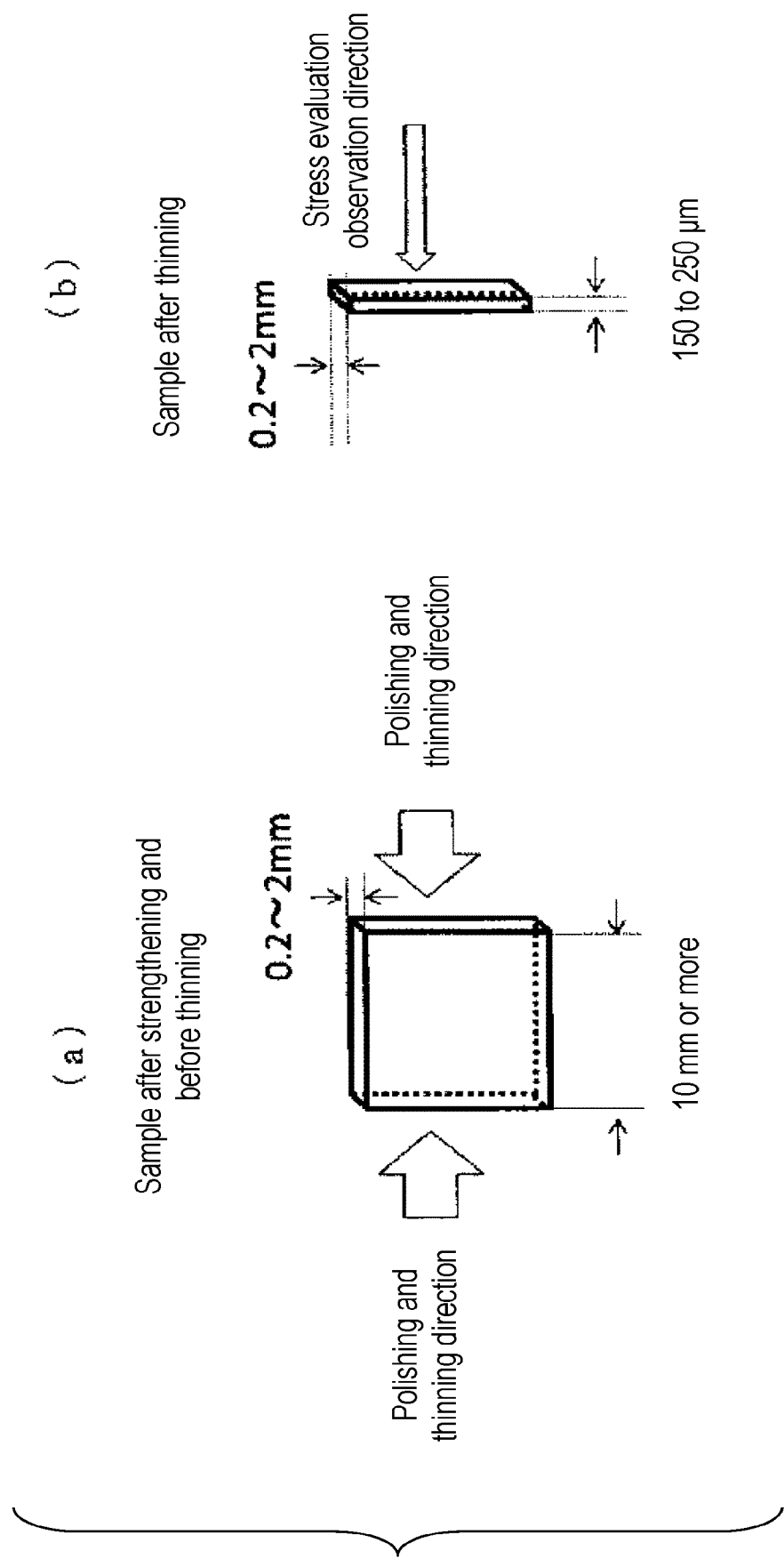
FIG. 2 is a schematic view illustrating the state of preparing a sample for measuring surface compressive stress (CS) of a chemically strengthened glass, in which (a) illustrates a sample before polishing, and (b) illustrates a thinned sample after polishing.

The $CS_A$ is a value measured by the following procedures by using a birefringence imaging system Abrio-IM manufactured by Tokyo Instruments, Inc. As illustrated in FIG. 2, a cross-section of a chemically strengthened glass having a size of 10 mm×10 mm or a larger size and a thickness of about 0.2 to 2 mm is polished to a range of 150 to 250 μm to prepare a thin piece. The polishing procedures are that grinding is performed to a thickness of the target thickness plus about 50 μm by #1000 diamond electroplated grinding stone, and then grinding is performed to a thickness of the target thickness plus about 10 μm by #2000 diamond electroplated grinding stone, and finally mirror finishing is performed by cerium oxide, thereby achieving the target thickness. The sample thinned to about 200 μm prepared above is measured with transmitted light by using monochromatic light of λ=546 nm as a light source, and phase difference (retardation) of the chemically strengthened glass is measured with a birefringence imaging system. Stress is calculated by using the value obtained and the following formula (A).

$$F=\delta/(C \times t')\qquad\text{(A)}$$

In the formula (A), F is stress (MPa), δ is phase difference (retardation) (nm), C is a photoelastic constant (nm cm$^{-1}$ MPs), and t' is a thickness (cm) of a sample.

The present inventors have found that a chemically strengthened glass having a given value or more of DOL and a given amount or more of a compressive stress value at a given depth in a compressive stress layer (hereinafter referred to as a "high DOL glass") has excellent drop resistance on sand. They have further found that even in the case where CT is relatively large, such a high DOL glass has high drop resistance on sand.

From the above standpoints, of the first aspect, the compressive stress value ($CS_{90}$) in the portion at a depth of 90 μm from the glass surface is preferably 25 MPa or more, and more preferably 30 MPa or more. In the chemically strengthened glass, the compressive stress value ($CS_{100}$) in the portion at a depth of 100 μm from the glass surface is preferably 15 MPa or more, and more preferably 20 MPa or more. Furthermore, in the chemically strengthened glass of the first aspect, the product $CS_{100} \times t^2$ of the compressive stress value in the portion at a depth of 100 μm from the glass surface and the square of a sheet thickness t (mm) is preferably 5 MPa·mm$^2$ or more.

In the case where the $CS_{90}$ is 25 MPa or more, sufficient resistance can be provided to fracture due to flaws generated by collision with a sharp object such as sand having a possibility of colliding with the chemically strengthened glass in the practical situations. In other words, excellent drop resistance on sand can be provided. The present inventors have further found that in the chemically strengthened glass having $CS_{90}$ of 25 MPa or more, even when CT is relatively large, a chemically strengthened glass having high drop resistance on sand can be provided.

The $CS_{90}$ is more preferably 30 MPa or more, still more preferably 35 MPa or more, still further more preferably 40 MPa or more, particularly preferably 45 MPa or more, and most preferably 50 MPa or more.

On the other hand, the upper limit of the $CS_{90}$ is not particularly limited. However, from the standpoint of safety when fractured, it is, for example, 250 MPa or less, preferably 200 MPa or less, more preferably 150 MPa or less, particularly preferably 100 MPa or less, and most preferably 75 MPa or less.

Similar to the above, the $CS_{100}$ is more preferably 20 MPa or more, still more preferably 23 MPa or more, still further more preferably 26 MPa or more, particularly preferably 30 MPa or more, and most preferably 33 MPa or more. The upper limit of the $CS_{100}$ is not particularly limited. However, from the standpoint of safety when fractured, it is, for example, 200 MPa or less, preferably 150 MPa or less, more preferably 100 MPa or less, particularly preferably 75 MPa or less, and most preferably 50 MPa or less.

The $CS_{100} \times t^2$ is preferably 5 MPa·mm$^2$ or more, more preferably 7 MPa·mm$^2$ or more, still more preferably 10 MPa·mm$^2$ or more, particularly preferably 15 MPa·mm$^2$ or more, and most preferably 20 MPa·mm$^2$ or more. The upper limit of the $CS_{100} \times t^2$ is not particularly limited. However, from the standpoint of safety when fractured, it is, for example, 120 MPa·mm$^2$ or less, preferably 100 MPa·mm$^2$ or less, more preferably 80 MPa·mm$^2$ or less, particularly preferably 60 MPa·mm$^2$ or less, and most preferably 40 MPa·mm$^2$ or less.

Figure 1B:
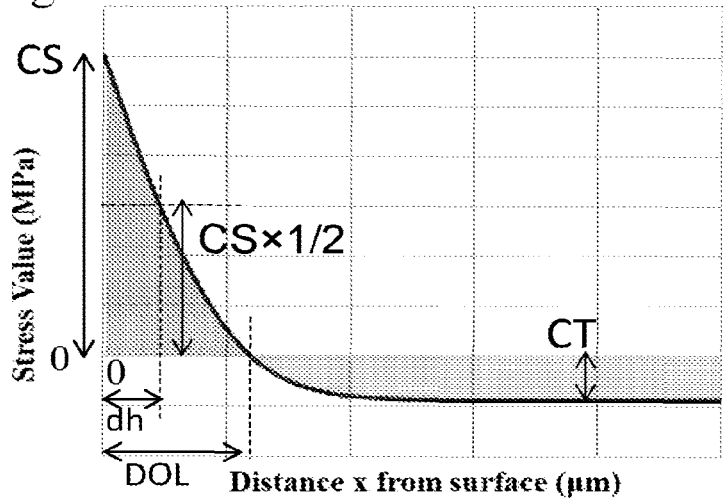
Figure 1C:
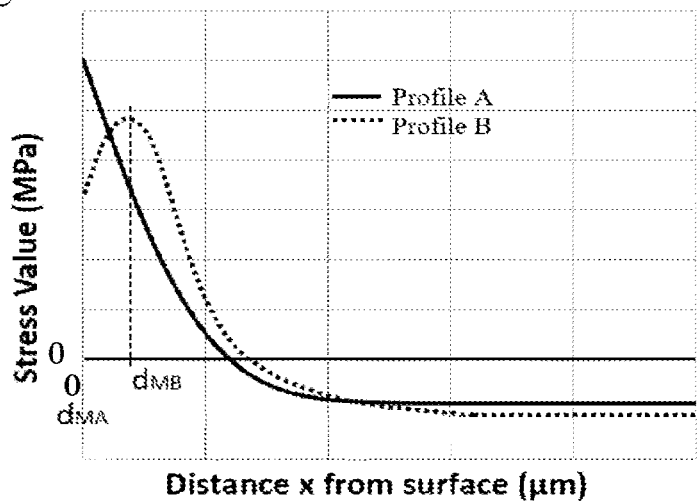

In the chemically strengthened glass of the first aspect, the depth $d_h$ (see (b) of FIG. 1) of the portion at which the magnitude of the internal compressive stress is ½ of the surface compressive stress (CS) is preferably 8 μm or more. In the case where the $d_h$ is 8 μm or more, resistance to the strength decrease of bending strength when flaws formed is enhanced. The $d_h$ is preferably 8 m or more, more preferably 10 m or more, still more preferably 12 μm or more, and particularly preferably 15 μm or more. On the other hand, the upper limit of the $d_h$ is not particularly limited. However, from the standpoint of safety when fractured, it is, for example, 70 μm or less, preferably 60 μm or less, more preferably 50 μm or less, still more preferably 40 μm or less, and particularly preferably 30 μm or less.

In the chemically strengthened glass of the first aspect, the depth $d_M$ (see (c) of FIG. 1) of a position at which the compressive stress is maximum is preferably in a range of 10 μm or less from the glass surface. In the case where $d_M$ locates in the portion at a depth deeper than 10 μm from the glass surface, the effect of enhancing bending strength by a chemical strengthening treatment is not sufficiently obtained, and this may lead to the decrease of bending strength. The $d_M$ is preferably 10 m or less, more preferably 8 m or less, and still more preferably 5 μm or less.

In the first aspect, the DOL is preferably 100 μm or more. In the case where the DOL is 100 μm or more, sufficient resistance can be provided to fracture due to flaws generated by collision with a sharp object such as sand having a possibility of colliding with the chemically strengthened glass in the practical situations. The DOL is more preferably 110 μm or more, still more preferably 120 μm or more, and particularly preferably 130 μm or more.

On the other hand, the upper limit of the DOL is not particularly limited. However, from the standpoint of safety when fractured, it is, for example, 200 μm or less, preferably 180 μm or less, more preferably 160 μm or less, and particularly preferably 150 μm or less.

The DOL can be appropriately adjusted by adjusting chemical strengthening conditions, a composition of a glass, and the like.

In the chemically strengthened glass of the present invention, the $\Delta CS_{DOL\text{-}20}$ (unit: MPa/μm) calculated by the following formula by using the compressive stress value $CS_{DOL\text{-}20}$ at a depth of 20 μm glass surface side from DOL is preferably 0.4 or more.

$$\Delta CS_{DOL\text{-}20} = CS_{DOL\text{-}20}/20$$

In the case where the $\Delta CS_{DOL\text{-}20}$ is 0.4 or more, the bending strength after flaws are formed with a sharp object (bending strength after forming flaws) can be enhanced. The $\Delta CS_{DOL\text{-}20}$ is more preferably stepwise 0.5 or more, 0.6 or more, 0.7 or more, 0.8 or more, 0.9 or more, 1.0 or more, 1.2 or more, 1.4 or more, and 1.5 or more. On the other hand, the upper limit of the $\Delta CS_{DOL\text{-}20}$ is not particularly limited. However, from the standpoint of safety of breaking, it is, for example, 4.0 or less, preferably 3.0 or less, more preferably 2.0 or less, still more preferably 1.7 or less, and typically 1.6 or less.

In the chemically strengthened glass of the present invention, the $\Delta CS_{100\text{-}90}$ (unit: MPa/μm) calculated by the following formula by using $CS_{90}$ and $CS_{100}$ is preferably 0.4 or more.

$$\Delta CS_{100\text{-}90} = (CS_{90} - CS_{100})/(100-90)$$

In the case where the $\Delta CS_{100\text{-}90}$ is 0.4 or more, the bending strength after flaws are formed with a sharp object (bending strength after forming flaws) can be enhanced. The $\Delta CS_{100\text{-}90}$ is more preferably stepwise 0.5 or more, 0.6 or more, 0.7 or more, 0.8 or more, 0.9 or more, 1.0 or more, 1.2 or more, 1.4 or more, and 1.5 or more. On the other hand, the upper limit of the $\Delta CS_{100\text{-}90}$ is not particularly limited. However, from the standpoint of safety of breaking, it is, for example, 4.0 or less, preferably 3.0 or less, more preferably 2.0 or less, still more preferably 1.7 or less, and typically 1.6 or less.

The DOL of the chemically strengthened glass in the first aspect is a depth from a glass surface of a portion at which stress is zero in a stress profile, and is a value measured by a surface stress meter FSM-6000 manufactured by Orihara Manufacturing Co., Ltd. and analyzed by an attachment program Fsm V. It can also be measured by using a thinned sample as illustrated in (b) of FIG. 2 by using a birefringence imaging system Abrio-IM manufactured by Tokyo Instruments, Inc.

In the chemically strengthened glass of the first aspect, the value of the area Sc (MPa·μm) of the compressive stress layer is preferably 30000 MPa·μm or more. In the case where the value of the area Sc (MPa·μm) of the compressive stress layer is 30000 MPa·μm or more, the chemically strengthened glass having sufficient resistance to fracture due to flaws generated by collision with a sharp object such as sand having a possibility of colliding with the chemically strengthened glass in the practical situations can be obtained by introducing larger CS and DOL. The Sc is more preferably 32000 MPa·μm or more, and still more preferably stepwise 34000 MPa·μm or more, 36000 MPa·μm or more, 38000 MPa·μm or more, 40000 MPa·μm or more, 42000 MPa·μm or more, 44000 MPa·μm or more, and 46000 MPa·μm or more.

The Sc (MPa·μm) of the chemically strengthened glass in the first aspect is defined as follows by the values $Sc_F$ and $Sc_A$ by the following two kinds of measurement methods.

$$Sc = Sc_F = 1.515 \times Sc_A$$

Here, $Sc_F$ is a value calculated by using a value measured by a surface stress meter FSM-6000 manufactured by Orihara Manufacturing Co., Ltd. and analyzed by an attachment program Fsm V, and the $Sc_A$ is a value obtained by the measurement using a birefringence imaging system Abrio-IM and a thinned sample, which is the same method as in the $CS_A$ measurement described before.

The area St (MPa·μm) of the internal tensile layer of the chemically strengthened glass in the first aspect is defined as follows by the values $St_F$ and $St_A$ by the following two kinds of measurement methods.

$$St = St_F = 1.515 \times St_A$$

Here, $St_F$ is a value calculated by using a value measured by a surface stress meter FSM-6000 manufactured by Orihara Manufacturing Co., Ltd. and analyzed by an attachment program Fsm V, and the $St_A$ is a value obtained by the measurement using a birefringence imaging system Abrio-IM and a thinned sample, which is the same method as in the $CS_A$ measurement described before. The stress profile is prepared by two methods similar to the above, $St_F$ or $St_A$ is calculated, and St can be obtained.

Conceptual diagrams of Sc and St are shown in (a) of FIG. 1. Sc and St are the same value in principle, and are preferably calculated so as to be 0.95<Sc/St<1.05.

In the first aspect, the value of X calculated based on the following formula by using the contents in mole percentage on an oxide basis of components of $SiO_2$, $Al_2O_3$, $B_2O_3$, $P_2O_5$, $Li_2O$, $Na_2O$, $K_2O$, MgO, CaO, SrO, BaO, and $ZrO_2$ in a matrix composition of the chemically strengthened glass is 30000 or more, and/or the value of Z calculated based on the following formula is 20000 or more.

The matrix composition of the chemically strengthened glass is a composition of a glass before chemical strengthening (hereinafter also referred to as a "glass for chemical strengthening"). The portion having tensile stress (hereinafter also referred to as a "tensile stress portion") of the chemically strengthened glass is a portion that is not ion-exchanged. In the case where a thickness of the chemical strengthened glass is sufficiently large, the tensile stress portion of the chemically strengthened glass has the same composition as that of a glass before chemical strengthening. In such a case, the composition of the tensile stress portion can be considered as a matrix composition. The preferred embodiment of the matrix composition of the chemically strengthened glass is described hereinafter.

$$X = SiO_2 \times 329 + Al_2O_3 \times 786 + B_2O_3 \times 627 + P_2O_5 \times (-941) + Li_2O \times 927 + Na_2O \times 47.5 + K_2O \times (-371) + MgO \times 1230 + CaO \times 1154 + SrO \times 733 + ZrO_2 \times 51.8$$

$$Z = SiO_2 \times 237 + Al_2O_3 \times 524 + B_2O_3 \times 228 + P_2O_5 \times (-756) + Li_2O \times 538 + Na_2O \times 44.2 + K_2O \times (-387) + MgO \times 660 + CaO \times 569 + SrO \times 291 + ZrO_2 \times 510$$

The present inventors have experimentally found that the X value and Z value calculated based on the above formulae well correlate with the number of pieces (the number of fragments) formed when the chemically strengthened glass was fractured (broken), and the number of fragments when the glass was fractured tends to decrease as the X value and Z value increase.

Based on the above finding, from the standpoint of a glass generating less number of fragments and having higher safety, in the chemically strengthened glass of the first aspect, the X value is preferably 30000 MPa·μm or more, and still more preferably stepwise 32000 MPa·μm or more, 34000 MPa·μm or more, 36000 MPa·μm or more, 38000 MPa·μm or more, 40000 MPa·μm or more, 42000 MPa·μm or more, 44000 MPa·μm or more, 45000 MPa·μm or more, and 46000 MPa·μm or more.

From the same standpoint, the Z value is preferably 20000 MPa·μm or more, and still more preferably stepwise 22000 MPa·μm or more, 24000 MPa·μm or more, 26000 MPa·μm or more, 28000 MPa·μm or more, 29000 MPa·μm or more, and 30000 MPa·μm or more.

The X value and Z value can be adjusted by the component contents in the matrix composition of the chemically strengthened glass. In the first aspect, the matrix composition of the chemically strengthened glass is not particularly limited. However, a glass composition in which a chemical strengthening treatment giving the above-described chemical strengthening properties to a glass after chemical strengthening can be applied, and the value of X is 30000 or more and/or the value of Z is 20000 or more is appropriately selected.

The present inventors have further experimentally found that Y value calculated based on the following formula correlates with the number of pieces (the number of fragments) formed when a chemically strengthened glass was fractured (broken), and the number of fragments when the glass fractured tends to decrease as the Y value increases.

$Y=SiO_2 \times 0.00884 + Al_2O_3 \times 0.0120 + B_2O_3 \times (-0.00373) + P_2O_5 \times 0.000681 + Li_2O \times 0.00735 + Na_2O \times (-0.00234) + K_2O \times (-0.00608) + MgO \times 0.0105 + CaO \times 0.00789 + SrO \times 0.00752 + BaO \times 0.00472 + ZrO_2 \times 0.0202$ Based on the above finding, from the standpoint of a glass generating less number of fragments and having higher safety even in the case where a glass is fractured, in the chemically strengthened glass of the first aspect, the Y value is preferably 0.7 or more, more preferably 0.75 or more, still more preferably 0.77 or more, particularly preferably 0.80 or more, and most preferably 0.82 or more.

The glass for chemical strengthening of the present invention is preferably that a devitrification temperature T is equal to or lower than a temperature T4 at which a viscosity reaches $10^4$ dPa·s. In the case where the devitrification temperature T is higher than T4, quality is easy to be deteriorated by devitrification during forming a glass sheet by a float process or the like.

In the case where the chemically strengthened glass of the first aspect is a sheet-shaped glass (glass sheet), its sheet thickness (t) is not particularly limited. However, to enhance the effect of chemical strengthening, it is, for example, 2 mm or less, preferably 1.5 mm or less, more preferably 1 mm or less, still more preferably 0.9 mm or less, particularly preferably 0.8 mm or less, and most preferably 0.7 mm or less. From the standpoint of obtaining sufficient effect of enhancing strength by a chemical strengthening treatment, the sheet thickness is, for example, 0.1 mm or more, preferably 0.2 mm or more, more preferably 0.4 mm or more, and still more preferably 0.5 mm or more.

The chemically strengthened glass of the first aspect may have a shape other than a sheet shape, depending on products to which the glass is applied, uses, and the like. The glass sheet may have a chamfered shape having different thickness of an outer periphery. The glass sheet has two main surfaces and edge surfaces adjacent to those to form a sheet thickness, and the two main surfaces may form flat surfaces parallel to each other. However, the form of the glass sheet is not limited to this. For example, two main surfaces may not be parallel to each other, and the whole or a part of one or both of two main surfaces may be a curved surface. More specifically, the glass sheet may be a flat sheet-shaped glass sheet free of warp, and may be a curved glass sheet having a curved surface.

According to the first aspect, a chemically strengthened glass generating less number of fragments and high safety is obtained even though CT or St is large.

For example, in the case where a mobile device such as a smart phone is accidentally dropped, there is relatively high possibility that it collides with a collision object having a collision part having small angle (hereinafter also referred to as a "sharp object") such as sand and a chemically strengthened glass as a cover glass is damaged. Therefore, a chemically strengthened glass difficult to be damaged even in the case of colliding with a sharp object is required.

The chemically strengthened glass according to the first aspect has excellent resistance to fracture (drop resistance on sand) due to flaws generated by collision with a sharp object such as sand having a possibility of colliding in the practical situations.

<Second Aspect>

The chemically strengthened glass according to the second aspect is described below.

One of the chemically strengthened glasses of the second aspect is a chemically strengthened glass having surface compressive stress (CS) of 300 MPa or more and satisfying the following formulae (1) and (2).

$$StL(t) \geq a \times t + 7000 \text{(unit:MPa·μm)} \tag{1}$$

$$a \geq 30000 \text{(unit:MPa·μm/mm)} \tag{2}$$

(Here, t is a sheet thickness (mm) and StL(t) is a value of St Limit in the case of the sheet thickness t.)

The StL(t) is a value obtained by the following measurement. A glass of 25 mm×25 mm×sheet thickness t (mm) is subjected to a chemical strengthening treatment under various chemical strengthening conditions such that an internal tensile stress area (St, unit: MPa·μm) changes, thereby preparing chemically strengthened glasses having various internal tensile stress areas (St, unit: MPa·μm). By using a diamond indenter having an indenter angle of a facing angle of 60°, those chemically strengthened glasses are fractured by an indentation fracture test in which a load of 3 to 10 kgf is maintained for 15 seconds, and the number of pieces (the number of fragments) of the chemically strengthened glasses after fracture are counted. The internal tensile stress area (St, unit: MPa·μm) in the case where the number of fragments was 10 is defined as St Limit value=StL(t) in the case of a sheet thickness t (mm). In the case where the number of fragments crosses over 10, StL(t) value is defined by the following formula by using Stn value that is St value of the maximum number n of fragments becoming less than 10 and Stm value that is St value of the minimum number m of fragments becoming more than 10.

$$StL(t) \text{value} = Stn + (10-n) \times (Stm-Stn)/(m-n)$$

In the case where a chemically strengthened glass having a size larger than 25 mm×25 mm is used, a region of 25 mm×25 mm is indicated in a chemically strengthened glass, and the StL(t) is measured within the region.

StL(t) depends on a sheet thickness t (mm) and a, and a is a parameter depending on a glass composition. StL(t) linearly changes to t, and its gradient can be expressed by the parameter a changing by a composition. In the case where the value of a is 30000 MPa·μm/mm or more, the breaking mode generating less number of fragments and having high safety can be achieved even if larger CS and DOL have been introduced.

The value of a is more preferably 32000 MPa·μm/mm or more, and is more preferably stepwise 34000 MPa·μm/mm or more, 36000 MPa·μm/mm or more, 38000 MPa·μm/mm or more, 40000 MPa·μm/mm or more, 42000 MPa·μm/mm or more, 44000 MPa·μm/mm or more, 46000 MPa·μm/mm or more, 48000 MPa·μm/mm or more, and 50000 MPa·μm/mm or more.

In the chemically strengthened glass of the present embodiment, in the case where a is larger than 53000 MPa·μm/mm, the devitrification temperature of a glass increases, and productivity may be deteriorated in glass manufacturing. Therefore, the value a is preferably 53000 MPa·μm/mm or less.

One of the chemically strengthened glasses of the second aspect is a chemically strengthened glass having surface compressive stress (CS) of 300 MPa or more and satisfying the following formulae (3), (4) and (5).

$$CTL(t) \geq -b \times \ln(t) + c \text{(unit:MPa)} \quad (3)$$

$$b \geq 14 \text{(unit:MPa)} \quad (4)$$

$$c \geq 48.4 \text{(unit:MPa)} \quad (5)$$

(Here, t is a sheet thickness (mm) and CTL (t) is a value of CT Limit in the case of the sheet thickness t.)

The CTL(t) is a value obtained by the following measurement. Specifically, a glass of 25 mm×25 mm×sheet thickness t (mm) is subjected to a chemical strengthening treatment under various chemical strengthening conditions such that internal tensile stress CT (unit: MPa) changes, thereby preparing chemically strengthened glasses having various internal tensile stresses CT (unit: MPa). By using a diamond indenter having an indenter angle of a facing angle of 60°, those chemically strengthened glasses are fractured by an indentation fracture test in which a load of 3 to 10 kgf is maintained for 15 seconds, and the number of pieces (the number of fragments) of the chemically strengthened glasses after fracture are counted. The internal tensile stress CT (unit: MPa) in the case where the number of fragments was 10 is defined as CT Limit value=CTL(t) in the case of a sheet thickness t (mm). In the case where the number of fragments crosses over 10, CTL(t) value is defined by the following formula by using CTn value that is CT value of the maximum number n of fragments becoming less than 10 and CTm value that is CT value of the minimum number m of fragments becoming more than 10.

$$CTL(t) \text{value} = CTn + (10-n) \times (CTm - CTn)/(m-n)$$

In the case where a chemically strengthened glass having a size larger than 25 mm×25 mm is used, a region of 25 mm×25 mm is indicated in a chemically strengthened glass, and the CTL(t) is measured within the region.

CTL(t) depends on a sheet thickness t (mm), b and c, and b and c are parameters depending on a glass composition. CTL(t) decreases with increasing t, and can be expressed by using natural logarithm as in the formula (3). According to the present embodiment, in the case where the values of b and c are 14 MPa or more and 48.4 MPa or more, respectively, the breaking mode generating less number of fragments and having high safety can be achieved even if CS and DOL larger than conventional CS and DOL have been introduced.

The value of b is more preferably 14 MPa or more, and is preferably stepwise 15 MPa or more, 16 MPa or more, 17 MPa or more, 18 MPa or more, 19 MPa or more, 20 MPa or more, 21 MPa or more, 22 MPa or more, 23 MPa or more, 24 MPa or more, 25 MPa or more, 26 MPa or more, 27 MPa or more, 28 MPa or more, 29 MPa or more, and 30 MPa or more.

The value of c is more preferably 48.4 MPa or more, and is preferably stepwise 49 MPa or more, 50 MPa or more, 51 MPa or more, 52 MPa or more, 53 MPa or more, 54 MPa or more, 55 MPa or more, 56 MPa or more, 57 MPa or more, 58 MPa or more, 59 MPa or more, 60 MPa or more, 61 MPa or more, 62 MPa or more, 63 MPa or more, 64 MPa or more, and 65 MPa or more.

In the chemically strengthened glass of the present embodiment, in the case where b is larger than 35 MPa and c is larger than 75 MPa, devitrification of a glass is generally deteriorated, and productivity may be deteriorated in glass manufacturing. Therefore, CTL(t) is preferably smaller than $-35 \times \ln(t) + 75$.

The St value and CT value are defined as follows by using the values $St_F$ and $CT_F$ measured by a surface stress meter FSM-6000 manufactured by Orihara Manufacturing Co., Ltd. and analyzed by an attachment program Fsm V, or the values $St_A$ and $CT_A$ obtained by the measurement using a birefringence imaging system Abrio-IM and a thinned sample.

$$St = St_F = 1.515 \times St_A$$

$$CT = CT_F = 1.28 \times CT_A$$

Here, $CT_F$ is a value equal to the value CT_CV analyzed by Fsm V, and differs from CT' obtained by the following formula (11).

$$CS \times DOL' = (t - 2 \times DOL') \times CT' \quad (11)$$

Here, DOL' corresponds to a depth of anion exchange layer. The above formula obtaining CT' linearly approximates a stress profile, and furthermore, it is assumed that the point at which stress is zero equals to a depth of an ion exchange layer. Therefore, there is a problem that it is estimated larger than the actual internal tensile stress, and this is improper as an index of internal tensile stress in the present embodiment.

The chemically strengthened glass of the second aspect has a compressive stress layer formed by a chemical strengthening treatment (ion exchange treatment), on the surface thereof.

The chemically strengthened glass of the second aspect has surface compressive stress (CS) of 300 MPa or more. The reason for limiting CS and preferred numerical range in the chemically strengthened glass of the second aspect are the same as in the first aspect.

Preferred numerical ranges of $CS_{90}$, $CS_{100}$ and $CS_{100} \times t^2$ and the technical effects accompanying with those, in the chemically strengthened glass of the second aspect are the same as in the first aspect. Particularly, in the case where the compressive stress value ($CS_{90}$) of the portion at a depth of 90 μm from the glass surface is 25 MPa or more or the compressive stress value ($CS_{100}$) of the portion at a depth of 100 μm from the glass surface is 15 MPa or more, sufficient resistance can be provided to fracture due to flaws generated by collision with a sharp object such as sand having a possibility of colliding with the chemically strengthened glass in the practical situations. In other words, the chemically strengthened glass having excellent drop resistance on sand can be provided.

Preferred numerical ranges of $d_h$ and $d_M$ and the technical effects accompanying with those, in the chemically strengthened glass of the second aspect are the same as in the first aspect.

Preferred numerical range of DOL and the technical effect accompanying with it, in the chemically strengthened glass of the second aspect are the same as in the first aspect. Preferred numerical ranges of Sc and St and the technical effects accompanying with those, in the chemically strengthened glass of the second aspect are the same as in the first aspect.

The chemically strengthened glass of the second aspect is preferably a sheet-shape one having a sheet thickness t of 2 mm or less. Preferred numerical range of the sheet thickness t in the chemically strengthened glass of the second aspect and the technical effect accompanying with it are the same as in the first aspect.

The chemically strengthened glass of the second aspect can have various shapes other than a sheet shape, similar to the chemically strengthened glass of the first aspect.

<Third Aspect>

The chemically strengthened glass according to the third aspect is described below.

The third aspect relates to a chemically strengthened glass, in which an average cracking height by a drop-on-sand test under the following conditions is 250 mm or more, the number of fragments by an indentation fracture test under the following conditions is 30 or less, sheet thickness t is 0.4 to 2 mm, surface compressive stress (CS) is 300 MPa or more, and a depth (DOL) of a compressive stress layer is 100 μm or more.

From the standpoint of providing excellent drop resistance on sand, an average cracking height by a drop-on-sand test of the chemically strengthened glass in the third aspect is 250 mm or more, preferably 300 mm or more, and more preferably 350 mm or more. The average cracking height of the chemically strengthened glass in the third aspect is measured by a drop-on-sand test under the following conditions.

Drop-On-Sand Test Conditions:

A chemically strengthened glass (50 mm×50 mm×sheet thickness t (mm)) is adhered to a hard nylon mock plate (50 mm×50 mm, weight: 54 g) through a sponge double sided tape (50 mm×50 mm×thickness 3 mm) to prepare a measurement sample. 1 g of silica sand (#5 Silica Sand, manufactured by Takeori Kogyo-Sho) is applied on SUS plate having a size of 15 cm×15 cm so as to be uniform, and the measurement sample prepared is dropped on the surface of the SUS plate having silica sand applied thereon from a predetermined height (drop height) such that the chemically strengthened glass faces down. The drop test is started from a drop height of 10 mm, and the height is lifted every 10 mm. The height at which the chemically strengthened glass has been cracked is defined as a cracking height (unit: mm). The drop test is conducted 5 or more times in each example, and an average value of those cracking heights in the drop test is defined as an average cracking height (unit: mm).

From the standpoint of further safe fracture (breaking) even if fracture (breaking) occurs, the number of fragments by an indentation fracture test of the chemically strengthened glass in the third aspect is 30 or less, preferably 20 or less, more preferably 10 or less, still more preferably 5 or less, and particularly preferably 2 or less. The number of fragments of the chemically strengthened glass in the third aspect is measured by an indentation fracture test under the following conditions.

Indentation Fracture Test Conditions:

As for a chemically strengthened glass of 25 mm×25 mm×sheet thickness t (mm), the chemically strengthened glass is fractured by an indentation fracture test in which a load of 3 to 10 kgf is held for 15 seconds, using a diamond indenter having an indenter angle of a facing angle of 60°, and the number of fragments of the chemically strengthened glass after breaking is counted. In the case where a chemically strengthened glass having a size larger than 25 mm×25 mm is used, a region of 25 mm×25 mm is indicated in the chemically strengthened glass, and an indentation fracture test and the measurement of the number of fragments are conducted in the region. In the case where the chemically strengthened glass has a curved shape, a size of 25 mm×25 mm as a projected area is indicated on the curved surface of the chemically strengthened glass, and an indentation fracture test and the measurement of the number of fragments are conducted in the region.

The chemically strengthened glass of the third aspect is sheet-shaped (glass sheet), and from the standpoint of making it possible to remarkably enhance strength by chemical strengthening, its sheet thickness (t) is, for example, 2 mm or less, preferably 1.5 mm or less, more preferably 1 mm or less, still more preferably 0.9 mm or less, particularly preferably 0.8 mm or less, and most preferably 0.7 mm or less. From the standpoint of obtaining the sufficient effect of enhancing strength by chemical strengthening, the sheet thickness is, for example, 0.3 mm or more, preferably 0.4 mm or more, and more preferably 0.5 mm or more.

The chemically strengthened glass of the third aspect has surface compressive stress (CS) of 300 MPa or more. The reason for limiting CS and preferred numerical range in the chemically strengthened glass of the third aspect are the same as in the first aspect.

From the standpoint of having sufficient resistance to fracture due to flaws generated by collision with a sharp object such as sand having a possibility of colliding with the chemically strengthened glass in the practical situations, DOL in the chemically strengthened glass of the third aspect is 100 μm or more. The DOL is more preferably 110 μm or more, still more preferably 120 μm or more, and particularly preferably 130 μm or more.

Preferred numerical ranges of $CS_{90}$, $CS_{100}$ and $CS_{100} \times t^2$ and the technical effects accompanying with those in the chemically strengthened glass of the third aspect are the same as in the first aspect.

Preferred numerical ranges of $d_H$ and $d_M$ and the technical effects accompanying with those in the chemically strengthened glass of the third aspect are the same as in the first aspect.

Preferred numerical ranges of Sc and St and the technical effects accompanying with those in the chemically strengthened glass of the third aspect are the same as in the first aspect.

The chemically strengthened glass according to the third aspect is a chemically strengthened glass generating less number of fragments and having high safety even though CT or St is large.

<Glass for Chemical Strengthening>

The glass for chemical strengthening of the present invention is described below.

A glass composition of the glass for chemical strengthening is hereinafter sometimes referred to as a matrix composition of the chemically strengthened glass.

In the case where the thickness of the chemically strengthened glass is sufficiently large, the portion having tensile stress (hereinafter also referred to as a "tensile stress portion") in the chemically strengthened glass is the portion that is not ion-exchanged. Therefore, the tensile stress portion in the chemically strengthened glass has the same composition as in the glass before chemical strengthening. In such a case, the composition of the tensile stress portion in the chemically strengthened glass can be considered as a matrix composition of the chemically strengthened glass.

The composition of a glass can be obtained by semi-quantitative analysis by a fluorescent X-ray method in a simplified manner, but more precisely, can be measured by a wet analysis method such as ICP emission spectrometry.

Unless otherwise indicated, the content of each component is expressed by mole percentage on an oxide basis.

As an example of the composition for the glass for chemical strengthening of the present invention (matrix composition of the chemically strengthened glass of the present invention), one containing 50 to 80% of $SiO_2$, 1 to 30% of $Al_2O_3$, 0 to 5% of $B_2O_3$, 0 to 4% of $P_2O_5$, 3 to 20% of $Li_2$, 0 to 8% of $Na_2O$, 0 to 10% of $K_2O_3$ to 20% of MgO, 0 to 20% of CaO, 0 to 20% of SrO, 0 to 15% of BaO, 0 to 10% of ZnO, 0 to 1% of $TiO_2$, and 0 to 8% of $ZrO_2$ is preferred.

Example thereof includes a glass containing 63 to 80% of $SiO_2$, 7 to 30% of $Al_2O_3$, 0 to 5% of $B_2O_3$, 0 to 4% of $P_2O_5$, 5 to 15% of $Li_2$, 4 to 8% of $Na_2O$, 0 to 2% of $K_2O_3$ to 10% of MgO, 0 to 5% of CaO, 0 to 20% of SrO, 0 to 15% of BaO, 0 to 10% of ZnO to 1% of $TiO_2$, and 0 to 8% of $ZrO_2$, and not containing $Ta_2O_5$, $Gd_2O_3$, $As_2O_3$, and $Sb_2O_3$.

It is preferred in the glass for chemical strengthening that the value of X calculated based on $$X = SiO_2 \times 329 + Al_2O_3 \times 786 + B_2O_3 \times 627 + P_2O_5 \times (-941) + Li_2O \times 927 + Na_2O \times 47.5 + K_2O \times (-371) + MgO \times 1230 + CaO \times 1154 + SrO \times 733 + ZrO_2 \times 51.8 \text{ is } 30000$$

or more.

Furthermore, it is preferred that the value of Z calculated based on $$Z = SiO_2 \times 237 + Al_2O_3 \times 524 + B_2O_3 \times 228 + P_2O_5 \times (-756) + Li_2O \times 538 + Na_2O \times 44.2 + K_2O \times (-387) + MgO \times 660 + CaO \times 569 + SrO \times 291 + ZrO_2 \times 510 \text{ is } 20000$$

or more.

$SiO_2$ is a component constituting a framework of a glass. Furthermore, it is a component enhancing chemical durability and is a component reducing the generation of cracks when flaws (indentations) have been formed on a glass surface. The content of $SiO_2$ is preferably 50% or more. The content of $SiO_2$ is more preferably stepwise 54% or more, 58% or more, 60% or more, 63% or more, 66% or more, and 68% or more. On the other hand, in the case where the content of $SiO_2$ exceeds 80%, meltability is remarkably deteriorated. The content of $SiO_2$ is 80% or less, more preferably 78% or less, still more preferably 76% or less, particularly preferably 74% or less, and most preferably 72% or less.

$Al_2O_3$ is a component enhancing breaking resistance of the chemically strengthened glass. High breaking resistance of a glass used herein means that the number of fragments is small when a glass has been cracked. A glass having high breaking resistance is that fragments are difficult to scatter when fractured, and therefore, it says that safety is high. $Al_2O_3$ is a component effective to enhance ion exchange performance during chemical strengthening and increase surface compressive stress after strengthening. Therefore, the content of $Al_2O_3$ is preferably 1% or more. $Al_2O_3$ is a component increasing Tg of a glass and is a component increasing Young's modulus. The content of $Al_2O_3$ is more preferably stepwise 3% or more, 5% or more, 7% or more, 8% or more, 9% or more, 10% or more, 11% or more, 12% or more, and 13% or more. On the other hand, in the case where the content of $Al_2O_3$ exceeds 30%, acid resistance of the glass is deteriorated or a devitrification temperature increases. Additionally, a viscosity of the glass increases, resulting in deterioration of meltability. The content of $Al_2O_3$ is preferably 30% or less, more preferably 25% or less, still more preferably 20% or less, particularly preferably 18% or less, and most preferably 15% or less. On the other hand, in the case where the content of $Al_2O_3$ is large, a temperature during melting a glass increases, resulting in deterioration of productivity. In the case of considering productivity of a glass, the content of $Al_2O_3$ is preferably 11% or less, and is more preferably stepwise 10% or less, 9% or less, 8% or less, and 7% or less.

$B_2O_3$ is a component enhancing chipping resistance of the glass for chemical strengthening or the chemically strengthened glass and enhancing meltability. $B_2O_3$ is not essential, but the content of $B_2O_3$ when contained is preferably 0.5% or more, more preferably 1% or more, and still more preferably 2% or more, in order to enhance meltability. On the other hand, when the content of $B_2O_3$ exceeds 5%, striae are generated during melting, and the quality of the glass for chemical strengthening is easy to be deteriorated. Therefore, it is preferably 5% or less. The content of $B_2O_3$ is more preferably 4% or less, still more preferably 3% or less, and particularly preferably 1% or less. To enhance acid resistance, preferably it is not contained.

$P_2O_5$ is a component enhancing ion exchange performance and chipping resistance. $P_2O_5$ may not be contained, but the content of $P_2O_5$ when contained is preferably 0.5% or more, more preferably 1% or more, and still more preferably 2% or more. On the other hand, in the case where the content of $P_2O_5$ exceeds 4%, breaking resistance of the chemically strengthened glass is deteriorated or acid resistance is remarkably deteriorated. The content of $P_2O_5$ is preferably 4% or less, more preferably 3% or less, still more preferably 2% or less, and particularly preferably 1% or less. To enhance acid resistance, preferably it is not contained.

$Li_2O$ is a component forming surface compressive stress by ion exchange, and is a component improving breaking resistance of the chemically strengthened glass.

In the case where a chemical strengthening treatment is conducted such that Li ions on a glass surface are substituted with Na ions and the $CS_{90}$ is 30 MPa or more, the content of $Li_2O$ is preferably 3% or more, more preferably 4% or more, still more preferably 5% or more, particularly preferably 6% or more, and typically 7% or more. On the other hand, in the case where the content of $Li_2O$ exceeds 20%, acid resistance of the glass is remarkably deteriorated. The content of $Li_2O$ is preferably 20% or less, more preferably 18% or less, still more preferably 16% or less, particularly preferably 15% or less, and most preferably 13% or less.

On the other hand, in the case where a chemical strengthening treatment is conducted such that Na ions on a glass surface are substituted with K ions and the $CS_{90}$ is MPa or more, if the content of $Li_2O$ exceeds 3%, magnitude of compressive stress is decreased, and it is difficult to achieve the $CS_{90}$ of 30 MPa or more. In this case, the content of $Li_2O$ is preferably 3% or less, more preferably 2% or less, still more preferably 1% or less, and particularly preferably 0.5% or less, and it is most preferable that $Li_2O$ is not substantially contained.

The term "is not substantially contained" used in the present specification means that the component is not contained excluding inevitable impurities contained in raw materials and the like, that is, means that the component is not intentionally contained. Specifically, it means that the content in a glass composition is less than 0.1 mol %.

$Na_2O$ is a component forming a surface compressive stress layer by ion exchange and enhancing meltability of a glass.

In the case where a chemical strengthening treatment is conducted such that Li ions on a glass surface are substituted with Na ions and the $CS_{90}$ is 30 MPa or more, $Na_2O$ may not be contained, but may be contained in the case of considering meltability of a glass as important. The content of $Na_2O$ when contained is preferably 1% or more. The content of $Na_2O$ is more preferably 2% or more, and still more preferably 3% or more. On the other hand, in the case where the content of $Na_2O$ exceeds 8%, surface compressive stress formed by ion exchange is remarkably deteriorated. The content of $Na_2O$ is preferably 8% or less, more preferably 7% or less, still more preferably 6% or less, particularly preferably 5% or less, and most preferably 4% or less.

On the other hand, in the case where a chemical strengthening treatment is conducted such that Na ions on a glass surface are substituted with K ions and the $CS_{90}$ is MPa or more, Na is essential and its content is 5% or more. The content of $Na_2O$ is preferably 5% or more, more preferably 7% or more, still more preferably 9% or more, particularly preferably 11% or more, and most preferably 12% or more. On the other hand, in the case where the content of $Na_2O$ exceeds 20%, acid resistance of a glass is remarkably deteriorated. The content of $Na_2O$ is preferably 20% or less, more preferably 18% or less, still more preferably 16% or less, particularly preferably 15% or less, and most preferably 14% or less.

In the case where Li ions and Na ions on the glass surface are simultaneously ion-exchanged with Na ions and K ions, respectively, by a method of, for example, dipping in a mixed molten salt of potassium nitrate and sodium nitrate, the content of $Na_2O$ is preferably 10% or less, more preferably 9% of less, still more preferably 7% or less, particularly preferably 6% or less, and most preferably 5% or less. The content of $N_2O$ is preferably 2% or more, more preferably 3% of more, and still more preferably 4% or more.

$K_2O$ may be contained in order to, for example, enhance ion exchange performance. The content of $K_2O$ when contained is preferably 0.5% or more, more preferably 1% or more, still more preferably 2% or more, and particularly preferably 3% or more. On the other hand, in the case where the content of $K_2O$ exceeds 10%, breaking resistance of the chemically strengthened glass is deteriorated. Therefore, the content of $K_2O$ is preferably 10% or less. The content of $K_2O$ is more preferably 8% or less, still more preferably 6% or less, particularly preferably 4% or less, and most preferably 2% or less.

MgO is a component increasing surface compressive stress of the chemically strengthened glass and is a component improving breaking resistance. Therefore, it is preferably contained. The content of MgO when contained is preferably 3% or more, and is more preferably stepwise 4% or more, 5% or more, 6% or more, 7% or more, and 8% or more. On the other hand, in the case where the content of MgO exceeds 20%, the glass for chemical strengthening is easy to devitrify during melting. The content of MgO is preferably 20% or less, and is more preferably stepwise 18% or less, 15% or less, 14% or less, 13% or less, 12% or less, 11% or less, and 10% or less.

CaO is a component enhancing meltability of the glass for chemical strengthening and is a component improving breaking resistance of the chemically strengthened glass. Therefore, it may be contained. The content of CaO when contained is preferably 0.5% or more, more preferably 1% or more, still more preferably 2% or more, particularly preferably 3% or more, and most preferably 5% or more. On the other hand, in the case where the content of CaO exceeds 20%, ion exchange performance is remarkably deteriorated. Therefore, it is preferably 20% or less. The content of CaO is more preferably 14% or less, and still more preferably stepwise 10% or less, 8% or less, 6% or less, 3% or less, and 1% or less.

SrO is a component enhancing meltability of the glass for chemical strengthening and is a component improving breaking resistance of the chemically strengthened glass. Therefore, it may be contained. The content of SrO when contained is preferably 0.5% or more, more preferably 1% or more, still more preferably 2% or more, particularly preferably 3% or more, and most preferably 5% or more. On the other hand, in the case where the content of SrO exceeds 20%, ion exchange performance is remarkably deteriorated. Therefore, it is preferably 20% or less. The content of SrO is more preferably 14% or less, still more preferably 12% or less, and still more preferably stepwise 10% or less, 8% or less, 6% or less, 3% or less, and 1% or less.

BaO is a component enhancing meltability of the glass for chemical strengthening and is a component improving breaking resistance of the chemically strengthened glass. Therefore, it may be contained. The content of BaO when contained is preferably 0.5% or more, more preferably 1% or more, still more preferably 2% or more, particularly preferably 3% or more, and most preferably 5% or more. On the other hand, in the case where the content of BaO exceeds 15%, ion exchange performance is remarkably deteriorated. Therefore, the content of BaO is preferably 15% or less, and more preferably stepwise 10% or less, 8% or less, 6% or less, 3% or less, and 1% or less.

ZnO is a component enhancing meltability of a glass, and may be contained. The content of ZnO when contained is preferably 0.25% or more, and more preferably 0.5% or more. In the case where the content of ZnO exceeds 10%, weather resistance of a glass is remarkably deteriorated. The content of ZnO is preferably 10% or less, more preferably 7% or less, still more preferably 5% or less, particularly preferably 2% or less, and most preferably 1% or less.

$TiO_2$ is a component improving breaking resistance of the chemically strengthened glass, and may be contained. The content of $TiO_2$ when contained is preferably 0.1% or more, more preferably 0.15% or more, and still more preferably 0.2% or more. On the other hand, in the case where the content of $TiO_2$ exceeds 5%, the chemically strengthened glass is easy to devitrify during melting, and the quality thereof may be deteriorated. The content of $TiO_2$ is preferably 1% or less, more preferably 0.5% or less, and still more preferably 0.25% or less.

$ZrO_2$ is a component increasing surface compressive stress by ion exchange and has the effect of improving breaking resistance of the glass for chemically strengthened glass. Therefore, it may be contained. The content of $ZrO_2$ when contained is preferably 0.5% or more, and more preferably 1% or more. On the other hand, in the case where the content of $ZrO_2$ exceeds 8%, the chemically strengthened glass is easy to devitrify during melting, and the quality thereof may be deteriorated. The content of $ZrO_2$ is preferably 8% or less, more preferably 6% or less, still more preferably 4% or less, particularly preferably 2% or less, and most preferably 1.2% or less.

$Y_2O_3$, $La_2O_3$ and $Nb_2O_5$ are components improving breaking resistance of the chemically strengthened glass, and may be contained. Each of the contents of those components when contained are preferably 0.5% or more, more preferably 1% or more, still more preferably 1.5% or more, particularly preferably 2% or more, and most preferably 2.5% or more. In the case where each of the contents of $Y_2O_3$, $La_2O_3$ and $Nb_2O_5$ exceed 8%, the glass is easy to devitrify during melting, and the quality of the chemically strengthened glass may be deteriorated. Each of the contents of $Y_2O_3$, $La_2O_3$ and $Nb_2O_5$ are preferably 8% or less, more preferably 6% or less, still more preferably 5% or less, particularly preferably 4% or less, and most preferably 3% or less.

$Ta_2O_5$ and $Gd_2O_3$ may be contained in small amounts in order to improve breaking resistance of the chemically strengthened glass, but they increase refractive index and reflectivity, and therefore, those are preferably 1% or less, and more preferably 0.5% or less, and it is still more preferred that those are not contained.

In coloring a glass and using it, a coloring component may be added in a range such that the achievement of the desired chemical strengthening property is not impaired. Preferred examples of the coloring component include $Co_3O_4$, $MnO_2$, $Fe_2O_3$, NiO, CuO, $Cr_2O_3$, $V_2O_5$, $Bi_2O_3$, $SeO_2$, $TiO_2$, $CeO_2$, $Er_2O_3$, and $Nd_2O_3$.

The total content of the coloring components is preferably a range of 7% or less in mole percentage on an oxide basis. When it exceeds 7%, a glass is easy to devitrify, which is not desirable. The content is preferably 5% or less, more preferably 3% or less, and still more preferably 1% or less. In the case of prioritize visible light transmittance of a glass, it is preferred that those components are not substantially contained.

$SO_3$, a chloride, a fluoride, and the like may be appropriately contained as a fining agent in melting a glass. It is preferred that $As_2O_3$ is not contained. When $Sb_2O_3$ is contained, it is preferably 0.3% or less, and more preferably 0.1% or less. Most preferably, it is not contained.

Antibacterial activity can be imparted to the chemically strengthened glass of the present invention by having silver ions on the surface thereof.

The glass for chemical strengthening has a fracture toughness value (K1c) of preferably 0.7 $MPa \cdot mm^{1/2}$ or more, more preferably 0.75 $MPa \cdot m^{1/2}$ or more, still more preferably 0.77 $MPa \cdot mm^{1/2}$ or more, particularly preferably 0.80 $MPa \cdot m^{1/2}$ or more, and most preferably 0.82 $MPa \cdot mm^{1/2}$ or more. When the fracture toughness value (K1c) is 0.7 $MPa \cdot m^{1/2}$ more, the number of fragments of a glass when fractured can be effectively suppressed.

The fracture toughness value (K1c) in the present description is a fracture toughness value obtained by measuring K1-v curve by a DCDC method described in detail in the Examples described hereinafter.

In the chemically strengthened glass of the present invention, it is preferred that an area St ($MPa \cdot \mu m$) of an internal tensile layer is StL(t) ($MPa \cdot \mu m$) or less. When the St is StL(t) or less, the number of fragments is reduced even though the glass is actually fractured.

In the chemically strengthened glass of the present invention, it is preferred that the internal tensile stress CT (MPa) is CTL(t) (MPa) or less. When the CT is CTL(t) or less, the number of fragments is reduced even though the glass is actually fractured.

In the present invention, it is preferred that Young's modulus of the glass for chemical strengthening is 70 GPa or more and additionally the difference between the compressive stress value ($CS_0$) on the outermost surface of the chemically strengthened glass and the compressive stress value ($CS_1$) of a portion at a depth of 1 μm from the glass surface is 50 MPa or less. This is preferred in that warp is difficult to be caused when a polishing treatment of a glass surface has been conducted after the chemical strengthening treatment.

Young's modulus of the glass for chemical strengthening is more preferably 74 GPa or more, particularly preferably 78 GPa or more, and still more preferably 82 GPa or more. The upper limit of the Young's modulus is not particularly limited, but is, for example, 90 GPa or less, and preferably 88 GPa or less. The Young's modulus can be measured by, for example, an ultrasonic pulse method.

The difference between $CS_0$ and $CS_1$ is preferably 50 MPa or less, more preferably 40 MPa or less, and still more preferably 30 MPa or less.

The $CS_0$ is preferably 300 MPa or more, more preferably 350 MPa or more, and still more preferably 400 MPa or more. On the other hand, the upper limit of the $CS_0$ is not particularly limited, but is, for example, 1200 MPa or less, preferably 1000 MPa or less, and more preferably 800 MPa or less.

The $CS_1$ is preferably 250 MPa or more, more preferably 300 MPa or more, and still more preferably 350 MPa or more. On the other hand, the upper limit of the $CS_1$ is not particularly limited, but is, for example, 1150 MPa or less, preferably 1100 MPa or less, and more preferably 1050 MPa or less.

The chemically strengthened glass of the present invention can be manufactured, for example, as follows.

A glass to be subjected to a chemical strengthening treatment is prepared. The glass to be subjected to a chemical strengthening treatment is preferably the glass for chemical strengthening of the present invention. The glass to be subjected to a chemical strengthening treatment can be produced by a conventional method. For example, raw materials for each component of a glass are mixed, and heated and melted in a glass melting furnace. Thereafter, the glass is homogenized by a conventional method, formed into a desired shape such as a glass sheet, and then annealed.

Examples of the forming method of a glass sheet include a float process, a press process, a fusion process, and a downdraw process. In particular, a float process suitable for mass production is preferred. A continuous forming method other than the float process, that is, a fusion process and a downdraw process, are also preferred.

The formed glass is subjected to grinding and polishing treatments as necessary to form a glass substrate. When the glass substrate is cut into desired shape and size and chamfering of a glass substrate is conducted, if the cutting and chamfering of the glass substrate are conducted before conducting the chemical strengthening treatment described hereinafter, a compressive stress layer is also formed at the edge of the glass substrate by the subsequent chemical strengthening treatment, and this is preferred.

After the glass sheet obtained has been subjected to the chemical strengthening treatment, cleaning and drying are performed. Thus, the chemically strengthened glass of the present invention can be manufactured.

The chemical strengthening treatment can be conducted by a conventional method. In the chemical strengthening treatment, a glass sheet is, by dipping or the like, brought into contact with a melt of a metal salt (for example, potassium nitrate) containing metal ions (typically, K ions) having large ionic radius, thereby metal ions (typically, Na ions or Li ions) having small ionic radium in the glass sheet are substituted with metal ions having large ionic radius.

The chemical strengthening treatment (ion exchange treatment) is not particularly limited, but, for example, can be conducted by dipping the glass sheet in a molten salt such as potassium nitrate heated to 360 to 600° C. for 0.1 to 500 hours. The heating temperature of the molten salt is preferably 375 to 500° C., and the dipping time of the glass sheet in the molten salt is preferably 0.3 to 200 hours.

Examples of the molten salt for conducting the chemical strengthening treatment include a nitrate, a sulfate, a carbonate, and a chloride. Examples of the nitrate include lithium nitrate, sodium nitrate, potassium nitrate, cesium nitrate, and silver nitrate. Examples of the sulfate include lithium sulfate, sodium sulfate, potassium sulfate, cesium sulfate, and silver sulfate. Examples of the carbonate include lithium carbonate, sodium carbonate and potassium carbonate. Examples of the chloride include lithium chloride, sodium chloride, potassium chloride, cesium chloride, and silver chloride. Those molten salts may be used alone or may be used as combinations of two or more thereof.

In the present invention, the treatment conditions of the chemical strengthening treatment are not particularly limited, and suitable conditions are selected considering property and composition of a glass, the kind of a molten salt, and chemical strengthening properties such as surface compressive stress (CS) and a depth of a compressive stress layer (DOL), desired in the chemically strengthened glass finally obtained.

In the present invention, the chemical strengthening treatment may be conducted only one time, or plural chemical strengthening treatments (multistage strengthening) may be conducted under two or more different conditions. For example, when the chemical strengthening treatment is conducted as a first stage chemical strengthening treatment under the conditions that CS relatively decreases and the chemical strengthening treatment is then conducted as a second stage chemical strengthening treatment under the conditions that CS relatively increases, the internal tensile stress area (St) can be suppressed while increasing CS of the outermost surface of the chemically strengthened glass, and as a result, internal tensile stress (CS) can be suppressed low.

The chemically strengthened glass of the present invention is particularly useful as a cover glass used in mobile devices such as a mobile phone, a smart phone, a portable digital assistant (PDA), and a tablet terminal. It is also useful as a cover glass of display devices that are not for the purpose of mobile, such as a television (TV), a personal computer (PC) and a touch panel, a wall surface of an elevator, a wall surface (whole surface display) of buildings such as a house and a building, a building material such as a widow glass, a table top, and an interior material of automobiles and airplanes, and a cover glass thereof, and in the uses as housings having a curved shape, not a sheet shape, by bending or forming.

Examples

The present invention is described below by reference to Examples, but the present invention is not construed as being limited to those. In each measurement result in the Tables, blank columns indicate "Unmeasured".

(Manufacturing of Chemically Strengthened Glass)

Chemically strengthened glasses of Examples S-1 to S-13, S-15 to S-29 and S-31 to S-53 and glasses of Examples S-14 and S-30, shown in Tables 1 to 9 were manufactured as follows.

Regarding Examples S-1 to S-6, S-13 to S-23 and S-30 to S-33, glass sheets were prepared by a float furnace so as to have each glass composition in mole percentage on an oxide basis shown in the Tables. Glass raw materials generally used, such as an oxide, a hydroxide, a carbonate, and a nitrate, were appropriately selected, and melted in a melting furnace, followed by forming into a sheet having a sheet thickness t of 1.1 to 1.3 mm by a float process. The sheet glass obtained was cut and grinded, and the both surfaces thereof were mirror-polished to obtain a sheet-shaped glass having a size of 50 mm vertical×50 mm horizontal×sheet thickness t (mm). The sheet thickness t (mm) is shown in the Tables.

Regarding the glasses of Examples S-7 to S-12, S-24 to S-29 and S-34 to S-53, glass sheets were prepared by melting in a platinum crucible so as to have each glass composition in mole percentage on an oxide basis shown in the Tables. Glass raw materials generally used, such as an oxide, a hydroxide, a carbonate, and a nitrate, were appropriately selected, and weighed so as to be 1000 gas a glass. The mixed raw materials were placed in a platinum crucible, and placed in a resistance heating electric furnace of 1500 to 1700° C. to melt for about 3 hours, followed by defoaming and homogenizing. The molten glass obtained was poured into a mold material, maintained at a temperature of glass transition point+50° C. for 1 hour, and then cooled to room temperature in a rate of 0.5° C./min. Thus, a glass block was obtained. The glass block obtained was cut and grinded, and both surfaces thereof were finally mirror-finished to obtain a sheet-shaped glass having a size of 50 mm vertical×50 mm horizontal×sheet thickness t (mm). The sheet thickness t (mm) is shown in the Tables.

Each glass of Examples S-1 to 5-13, 5-15 to S-29 and 5-31 to 5-53 was subjected to a chemical strengthening treatment to obtain a chemically strengthened glass. Chemical strengthening treatment conditions of each glass are shown in the Tables.

The glasses of Examples 5-14 and 5-30 were not subjected to the chemical strengthening treatment.

Regarding each of the chemically strengthened glasses of Examples S-1 to S-13 and S-15 to S-27, surface compressive stress CS (unit: MPa), a thickness of a compressive stress layer DOL (unit: μm), internal tensile stress CT (unit: MPa), a compressive stress value $CS_X$ (unit: MPa) of the portion at a depth of x μm from a glass surface, the product $CS_X \times t^2$ (unit: MPa·mm$^2$) of a compressive stress value of the portion at a depth of x μm from a glass surface and the square of a sheet thickness t (mm), and a depth $d_h$ (unit: m) from a glass surface at which a compressive stress value is ½ of surface compressive stress were measured by a surface stress meter FSM-6000 manufactured by Orihara Manufacturing Co., Ltd. and an attachment program Fsm V. Regarding Examples S-28 to S-29, S-31 to S-37, S-39, S-42, and S-44, CS, DOL, CT, $CS_X$, $CS_X \times t^2$, and $d_h$ were measured by a method using birefringence imaging system Abrio-IM manufactured by Tokyo Instruments, Inc. and a thinned sample. Regarding S-38, S-40, S-41, S-43, and S-45 to S-53, CS was measured by a surface stress meter FSM-6000 manufactured by Orihara Manufacturing Co., Ltd., and DOL, CT, $CS_X$, $CS_X \times t^2$, and $d_h$ were measured by a method using the above described Abrio-IM and a thinned sample. Those results are shown in the Tables.

In some Examples, Sc value (unit: MPa·μm), $\Delta CS_{100-90}$ (unit: MPa/μm), $CS_{DOL-20}$ (unit: MPa), and $\Delta CS_{DOL-20}$ (unit: MPa) are also shown.

Regarding each of Examples S-1 to S-53, X and Z values were calculated based on the composition of the glass. Regarding each chemically strengthened glass of Examples S-1 to S-13, 5-15 to S-29 and S-31 to S-53, X and Z values were calculated based on the glass composition (matrix composition of chemically strengthened glass) before the chemical strengthening treatment. Those results are shown in the Tables.

<Devitrification T>

A glass before chemical strengthening was pulverized, classified by using sieves of 4 mm mesh and 2 mm mesh, cleaned with pure water and dried to obtain cullet. 2 to 5 g of the cullet was placed on a platinum dish, held in an electric furnace maintained at constant temperature for 17 hours, taken out in the air at room temperature and cooled, and presence or absence of devitrification was observed with a polarizing microscope. This operation was repeated, and the devitrification temperature T was estimated. The results are shown in Table 1. In the expression that the devitrification temperature T is T1-T2, devitrification was present at T1 and devitrification was absent at T2.

<T4>

Regarding a glass before chemical strengthening, temperature T4 at which a viscosity reaches $10^4$ dPa·s was measured by a rotary viscometer (according to ASTM C 956-96). The results are shown in the Tables. The numerical value with * is a calculated value.

<Drop-On-Sand Test>

The chemically strengthened glasses of Examples S-1 to S-13, S-15 to S-29 and S-31 to S-45 and the glasses of Examples S-14 and S-30 were subjected to a drop-on-sand test by the following test method, and an average cracking height (unit: mm) was measured.

Figure 3:
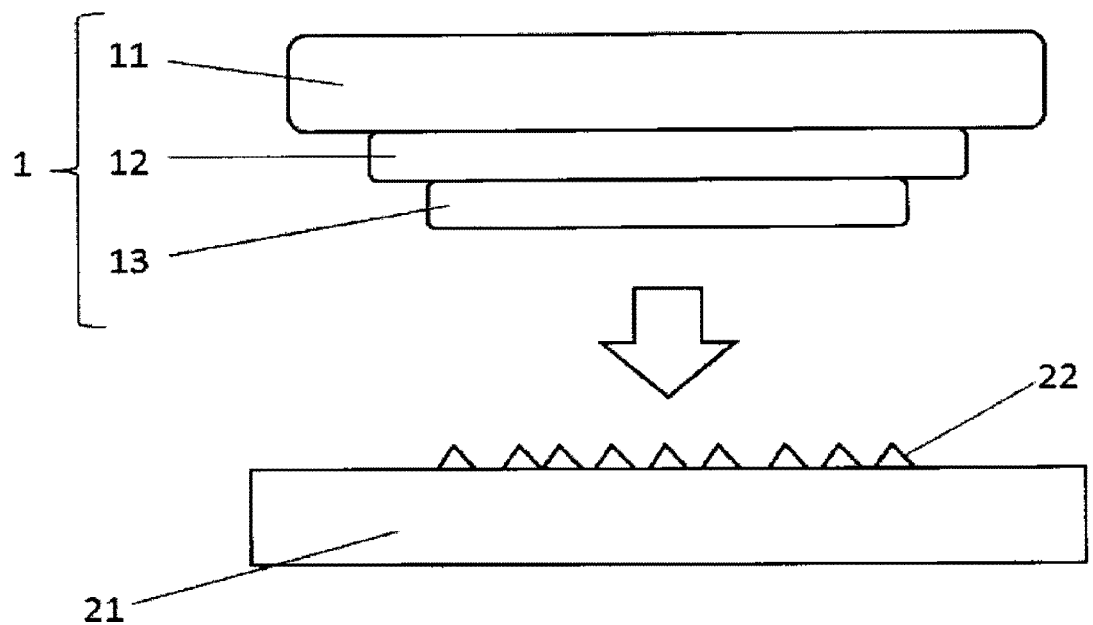
FIG. 3 is a schematic view illustrating a testing method of a drop-on-sand test.

A schematic view illustrating the test method of a drop-on-sand test is shown in FIG. 3. In the following description regarding to the test method of a drop-on-sand test, the chemically strengthened glass is also described as a "glass".

A glass 13 (50 mm×50 mm×sheet thickness t (mm)) was adhered to a hard nylon mock plate 11 (50 mm×50 mm×thickness 18 mm, weight: 54 g) through a sponge double-sided tape 12 (#2310 manufactured by Sekisui Chemical Co., Ltd., 50 mm×50 mm×thickness 3 mm) to prepare a measurement sample 1 (total weight: 61 g). 1 g of silica sand 22 (#5 Silica Sand, manufactured by Takeori Kogyo-Sho) was uniformly applied on SUS plate 21 having a size of 15 cm×15 cm, and the measurement sample 1 prepared was dropped from a predetermined height (drop height) on the SUS plate 21 having the silica sand 22 applied thereon such that the glass 13 faces down. The drop test was started from a drop height of 10 mm, and the height was lifted every 10 mm. The height at which the glass 13 had cracked was defined as a cracking height (unit: mm). The drop test was conducted 5 to 10 times in each Example, and an average value of those cracking heights in the drop test was defined as an average cracking height (unit: mm). Those results are shown in the Tables.

Figure 4:
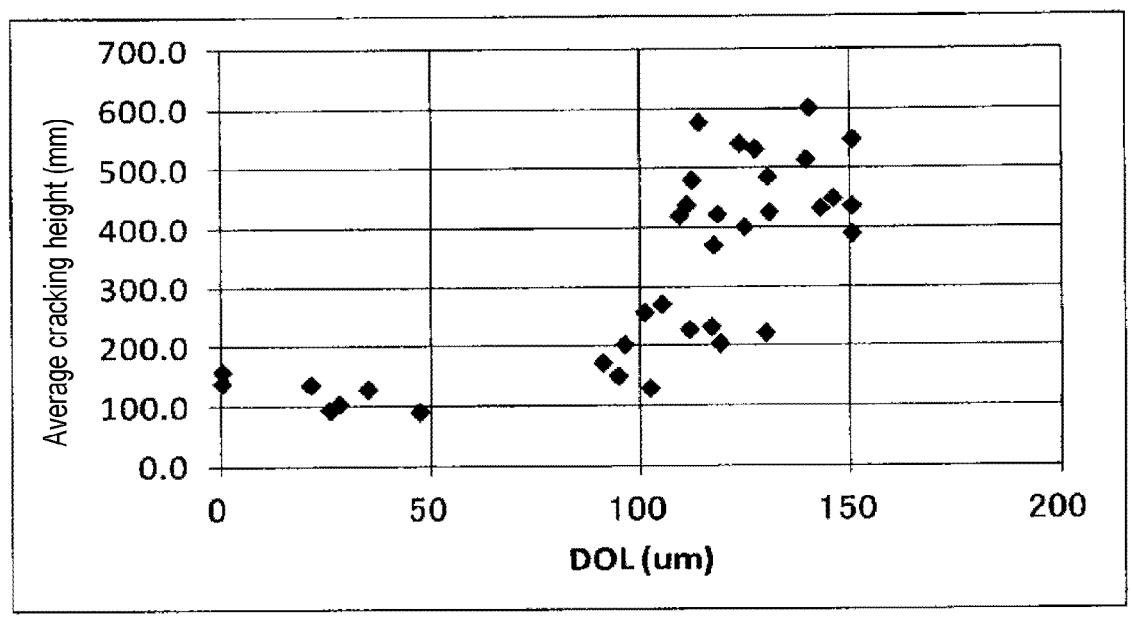
FIG. 4 is a graph plotting the relationship between DOL and an average cracking height, of a chemically strengthened glass or a glass.

A graph plotting the relationship between DOL (unit: μm) and the average cracking height (unit: mm), of the chemically strengthened glasses or glasses of Examples S-1 to S-35 is shown in FIG. 4.

Figure 5:
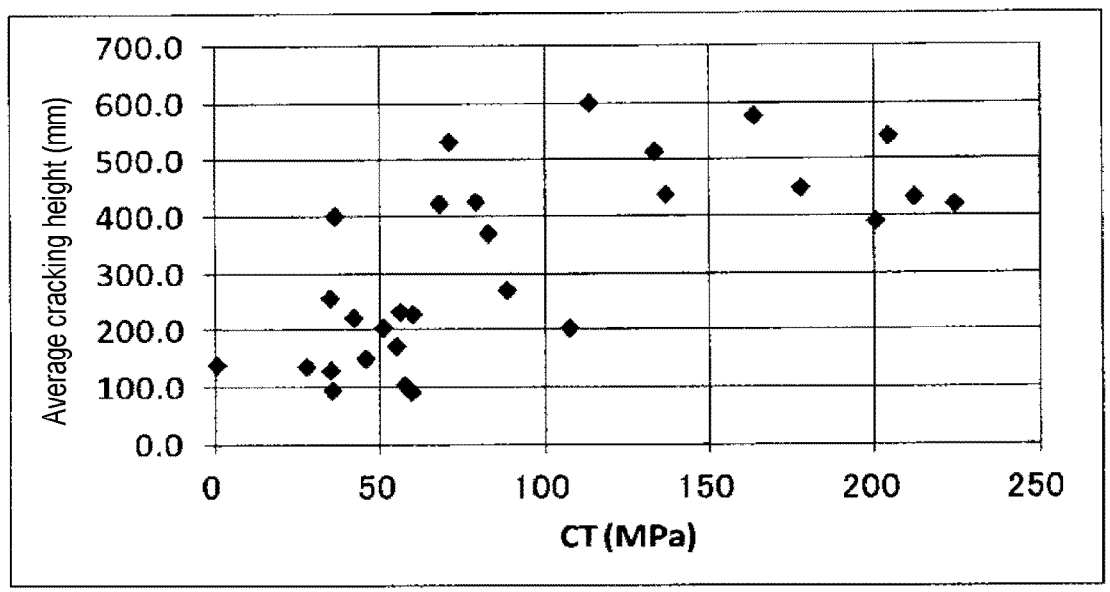
FIG. 5 is a graph plotting the relationship between CT and an average cracking height, of a chemically strengthened glass or a glass.

A graph plotting the relationship between CT (unit: MPa) and the average cracking height (unit: mm), of the chemically strengthened glasses or glasses of Examples S-1 to S-35 is shown in FIG. 5.

Figure 6:
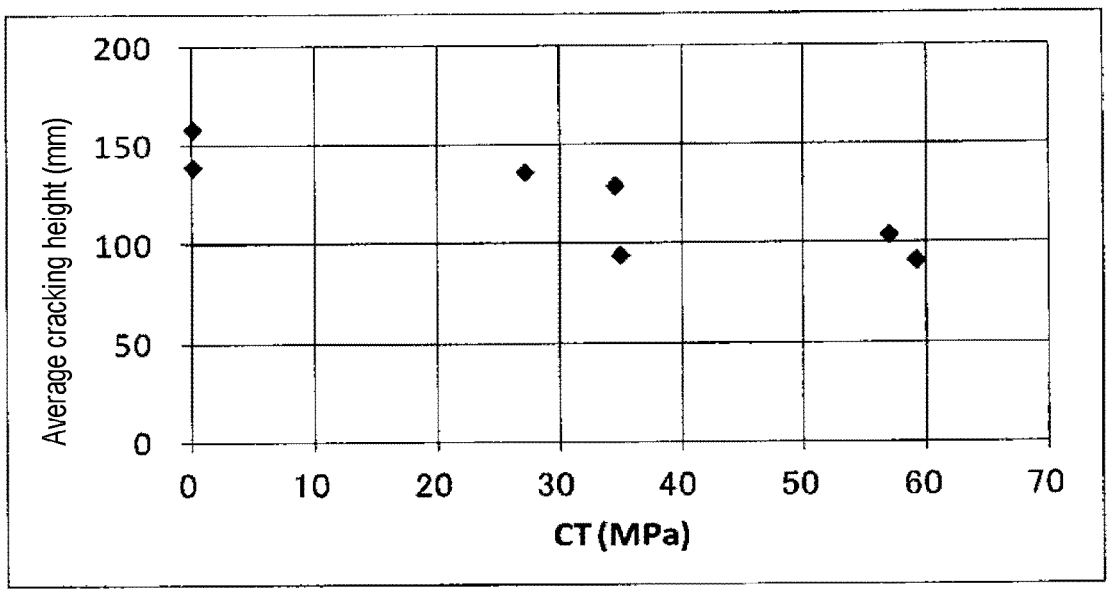
FIG. 6 is a graph plotting the relationship between CT and an average cracking height, of a chemically strengthened glass.

Regarding the Examples in which DOL is less than 50 μm of the chemically strengthened glasses of Examples S-1 to S-35, a graph plotting the relationship between CT (unit: MPa) and the average cracking height (unit: mm), of the glasses is shown in FIG. 6.

Figure 7:
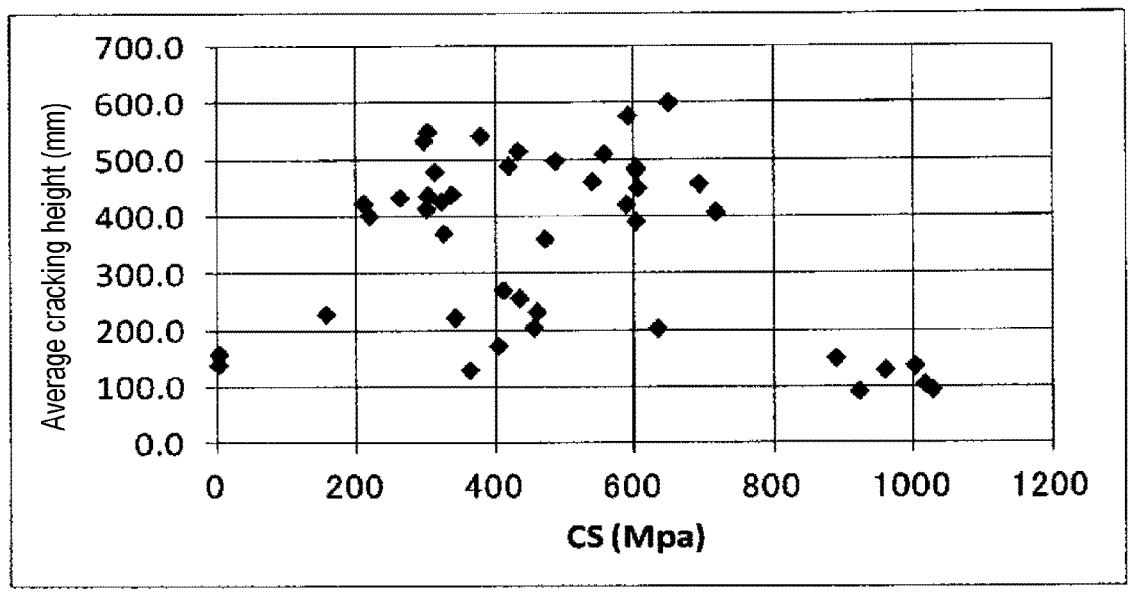
FIG. 7 is a graph plotting the relationship between a surface compressive stress value CS and an average cracking height, of a chemically strengthened glass or a glass.
Figure 8:
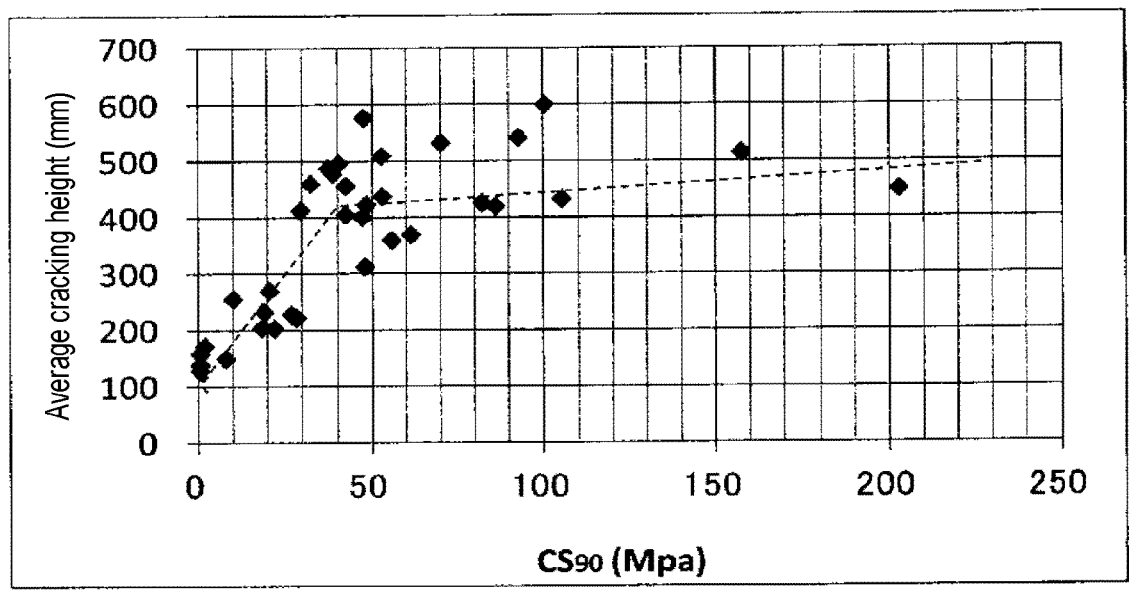
FIG. 8 is a graph plotting the relationship between a compressive stress value $CS_{90}$ and an average cracking height, of a chemically strengthened glass or a glass.
Figure 9:
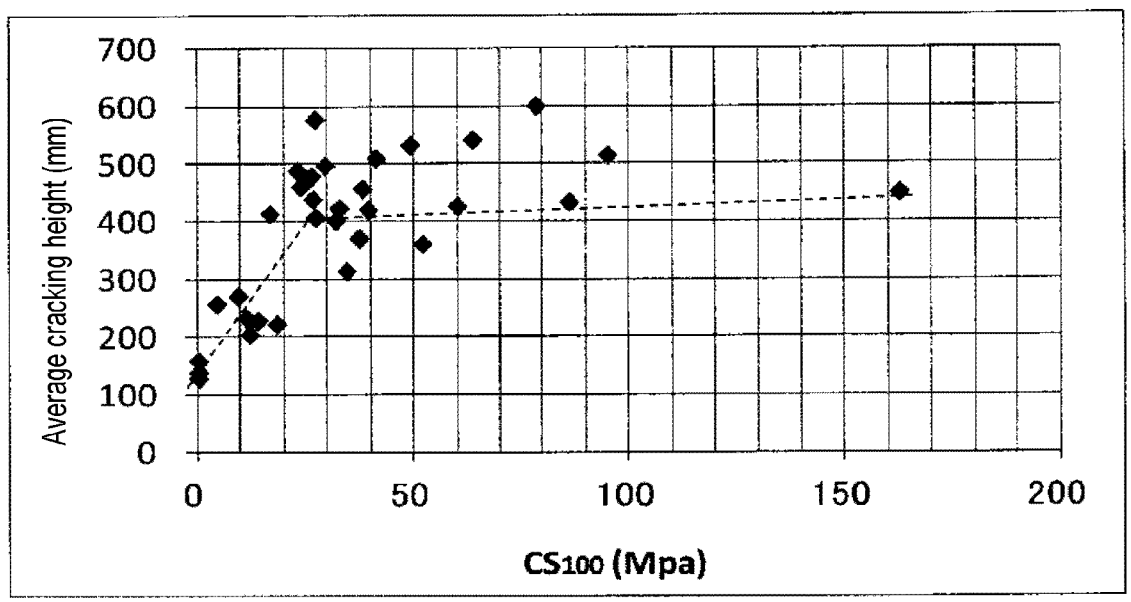
FIG. 9 is a graph plotting the relationship between a compressive stress value $CS_{100}$ and an average cracking height, of a chemically strengthened glass or a glass.

A graph plotting the relationship between surface compressive stress value CS (unit: MPa) and the average cracking height (unit: mm), of the chemically strengthened glasses or glasses of Examples S-1 to S-35 is shown in FIG. 7. A graph plotting the relationship between a compressive stress value $CS_{90}$ (unit: MPa) of the portion at a depth of 90 μm from the glass surface and the average cracking height (mm), of the chemically strengthened glasses or the glasses of Examples S-1 to S-35 is shown in FIG. 8. A graph plotting the relationship between a compressive stress value $CS_{100}$ (unit: MPa) of the portion at a depth of 100 μm from the glass surface and the average cracking height (mm), of the chemically strengthened glasses or the glasses of Examples S-1 to S-35 is shown in FIG. 9.

Figure 10:
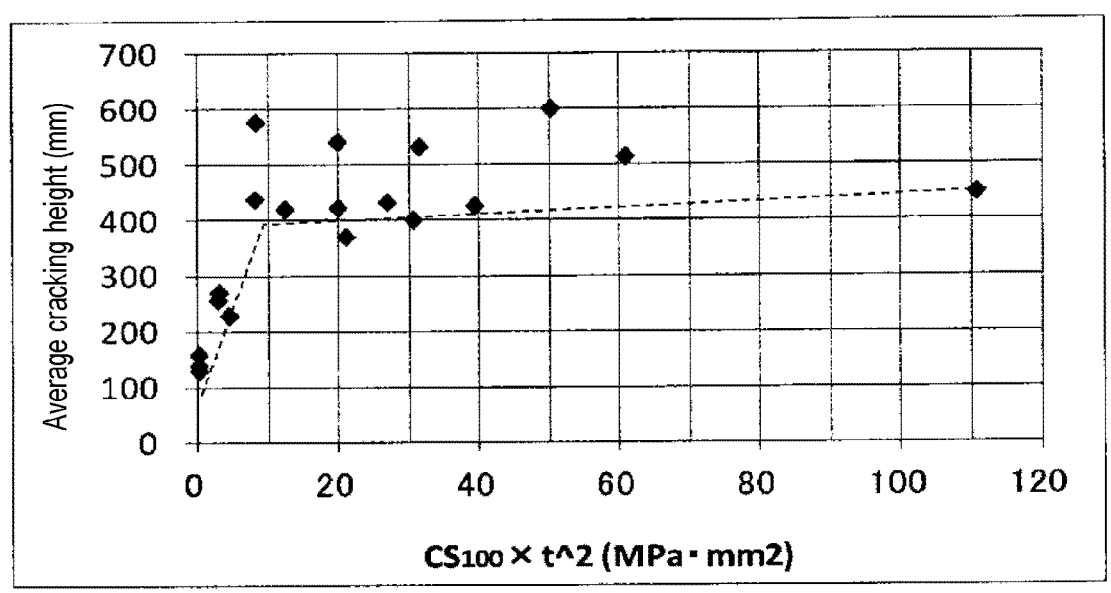
FIG. 10 is a graph showing the relationship between the product ($CS_{100} \times t^2$) of a compressive stress value $CS_{100}$ and the square of a sheet thickness t and an average cracking height, of a chemically strengthened glass or a glass.

A graph plotting the relationship between the product ($CS_{100} \times t^2$) (unit: MPa·mm²) of the compressive stress value $CS_{100}$ (unit: MPa) of the portion at a depth of 100 μm from the glass surface and the square of a sheet thickness t (mm) and the average cracking height (mm), of the chemically strengthened glasses or the glasses of Examples S-1 to S-35 is shown in FIG. 10.

TABLE 1

| | | Ex. S-1 | Ex. S-2 | Ex. S-3 | Ex. S-4 | Ex. S-5 | Ex. S-6 |
|---|---|---|---|---|---|---|---|
| Sample sheet thickness (mm) | | 0.55 | 0.558 | 0.558 | 0.558 | 0.558 | 0.558 |
| Composition component (mol %) | $SiO_2$ | 67.58 | 67.58 | 67.58 | 67.58 | 67.58 | 67.58 |
| | $Al_2O_3$ | 10.08 | 10.08 | 10.08 | 10.08 | 10.08 | 10.08 |
| | $B_2O_3$ | 0.00 | 0.00 | 0.00 | 0.00 | 0.00 | 0.00 |
| | $P_2O_5$ | 0.00 | 0.00 | 0.00 | 0.00 | 0.00 | 0.00 |
| | $Li_2O$ | | | | | | |
| | $Na_2O$ | 14.17 | 14.17 | 14.17 | 14.17 | 14.17 | 14.17 |
| | $K_2O$ | 0.05 | 0.05 | 0.05 | 0.05 | 0.05 | 0.05 |
| | MgO | 8.01 | 8.01 | 8.01 | 8.01 | 8.01 | 8.01 |
| | CaO | 0.06 | 0.06 | 0.06 | 0.06 | 0.06 | 0.06 |
| | SrO | 0.01 | 0.01 | 0.01 | 0.01 | 0.01 | 0.01 |
| | BaO | | | | | | |
| | ZnO | | | | | | |
| | $TiO_2$ | | | | | | |
| | $ZrO_2$ | 0.04 | 0.04 | 0.04 | 0.04 | 0.04 | 0.04 |
| | SUM | 100 | 100 | 100 | 100 | 100 | 100 |
| | X value | 40738 | 40738 | 40738 | 40738 | 40738 | 40738 |
| | Z value | 27245 | 27245 | 27245 | 27245 | 27245 | 27245 |
| | T (° C.) | 1210-1220 | 1210-1220 | 1210-1220 | 1210-1220 | 1210-1220 | 1210-1220 |
| | T4 (° C.) | 1263 | 1263 | 1263 | 1263 | 1263 | 1263 |
| First stage chemical strengthening conditions | $KNO_3$ concentration (wt %) | 100 | 100 | 100 | 100 | 50 | 40 |
| | $NaNO_3$ concentration (wt %) | | | | | 50 | 60 |
| | Strengthening temperature (° C.) | 425 | 550 | 450 | 500 | 450 | 450 |
| | Strengthening time (h) | 4 | 19 | 133 | 40 | 270 | 340 |
| Second stage chemical strengthening conditions | $KNO_3$ concentration (wt %) | | | | | | 80 |
| | $NaNO_3$ concentration (wt %) | | | | | | 20 |
| | Strengthening temperature (° C.) | | | | | | 450 |
| | Strengthening time (h) | | | | | | 4 |
| Strengthening profile | CS (MPa) | 1014.0 | 259.5 | 586.1 | 376.1 | 153.7 | 408.4 |
| | DOL (μm) | 27.7 | 142.5 | 109.0 | 123.3 | 111.4 | 104.8 |

TABLE 1-continued

| Sample sheet thickness (mm) | Ex. S-1 0.55 | Ex. S-2 0.558 | Ex. S-3 0.558 | Ex. S-4 0.558 | Ex. S-5 0.558 | Ex. S-6 0.558 |
|---|---|---|---|---|---|---|
| CT (MPa) | 56.8 | 211.6 | 223.8 | 203.7 | 59.3 | 88.0 |
| $d_h$ (μm) |  | 76 | 50 | 58 | 53 | 17 |
| Sc value |  | 38911 | 61103 | 44740 | 16568 | 22306 |
| CS@DOL 120 μm (MPa) |  | 46.7 | −44.5 | 8.6 | −9.9 | −15.4 |
| CS@DOL 110 μm (MPa) |  | 66.5 | −4.2 | 35.5 | 1.6 | −4.2 |
| CS@DOL 100 μm (MPa) |  | 85.9 | 39.2 | 63.3 | 13.7 | 9.1 |
| CS@DOL 90 μm (MPa) |  | 104.7 | 85.4 | 92.0 | 26.3 | 20.0 |
| CS@DOL 50 μm (MPa) |  | 176.0 | 294.1 | 214.0 | 80.7 | 69.9 |
| CS@DOL 30 μm (MPa) |  | 209.8 | 408.5 | 278.1 | 109.5 | 118.7 |
| CS@DOL 120 μm*($t^2$) |  | 14.5 | −13.8 | 2.7 | −3.1 | −4.8 |
| CS@DOL 110 μm*($t^2$) |  | 20.7 | −1.3 | 11.1 | 0.5 | −1.3 |
| CS@DOL 100 μm*($t^2$) |  | 26.7 | 12.2 | 19.7 | 4.3 | 2.8 |
| CS@DOL 90 μm*($t^2$) |  | 32.6 | 26.6 | 28.7 | 8.2 | 6.2 |
| CS@DOL 50 μm*($t^2$) |  | 54.8 | 91.6 | 66.6 | 25.1 | 21.8 |
| CS@DOL 30 μm*($t^2$) |  | 65.3 | 127.2 | 86.6 | 34.1 | 37.0 |
| Average value of cracking height in drop-on-sand test (mm) | 104.0 | 432.5 | 420.0 | 541.0 | 228.0 | 270.0 |
| $\Delta CS_{100\text{-}90}$ (MPa/μm) |  | 1.88 | 4.63 | 2.87 | 1.26 | 1.08 |

TABLE 2

| | | Ex. S-7 0.55 | Ex. S-8 0.55 | Ex. S-9 0.55 | Ex. S-10 0.8 | Ex. S-11 0.8 | Ex. S-12 0.8 |
|---|---|---|---|---|---|---|---|
| Sample sheet thickness (mm) | | | | | | | |
| Composition component (mol %) | $SiO_2$ | 68 | 68 | 68 | 68 | 68 | 68 |
| | $Al_2O_3$ | 10 | 10 | 10 | 10 | 10 | 10 |
| | $B_2O_3$ | | | | | | |
| | $P_2O_5$ | | | | | | |
| | $Li_2O$ | | | | | | |
| | $Na_2O$ | 8 | 8 | 8 | 8 | 8 | 8 |
| | $K_2O$ | | | | | | |
| | MgO | 14 | 14 | 14 | 14 | 14 | 14 |
| | CaO | | | | | | |
| | SrO | | | | | | |
| | BaO | | | | | | |
| | ZnO | | | | | | |
| | $TiO_2$ | | | | | | |
| | $ZrO_2$ | | | | | | |
| | SUM | 100 | 100 | 100 | 100 | 100 | 100 |
| | X value | 47832 | 47832 | 47832 | 47832 | 47832 | 47832 |
| | Z value | 30950 | 30950 | 30950 | 30950 | 30950 | 30950 |
| | T (° C.) | 1400 or higher | 1400 or higher | 1400 or higher | 1400 or higher | 1400 or higher | 1400 or higher |
| | T4 (° C.) | *1312 | *1312 | *1312 | *1312 | *1312 | *1312 |
| First stage chemical strengthening conditions | $KNO_3$ concentration (wt %) | 80 | 80 | 80 | 80 | 80 | 80 |
| | $NaNO_3$ concentration (wt %) | 20 | 20 | 20 | 20 | 20 | 20 |
| | Strengthening temperature (° C.) | 500 | 500 | 500 | 500 | 500 | 500 |
| | Strengthening time (h) | 578 | 578 | 578 | 578 | 578 | 578 |
| Second stage chemical strengthening conditions | $KNO_3$ concentration (wt %) | | 100 | 100 | | 100 | 100 |
| | $NaNO_3$ concentration (wt %) | | | | | | |
| | Strengthening temperature (° C.) | | 500 | 500 | | 500 | 500 |
| | Strengthening time (h) | | 1 | 3 | | 1 | 3 |
| Strengthening profile | CS (MPa) | 334.6 | 600.0 | 588.6 | 294.1 | 600.0 | 647.2 |
| | DOL (μm) | 110.7 | 112.0 | 113.4 | 127.0 | 130.0 | 139.8 |
| | CT (MPa) | 136.4 | | 163.1 | 70.5 | | 113.1 |
| | $d_h$ (μm) | 64 | | 19 | 56 | | 22 |
| | Sc value | | | | | | |
| | CS@DOL 120 μm (MPa) | −21.6 | | −12.2 | 11.6 | | 37.3 |
| | CS@DOL 110 μm (MPa) | 1.6 | | 7.0 | 29.5 | | 57.4 |
| | CS@DOL 100 μm (MPa) | 26.4 | | 26.8 | 48.9 | | 78.2 |
| | CS@DOL 90 μm (MPa) | 52.6 | | 47.2 | 69.6 | | 99.7 |
| | CS@DOL 50 μm (MPa) | 170.2 | | 134.5 | 162.9 | | 191.9 |
| | CS@DOL 30 μm (MPa) | 234.5 | | 206.9 | 214.2 | | 263.5 |
| | CS@DOL 120 μm*($t^2$) | −6.5 | | −3.7 | 7.4 | | 23.9 |
| | CS@DOL 110 μm*($t^2$) | 0.5 | | 2.1 | 18.9 | | 36.7 |
| | CS@DOL 100 μm*($t^2$) | 8.0 | | 8.1 | 31.3 | | 50.0 |
| | CS@DOL 90 μm*($t^2$) | 15.9 | | 14.3 | 44.5 | | 63.8 |

TABLE 2-continued

| | No. | | | | | |
|---|---|---|---|---|---|---|
| | Ex. S-7 | Ex. S-8 | Ex. S-9 | Ex. S-10 | Ex. S-11 | Ex. S-12 |
| Sample sheet thickness (mm) | 0.55 | 0.55 | 0.55 | 0.8 | 0.8 | 0.8 |
| CS ®DOL 50 μm*(t^2) | 51.5 | | 40.7 | 104.2 | | 122.8 |
| CS@DOL 30 μm*(t^2) | 70.9 | | 62.6 | 137.1 | | 168.6 |
| Average value of cracking height in drop-on-sand test (mm) | 438.0 | 480.0 | 576.7 | 532.0 | 485.0 | 600.0 |
| $\Delta CS_{100-90}$ (MPa/μm) | 2.63 | | 2.04 | 2.07 | | 2.15 |

TABLE 3

| | | No. | | | | | |
|---|---|---|---|---|---|---|---|
| | | Ex. S-13 | Ex. S-14 | Ex. S-15 | Ex. S-16 | Ex. S-17 | Ex. S-18 |
| Sample sheet thickness (mm) | | 0.78 | 0.825 | 0.825 | 0.825 | 0.825 | 0.809 |
| Composition component (mol %) | $SiO_2$ | 67.58 | 67.58 | 67.58 | 67.58 | 67.58 | 67.58 |
| | $Al_2O_3$ | 10.08 | 10.08 | 10.08 | 10.08 | 10.08 | 10.08 |
| | $B_2O_3$ | 0.00 | 0.00 | 0.00 | 0.00 | 0.00 | 0.00 |
| | $P_2O_5$ | 0.00 | 0.00 | 0.00 | 0.00 | 0.00 | 0.00 |
| | $Li_2O$ | | | | | | |
| | $Na_2O$ | 14.17 | 14.17 | 14.17 | 14.17 | 14.17 | 14.17 |
| | $K_2O$ | 0.05 | 0.05 | 0.05 | 0.05 | 0.05 | 0.05 |
| | MgO | 8.01 | 8.01 | 8.01 | 8.01 | 8.01 | 8.01 |
| | CaO | 0.06 | 0.06 | 0.06 | 0.06 | 0.06 | 0.06 |
| | SrO | 0.01 | 0.01 | 0.01 | 0.01 | 0.01 | 0.01 |
| | BaO | | | | | | |
| | ZnO | | | | | | |
| | $TiO_2$ | | | | | | |
| | $ZrO_2$ | 0.04 | 0.04 | 0.04 | 0.04 | 0.04 | 0.04 |
| | SUM | 100 | 100 | 100 | 100 | 100 | 100 |
| | X value | 40738 | 40738 | 40738 | 40738 | 40738 | 40738 |
| | Z value | 27245 | 27245 | 27245 | 27245 | 27245 | 27245 |
| | T (° C.) | 1210-1220 | 1210-1220 | 1210-1220 | 1210-1220 | 1210-1220 | 1210-1220 |
| | T4 (° C.) | 1263 | 1263 | 1263 | 1263 | 1263 | 1263 |
| First stage chemical strengthening conditions | $KNO_3$ concentration (wt %) | 50 | No strengthening treatment | 100 | 100 | 100 | 70 |
| | $NaNO_3$ concentration (wt %) | 50 | No strengthening treatment | | | | 30 |
| | Strengthening temperature (° C.) | 450 | | 450 | 450 | 450 | 450 |
| | Strengthening time (h) | 270 | | 4 hr | 6 hr | | 159 |
| Second stage chemical strengthening conditions | $KNO_3$ concentration (wt %) | | | | | | |
| | $NaNO_3$ concentration (wt %) | | | | | | |
| | Strengthening temperature (° C.) | | | | | | |
| | Strengthening time (h) | | | | | | |
| Strengthening profile | CS (MPa) | 208.0 | 0.0 | 957.3 | 920.0 | 602.8 | 319.3 |
| | DOL (μm) | 118.1 | 0.0 | 34.6 | 46.9 | 145.5 | 130.4 |
| | CT (MPa) | 67.5 | 0.0 | 34.5 | 59.0 | 177.3 | 78.7 |
| | $d_h$ (μm) | 59 | | 16 | | 67 | 62 |
| | Sc value | 34238 | | 31334 | | 82538 | 38312 |
| | CS@DOL 120 μm (MPa) | −2.4 | 0.0 | 0.0 | | 86.6 | 12.1 |
| | CS@DOL 110 μm (MPa) | 7.4 | 0.0 | 0.0 | | 123.7 | 35.8 |
| | CS@DOL 100 μm (MPa) | 32.5 | 0.0 | 0.0 | | 162.3 | 59.9 |
| | CS@DOL 90 μm (MPa) | 48.0 | 0.0 | 0.0 | | 202.4 | 81.6 |
| | CS@DOL 50 μm (MPa) | 121.8 | 0.0 | 0.0 | | 373.8 | 193.4 |
| | CS@DOL 30 μm (MPa) | 158.4 | 0.0 | 104.2 | | 464.3 | 251.3 |
| | CS@DOL 120 μm*(t^2) | −1.5 | 0.0 | 0.0 | | 58.9 | 7.9 |
| | CS@DOL 110 μm*(t^2) | 4.5 | 0.0 | 0.0 | | 84.2 | 23.4 |
| | CS@DOL 100 μm*(t^2) | 19.8 | 0.0 | 0.0 | | 110.5 | 39.2 |
| | CS@DOL 90 μm*(t^2) | 29.2 | 0.0 | 0.0 | | 137.7 | 53.4 |
| | CS@DOL 50 μm*(t^2) | 74.1 | 0.0 | 0.0 | | 254.4 | 126.6 |
| | CS@DOL 30 μm*(t^2) | 96.3 | 0.0 | 70.9 | | 316.0 | 164.5 |
| | Average value of cracking height in drop-on-sand test (mm) | 422.5 | 139.0 | 129.0 | 91.0 | 449.0 | 426.0 |
| | Number of fragments having size of 25 mm × 25 mm | | | | | | |
| | $\Delta CS_{100-90}$ (MPa/μm) | 1.55 | | | | 4.00 | 2.17 |

TABLE 4

| | | Ex. S-19 | Ex. S-20 | Ex. S-21 | Ex. S-22 | Ex. S-23 | Ex. S-24 |
|---|---|---|---|---|---|---|---|
| | Sample sheet thickness (mm) | 0.979 | 0.75 | 0.75 | 0.75 | 0.75 | 0.8 |
| Composition component (mol %) | $SiO_2$ | 67.58 | 64.2 | 64.2 | 64.2 | 64.2 | 64.48 |
| | $Al_2O_3$ | 10.08 | 8 | 8 | 8 | 8 | 14.38 |
| | $B_2O_3$ | 0.00 | | | | | 5.06 |
| | $P_2O_5$ | 0.00 | | | | | |
| | $Li_2O$ | | | | | | |
| | $Na_2O$ | 14.17 | 12.5 | 12.5 | 12.5 | 12.5 | 13.7 |
| | $K_2O$ | 0.05 | 4 | 4 | 4 | 4 | 0.01 |
| | MgO | 8.01 | 10.5 | 10.5 | 10.5 | 10.5 | 2.31 |
| | CaO | 0.06 | 0.1 | 0.1 | 0.1 | 0.1 | 0.04 |
| | SrO | 0.01 | 0.1 | 0.1 | 0.1 | 0.1 | |
| | BaO | | 0.1 | 0.1 | 0.1 | 0.1 | |
| | ZnO | | | | | | |
| | $TiO_2$ | | | | | | |
| | $ZrO_2$ | 0.04 | 0.5 | 0.5 | 0.5 | 0.5 | |
| | SUM | 100 | 100 | 100 | 100 | 100 | 99.98 |
| | X value | 40738 | | | | | 39224 |
| | Z value | 27245 | | | | | 26120 |
| | T (° C.) | 1210-1220 | 1154 or lower | 1154 or lower | 1154 or lower | 1154 or lower | |
| | T4 (° C.) | 1263 | 1176 | 1176 | 1176 | 1176 | |
| First stage chemical strengthening conditions | $KNO_3$ concentration (wt %) | 50 | 100 | 100 | 100 | 100 | 100 |
| | $NaNO_3$ concentration (wt %) | 50 | | | | | |
| | Strengthening temperature (° C.) | 450 | 450 | 450 | 450 | 450 | 450 |
| | Strengthening time (h) | 217 | | | | | 3 hr |
| Second stage chemical strengthening conditions | $KNO_3$ concentration (wt %) | | | | | | |
| | $NaNO_3$ concentration (wt %) | | | | | | |
| | Strengthening temperature (° C.) | | | | | | |
| | Strengthening time (h) | | | | | | |
| Strengthening profile | CS (MPa) | 216.0 | 401.4 | 322.7 | 631.4 | 600.0 | 1025.0 |
| | DOL (μm) | 124.5 | 90.7 | 117.2 | 95.9 | 150.0 | 25.5 |
| | CT (MPa) | 35.8 | 54.3 | 82.3 | 107.1 | 200.0 | 34.9 |
| | $d_h$ (μm) | 55 | 29 | 53 | 38 | | |
| | Sc value | 24747 | 26914 | 35176 | 51737 | | |
| | CS@DOL 120 μm (MPa) | 5.2 | −45.1 | −5.7 | −72.9 | | |
| | CS@DOL 110 μm (MPa) | 17.8 | −34.0 | 14.9 | −45.3 | | |
| | CS@DOL 100 μm (MPa) | 31.7 | −18.5 | 37.1 | −14.4 | | |
| | CS@DOL 90 μm (MPa) | 46.9 | 1.3 | 60.8 | 21.4 | | |
| | CS@DOL 50 μm (MPa) | 116.7 | 118.8 | 169.0 | 231.3 | | |
| | CS@DOL 30 μm (MPa) | 155.5 | 195.3 | 229.0 | 377.7 | | |
| | CS@DOL 120 μm*(t^2) | 4.9 | −25.4 | −3.2 | −41.0 | | |
| | CS@DOL 110 μm*(t^2) | 17.1 | −19.1 | 8.4 | −25.5 | | |
| | CS@DOL 100 μm*(t^2) | 30.4 | −10.4 | 20.9 | −8.1 | | |
| | CS@DOL 90 μm*(t^2) | 44.9 | 0.7 | 34.2 | 12.0 | | |
| | CS@DOL 50 μm*(t^2) | 111.8 | 66.8 | 95.1 | 130.1 | | |
| | CS@DOL 30 μm*(t^2) | 149.0 | 109.9 | 128.8 | 212.5 | | |
| | Average value of cracking height in drop-on-sand test (mm) | 401.0 | 172.0 | 370.0 | 203.0 | 390.0 | 94.0 |
| | Number of fragments having size of 25 mm × 25 mm | 2 | | | | | |
| | $\Delta CS_{100-90}$ (MPa/μm) | 1.51 | 1.98 | 2.38 | 3.57 | | |

TABLE 5

| | | Ex. S-25 | Ex. S-26 | Ex. S-27 | Ex. S-28 | Ex. S-29 | Ex. S-30 |
|---|---|---|---|---|---|---|---|
| | Sample sheet thickness (mm) | 0.8 | 0.817 | 0.843 | 0.6 | 0.6 | 1.1 |
| Composition component (mol %) | $SiO_2$ | 64.48 | 56.12 | 56.12 | 70 | 70 | 64.5 |
| | $Al_2O_3$ | 14.38 | 17.18 | 17.18 | 6 | 6 | 12 |
| | $B_2O_3$ | 5.06 | | | 0 | 0 | 0 |
| | $P_2O_5$ | | 6.84 | 6.84 | | | |
| | $Li_2O$ | | | | 16 | 16 | 12.8 |
| | $Na_2O$ | 13.7 | 16.77 | 16.77 | 4 | 4 | 5.5 |
| | $K_2O$ | 0.01 | 0.30 | 0.30 | 0 | 0 | 3.4 |
| | MgO | 2.31 | 2.66 | 2.66 | 2 | 2 | 0 |
| | CaO | 0.04 | | | 0 | 0 | 0 |

TABLE 5-continued

|  |  | No. | | | | | |
|---|---|---|---|---|---|---|---|
|  |  | Ex. S-25 | Ex. S-26 | Ex. S-27 | Ex. S-28 | Ex. S-29 | Ex. S-30 |
|  | Sample sheet thickness (mm) | 0.8 | 0.817 | 0.843 | 0.6 | 0.6 | 1.1 |
|  | SrO |  |  |  | 0 | 0 | 0 |
|  | BaO |  |  |  | 0 | 0 | 0 |
|  | ZnO |  |  |  |  |  |  |
|  | $TiO_2$ |  |  |  |  |  |  |
|  | $ZrO_2$ |  |  |  | 2 | 2 | 1.8 |
|  | SUM | 99.98 | 99.88 | 99.88 | 100 | 100 | 100 |
|  | X value | 39224 | 29493 | 29493 | 45332 | 45332 | 41611 |
|  | Z value | 26120 | 19516 | 19516 | 30859 | 30859 | 28306 |
|  | T (° C.) |  |  |  | 1000 or lower | 1000 or lower | 1000-1050 |
|  | T4 (° C.) |  |  |  | 1037 | 1037 | 1063 |
| First stage chemical strengthening conditions | $KNO_3$ concentration (wt %) | 80 | 99.5 | 50 |  |  | No strengthening treatment |
|  | $NaNO_3$ concentration (wt %) | 20 | 0.5 | 50 | 100 | 100 | No strengthening treatment |
|  | Strengthening temperature (° C.) | 450 | 400 | 450 |  |  |  |
|  | Strengthening time (h) | 230 hr | 2 | 20 |  |  |  |
| Second stage chemical strengthening conditions | $KNO_3$ concentration (wt %) |  |  | 96 |  |  |  |
|  | $NaNO_3$ concentration (wt %) |  |  |  |  |  |  |
|  | Strengthening temperature (° C.) |  |  | 400 |  |  |  |
|  | Strengthening time (h) |  |  | 0.33 |  |  |  |
| Strengthening profile | CS (MPa) | 430 | 1000 | 887 | 360 | 300 | 0 |
|  | DOL (μm) | 139 | 21 | 94.3 | 102 | 150 | 0 |
|  | CT (MPa) | 133.0 | 27.1 | 45.0 |  |  |  |
|  | $d_h$ (μm) | 70 |  | 7 |  |  |  |
|  | Sc value | 62383 |  | 28077 |  |  |  |
|  | CS@DOL 120 μm (MPa) | 74.8 |  | −37.5 |  |  | 0 |
|  | CS@DOL 110 μm (MPa) | 100.3 |  | −24.0 |  |  | 0 |
|  | CS@DOL 100 μm (MPa) | 94.8 |  | −9.2 |  |  | 0 |
|  | CS@DOL 90 μm (MPa) | 156.9 |  | 7.4 |  |  | 0 |
|  | CS@DOL 50 μm (MPa) | 263.9 |  | 96.6 |  |  | 0 |
|  | CS@DOL 30 μm (MPa) | 343.0 |  | 154.4 |  |  | 0 |
|  | CS@DOL 120 μm*(t^2) | 47.9 |  | −26.6 |  |  | 0 |
|  | CS@DOL 110 μm*(t^2) | 64.2 |  | −17.1 |  |  | 0 |
|  | CS@DOL 100 μm*(t^2) | 60.7 |  | −6.6 |  |  | 0 |
|  | CS@DOL 90 μm*(t^2) | 100.4 |  | 5.2 |  |  | 0 |
|  | CS@DOL 50 μm*(t^2) | 168.9 |  | 68.6 |  |  | 0 |
|  | CS@DOL 30 μm*(t^2) | 219.5 |  | 109.7 |  |  | 0 |
| Average value of cracking height in drop-on-sand test (mm) |  | 514.0 | 136.0 | 150.0 | 129.0 | 436.0 | 158.0 |
|  | $\Delta CS_{100-90}$ (MPa/μm) | 6.21 |  | 1.66 |  |  |  |
|  | $CS_{DOL-20}$ (MPa) |  |  | 34.3 |  |  |  |
|  | $\Delta CS_{DOL-20}$ (MPa/μm) |  |  | 1.72 |  |  |  |

TABLE 6

|  |  | No. | | | | |
|---|---|---|---|---|---|---|
|  |  | Ex. S-31 | Ex. S-32 | Ex. S-33 | Ex. S-34 | Ex. S-35 |
|  | Sample sheet thickness (mm) | 1.1 | 0.8 | 0.8 | 0.6 | 0.6 |
| Composition component (mol %) | $SiO_2$ | 64.5 | 64.5 | 64.5 | 65.67 | 65.67 |
|  | $Al_2O_3$ | 12 | 12 | 12 | 11.67 | 11.67 |
|  | $B_2O_3$ | 0 | 0 | 0 | 0.41 | 0.41 |
|  | $P_2O_5$ |  |  |  |  |  |
|  | $Li_2O$ | 12.8 | 12.8 | 12.8 | 10.69 | 10.69 |
|  | $Na_2O$ | 5.5 | 5.5 | 5.5 | 9.60 | 9.60 |
|  | $K_2O$ | 3.4 | 3.4 | 3.4 | 0.07 | 0.07 |
|  | MgO | 0 | 0 | 0 | 0.00 | 0.00 |
|  | CaO | 0 | 0 | 0 | 0.83 | 0.83 |
|  | SrO | 0 | 0 | 0 | 0.00 | 0.00 |
|  | BaO | 0 | 0 | 0 |  |  |
|  | ZnO |  |  |  |  |  |
|  | $TiO_2$ |  |  |  |  |  |
|  | $ZrO_2$ | 1.8 | 1.8 | 1.8 | 1.07 | 1.07 |
|  | SUM | 100 | 100 | 100 | 100 | 100 |
|  | X value | 41611 | 41611 | 41611 | 42387 | 42387 |
|  | Z value | 28306 | 28306 | 28306 | 28937 | 28937 |
|  | T (° C.) | 1000-1050 | 1000-1050 | 1000-1050 |  |  |
|  | T4 (° C.) | 1063 | 1063 | 1063 |  |  |

TABLE 6-continued

| | | Ex. S-31 | Ex. S-32 | Ex. S-33 | Ex. S-34 | Ex. S-35 |
|---|---|---|---|---|---|---|
| | Sample sheet thickness (mm) | 1.1 | 0.8 | 0.8 | 0.6 | 0.6 |
| First stage chemical strengthening conditions | $KNO_3$ concentration (wt %) | | 95 | 95 | 95 | 95 |
| | $NaNO_3$ concentration (wt %) | 100 | 5 | 5 | 5 | 5 |
| | Strengthening temperature (° C.) | 425 | 380 | 380 | 380 | 380 |
| | Strengthening time (h) | 6 | 8 | 15 | 8 | 15 |
| Second stage chemical strengthening conditions | $KNO_3$ concentration (wt %) | | | | | |
| | $NaNO_3$ concentration (wt %) | | | | | |
| | Strengthening temperature (° C.) | | | | | |
| | Strengthening time (h) | | | | | |
| Strengthening profile | CS (MPa) | 300 | 432.0 | 339.4 | 457.4 | 452.6 |
| | DOL (μm) | 150 | 100.7 | 129.5 | 116.6 | 118.6 |
| | CT (MPa) | | 34.3 | 41.5 | 55.5 | 50.4 |
| | $d_h$ (μm) | | 6.5 | 13.5 | 4 | 4.5 |
| | Sc value | | | | | |
| | CS@DOL 120 μm (MPa) | | −12.6 | 4.4 | −4.5 | −2.9 |
| | CS@DOL 110 μm (MPa) | | −8.4 | 12.1 | 4.3 | 3.9 |
| | CS@DOL 100 μm (MPa) | | 4.2 | 18.1 | 11.1 | 11.8 |
| | CS@DOL 90 μm (MPa) | | 9.4 | 27.8 | 18.5 | 17.7 |
| | CS@DOL 50 μm (MPa) | | 56.8 | 67.3 | 59.7 | 45.9 |
| | CS@DOL 30 μm (MPa) | | 92.0 | 90.2 | 84.2 | 59.0 |
| | CS@DOL 120 μm*($t^2$) | | −8.1 | 2.8 | −1.6 | −1.1 |
| | CS@DOL 110 μm*($t^2$) | | −5.4 | 7.8 | 1.6 | 1.4 |
| | CS@DOL 100 μm*($t^2$) | | 2.7 | 11.6 | 4.0 | 4.2 |
| | CS@DOL 90 μm*($t^2$) | | 6.0 | 17.8 | 6.6 | 6.4 |
| | CS@DOL 50 μm*($t^2$) | | 36.4 | 43.1 | 21.5 | 16.5 |
| | CS@DOL 30 μm*($t^2$) | | 58.9 | 57.7 | 30.3 | 21.2 |
| Average value of cracking height in drop-on-sand test (mm) | | 548.0 | 256.0 | 222.0 | 232.0 | 204.0 |
| $\Delta CS_{100\text{-}90}$ (MPa/μm) | | | 0.52 | 0.97 | 0.74 | 0.59 |
| $CS_{DOL\text{-}20}$ (MPa) | | | 18.6 | 14.1 | 13.9 | 12.7 |
| $\Delta CS_{DOL\text{-}20}$ (MPa/μm) | | | 0.93 | 0.70 | 0.70 | 0.64 |

TABLE 7

| | | Ex. S-36 | Ex. S-37 | Ex. S-38 | Ex. S-39 | Ex. S-40 |
|---|---|---|---|---|---|---|
| | Sample sheet thickness (mm) | 0.8 | 0.8 | 0.8 | 0.8 | 0.8 |
| Composition component (mol %) | $SiO_2$ | 70 | 70 | 70 | 70 | 70 |
| | $Al_2O_3$ | 10 | 10 | 10 | 10 | 10 |
| | $B_2O_3$ | | | | | |
| | $P_2O_5$ | | | | | |
| | $Li_2O$ | 10 | 10 | 10 | 10 | 10 |
| | $Na_2O$ | 3 | 3 | 3 | 3 | 3 |
| | $K_2O$ | 1 | 1 | 1 | 1 | 1 |
| | MgO | 5 | 5 | 5 | 5 | 5 |
| | CaO | | | | | |
| | SrO | | | | | |
| | BaO | | | | | |
| | ZnO | | | | | |
| | $TiO_2$ | | | | | |
| | $ZrO_2$ | 1 | 1.00 | 1.00 | 1 | 1 |
| | SUM | 100 | 100 | 100 | 100 | 100 |
| | X value | 46133 | 46133 | 46133 | 46133 | 46133 |
| | Z value | 30766 | 30766 | 30766 | 30766 | 30766 |
| | T (° C.) | 1194-1200 | 1194-1200 | 1194-1200 | 1194-1200 | 1194-1200 |
| | T4 (° C.) | 1211 | 1211 | 1211 | 1211 | 1211 |
| First stage chemical strengthening conditions | $KNO_3$ concentration (wt %) | 100 | 98 | 98 | 98 | 96.5 |
| | $NaNO_3$ concentration (wt %) | | 2 | 2 | 2 | 3.5 |
| | Strengthening temperature (° C.) | 450 | 400 | 450 | 450 | 450 |
| | Strengthening time (h) | 6 | 6 | 6 | 6 | 6 |
| Second stage chemical strengthening conditions | $KNO_3$ concentration (wt %) | | | | | |
| | $NaNO_3$ concentration (wt %) | 100 | 100 | 100 | 100 | 100 |
| | Strengthening temperature (° C.) | 425 | 425 | 425 | 425 | 425 |
| | Strengthening time (h) | 5 | 1 | 3 | 3.25 | 2.5 |
| Strengthening profile | CS (MPa) | 416 | 298 | 537 | 310 | 484 |
| | DOL (μm) | 124 | 115 | 127 | 124 | 130 |
| | CT (MPa) | −61 | −69 | −61 | −73 | −77 |
| | $d_h$ (μm) | | | | | |
| | Sc value | 31703 | 34235 | 27916 | 32402 | 32098 |
| | CS@DOL 120 μm (MPa) | | | | | |

TABLE 7-continued

| | | No. | | | | |
|---|---|---|---|---|---|---|
| | | Ex. S-36 | Ex. S-37 | Ex. S-38 | Ex. S-39 | Ex. S-40 |
| Sample sheet thickness (mm) | | 0.8 | 0.8 | 0.8 | 0.8 | 0.8 |
| | CS@DOL 110 μm (MPa) | | | | | |
| | CS@DOL 100 μm (MPa) | 22.8 | 16.5 | 23.5 | 26.0 | 29.2 |
| | CS@DOL 90 μm (MPa) | 36.9 | 28.9 | 31.8 | 38.4 | 40.0 |
| | CS@DOL 50 μm (MPa) | | | | | |
| | CS@DOL 30 μm (MPa) | | | | | |
| | CS@DOL 120 μm*(t^2) | | | | | |
| | CS@DOL 110 μm*(t^2) | | | | | |
| | CS@DOL 100 μm*(t^2) | 14.6 | 10.5 | 15.0 | 16.7 | 18.7 |
| | CS@DOL 90 μm*(t^2) | 23.6 | 18.5 | 20.4 | 24.6 | 25.6 |
| | CS@DOL 50 μm*(t^2) | | | | | |
| | CS@DOL 30 μm*(t^2) | | | | | |
| Average value of cracking height in drop-on-sand test (mm) | | 488.0 | 413.0 | 460.0 | 478.0 | 496.7 |
| Number of fragments having size of 25 mm × 25 mm | | 4 | 2 | 2 | 12 | 6 |
| $\Delta CS_{100-90}$ (MPa/μm) | | 1.41 | 1.25 | 0.83 | 1.24 | 1.08 |
| $CS_{DOL-20}$ (MPa) | | 21.4 | 25.0 | 17.3 | 20.5 | 16.4 |
| $\Delta CS_{DOL-20}$ (MPa/μm) | | 1.07 | 1.25 | 0.86 | 1.02 | 0.82 |

TABLE 8

| | | No. | | | | |
|---|---|---|---|---|---|---|
| | | Ex. S-41 | Ex. S-42 | Ex. S-43 | Ex. S-44 | Ex. S-45 |
| Sample sheet thickness (mm) | | 0.8 | 0.8 | 0.8 | 0.8 | 0.8 |
| Composition component (mol %) | $SiO_2$ | 70 | 70 | 70 | 70 | 70 |
| | $Al_2O_3$ | 10 | 10 | 10 | 10 | 10 |
| | $B_2O_3$ | | | | | |
| | $P_2O_5$ | | | | | |
| | $Li_2O$ | 10 | 10 | 10 | 10 | 10 |
| | $Na_2O$ | 3 | 3 | 3 | 3 | 3 |
| | $K_2O$ | 1 | 1 | 1 | 1 | 1 |
| | MgO | 5 | 5 | 5 | 5 | 5 |
| | CaO | | | | | |
| | SrO | | | | | |
| | BaO | | | | | |
| | ZnO | | | | | |
| | $TiO_2$ | | | | | |
| | $ZrO_2$ | 1 | 1 | 1 | 1 | 1.00 |
| | SUM | 100 | 100 | 100 | 100 | 100 |
| | X value | 46133 | 46133 | 46133 | 46133 | 46133 |
| | Z value | 30766 | 30766 | 30766 | 30766 | 30766 |
| | T (° C.) | 1194-1200 | 1194-1200 | 1194-1200 | 1194-1200 | 1194-1200 |
| | T4 (° C.) | 1211 | 1211 | 1211 | 1211 | 1211 |
| First stage chemical strengthening conditions | $KNO_3$ concentration (wt %) | 95 | | 95 | 92.5 | 90 |
| | $NaNO_3$ concentration (wt %) | 5 | 100 | 5 | 7.5 | 10 |
| | Strengthening temperature (° C.) | 450 | 425 | 450 | 450 | 450 |
| | Strengthening time (h) | 6 | 1.5 | 7.5 | 2.5 | 1.5 |
| Second stage chemical strengthening conditions | $KNO_3$ concentration (wt %) | | 95 | | | |
| | $NaNO_3$ concentration (wt %) | 100 | 5 | | | |
| | Strengthening temperature (° C.) | 425 | 450 | | | |
| | Strengthening time (h) | 2 | 6 | | | |
| Strengthening profile | CS (MPa) | 554 | 469 | 691 | | 715 |
| | DOL (μm) | 149 | 173 | 164 | 129 | 120 |
| | CT (MPa) | −83 | −77 | −44 | −73 | −55 |
| | $d_h$ (μm) | | | | | |
| | Sc value | 38570 | 29319 | 18731 | 34849 | 33479 |
| | CS@DOL 120 μm (MPa) | | | | | |
| | CS@DOL 110 μm (MPa) | | | | | |
| | CS@DOL 100 μm (MPa) | 41.0 | 51.7 | 37.8 | 34.2 | 27.0 |
| | CS@DOL 90 μm (MPa) | 52.3 | 55.3 | 42.0 | 47.6 | 42.0 |
| | CS@DOL 50 μm (MPa) | | | | | |
| | CS@DOL 30 μm (MPa) | | | | | |
| | CS@DOL 120 μm*(t^2) | | | | | |
| | CS@DOL 110 μm*(t^2) | | | | | |
| | CS@DOL 100 μm*(t^2) | 26.2 | 33.1 | 24.2 | 21.9 | 17.3 |
| | CS@DOL 90 μm*(t^2) | 33.5 | 35.4 | 26.9 | 30.5 | 26.9 |
| | CS@DOL 50 μm*(t^2) | | | | | |
| | CS@DOL 30 μm*(t^2) | | | | | |
| Average value of cracking height in drop-on-sand test (mm) | | 509.0 | 360.0 | 456.0 | 313.0 | 406.0 |
| Number of fragments having size of 25 mm × 25 mm | | 322 | 2 | 2 | 6 | 2 |
| $\Delta CS_{100-90}$ (MPa/μm) | | 1.14 | 0.36 | 0.42 | 1.34 | 1.50 |

TABLE 8-continued

|  | No. | | | | |
|---|---|---|---|---|---|
|  | Ex. S-41 | Ex. S-42 | Ex. S-43 | Ex. S-44 | Ex. S-45 |
| Sample sheet thickness (mm) | 0.8 | 0.8 | 0.8 | 0.8 | 0.8 |
| $CS_{DOL-20}$ (MPa) | 17.2 | 10.6 | 14.6 | 23.0 | 27.0 |
| $\Delta CS_{DOL-20}$ (MPa/μm) | 0.86 | 0.53 | 0.73 | 1.15 | 1.35 |

TABLE 9

| | | No. | | | | | | | |
|---|---|---|---|---|---|---|---|---|---|
| | | Ex. S-46 | Ex. S-47 | Ex. S-48 | Ex. S-49 | Ex. S-50 | Ex. S-51 | Ex. S-52 | Ex. S-53 |
| | Sample sheet thickness (mm) | 0.8 | 0.8 | 0.8 | 0.8 | 0.8 | 0.8 | 0.8 | 0.8 |
| Composition component (mol %) | $SiO_2$ | 69 | 69 | 69 | 69 | 70 | 70 | 70 | 70 |
| | $Al_2O_3$ | 9 | 9 | 9 | 9 | 7.5 | 7.5 | 7.5 | 7.5 |
| | $B_2O_3$ | | | | | | | | |
| | $P_2O_5$ | | | | | | | | |
| | $Li_2O$ | 9.5 | 9.5 | 9.5 | 9.5 | 8 | 8 | 8 | 8 |
| | $Na_2O$ | 4.5 | 4.5 | 4.5 | 4.5 | 5.3 | 5.3 | 5.3 | 5.3 |
| | $K_2O$ | 1 | 1 | 1 | 1 | 1 | 1 | 1 | 1 |
| | MgO | 6 | 6 | 6 | 6 | 7 | 7 | 7 | 7 |
| | CaO | | | | | 0.2 | 0.2 | 0.2 | 0.2 |
| | SrO | | | | | | | | |
| | BaO | | | | | | | | |
| | ZnO | | | | | | | | |
| | $TiO_2$ | 0.04 | 0.04 | 0.04 | 0.04 | 0.04 | 0.04 | 0.04 | 0.04 |
| | $ZrO_2$ | 1 | 1.00 | 1.00 | 1 | 1 | 1 | 1 | 1 |
| | SUM | 100.04 | 100.04 | 100.04 | 100.04 | 100.04 | 100.04 | 100.04 | 100.04 |
| | X value | 45856 | 45856 | 45856 | 45856 | 45114 | 45114 | 45114 | 45114 |
| | Z value | 30462 | 30462 | 30462 | 30462 | 29915 | 29915 | 29915 | 29915 |
| | T (° C.) | 1116-1130 | 1116-1130 | 1116-1130 | 1116-1130 | 1090-1100 | 1090-1100 | 1090-1100 | 1090-1100 |
| | T4 (° C.) | 1163 | 1163 | 1163 | 1163 | 1159 | 1159 | 1159 | 1159 |
| First stage chemical strengthening conditions | $KNO_3$ concentration (wt %) | | | | | | | | |
| | $NaNO_3$ concentration (wt %) | 100 | 100 | 100 | 100 | 100 | 100 | 100 | 100 |
| | Strengthening temperature (° C.) | 450 | 450 | 450 | 450 | 450 | 450 | 450 | 450 |
| | Strengthening time (h) | 1 | 1 | 1 | 1 | 1 | 1 | 1 | 1 |
| Second stage chemical strengthening conditions | $KNO_3$ concentration (wt %) | 100 | 99 | 98 | 95 | 100 | 99 | 98 | 95 |
| | $NaNO_3$ concentration (wt %) | | 1 | 2 | 5 | | 1 | 2 | 5 |
| | Strengthening temperature (° C.) | 450 | 450 | 450 | 450 | 450 | 450 | 450 | 450 |
| | Strengthening time (h) | 1.5 | 1.5 | 1.5 | 1.5 | 1.5 | 1.5 | 1.5 | 1.5 |
| Strengthening profile | CS (MPa) | 910 | 862 | 859 | 792 | 885 | 851 | 821 | 749 |
| | DOL (μm) | 149 | 143 | 147 | 142 | 134 | 139 | 135 | 132 |
| | CT (MPa) | 56 | 63 | 57 | 67 | 48 | 49 | 49 | 53 |
| | $d_h$ (μm) | | | | | | | | |
| | Sc value | 23020 | 29456 | 24529 | 32824 | 19597 | 20477 | 20660 | 24574 |
| | CS@DOL 120 μm (MPa) | 22.1 | 25.3 | 22.0 | 21.0 | 9.5 | 10.7 | 12.0 | 11.1 |
| | CS@DOL 110 μm (MPa) | 29.9 | 32.7 | 30.0 | 33.6 | 16.7 | 19.1 | 17.6 | 19.3 |
| | CS@DOL 100 μm (MPa) | 39.5 | 43.9 | 41.3 | 48.1 | 23.6 | 27.3 | 27.6 | 29.3 |
| | CS@DOL 90 μm (MPa) | 46.9 | 54.2 | 49.8 | 60.3 | 31.2 | 35.5 | 37.6 | 38.7 |
| | CS@DOL 50 μm (MPa) | 79.0 | 101.5 | 84.4 | 119.0 | 59.7 | 67.6 | 74.8 | 89.8 |
| | CS@DOL 30 μm (MPa) | 88.3 | 121.7 | 94.3 | 152.1 | 68.8 | 77.5 | 91.0 | 119.3 |
| | CS@DOL 120 μm*(t^2) | 14.2 | 16.2 | 14.1 | 13.5 | 6.1 | 6.9 | 7.7 | 7.1 |
| | CS@DOL 110 μm*(t^2) | 19.1 | 20.9 | 19.2 | 21.5 | 10.7 | 12.2 | 11.3 | 12.4 |
| | CS@DOL 100 μm*(t^2) | 25.3 | 28.1 | 26.4 | 30.8 | 15.1 | 17.5 | 17.7 | 18.7 |
| | CS@DOL 90 μm*(t^2) | 30.0 | 34.7 | 31.9 | 38.6 | 19.9 | 22.7 | 24.1 | 24.7 |
| | CS@DOL 50 μm*(t^2) | 50.6 | 65.0 | 54.0 | 76.1 | 38.2 | 43.3 | 47.9 | 57.4 |
| | CS@DOL 30 μm*(t^2) | 56.5 | 77.9 | 60.3 | 97.3 | 44.1 | 49.6 | 58.3 | 76.4 |
| | Average value of cracking height in drop-on-sand test (mm) | | | | | | | | |
| | Number of fragments having size of 25 mm × 25 mm | 2 | 2 | 2 | 2 | 2 | 2 | 2 | 2 |
| | $\Delta CS_{100-90}$ (MPa/μm) | 0.74 | 1.03 | 0.85 | 1.22 | 0.76 | 0.82 | 1.00 | 0.94 |
| | $CS_{DOL-20}$ (MPa) | 13.8 | 19.6 | 15.3 | 19.0 | 13.6 | 13.5 | 15.1 | 17.6 |
| | $\Delta CS_{DOL-20}$ (MPa/μm) | 0.69 | 0.98 | 0.77 | 0.95 | 0.68 | 0.68 | 0.76 | 0.88 |

It is understood from the results of Tables 1 to 9 and FIGS. 4 to 6 that in the region in the vicinity of 0 to 50 μm of DOL, the average cracking height tends to slightly decrease as the DOL increases. Furthermore, it is understood that in the region of less than 50 μm of DOL, the average cracking height tends to decrease as CT increases. On the other hand, it is understood that in the Examples of 100 μm or more of DOL, the average cracking height tends to increase.

It is understood from FIGS. 7 to 9 that the average cracking height has small correlation with CS and has high correlation with internal compressive stresses $CS_{90}$ and $CS_{100}$. It is understood that when $CS_{90}$ and $CS_{100}$ exceed 30 MPa and 20 MPa, respectively, the average cracking height is about 300 mm or more, and great improvement of strength can be achieved.

It is understood from FIG. 10 that the average cracking height has high correlation with $CS_{100} \times t$. It is understood that when $CS_{100} \times t^2$ exceeds 5 MPa·mm$^2$, the average cracking height is about 300 mm or more, and great improvement of strength can be achieved.

<Indentation Fracture Test>

The chemically strengthened glasses of Example S-19 and Examples S-36 to S-53 each having a size of 25 mm×25 mm×sheet thickness t (mm) were fractured by an indentation fracture test in which a load of 3 to 10 kgf was maintained for 15 seconds, using a diamond indenter having an indenter angle 60° of a facing angle, and the number of fragments of each chemically strengthened glass after fracture was counted. Those results are shown in Table 4 and Tables 7 to 9.

A glass block having the same glass composition as in Example S-7 was prepared by melting in a platinum crucible under the same conditions as in Example S-7. The glass block obtained was cut and grinded, and both surfaces thereof were finally mirror-polished to obtain a sheet-shaped glass having a size of 5 mm vertical×40 mm horizontal×0.8 mm thickness. Thereafter, a chemical strengthening treatment was conducted under each chemical strengthening condition shown in the column of Examples 4PB-7 to 4PB-9 in Table 10 below, and each chemically strengthened glass of Examples 4PB-7 to 4PB-9 was manufactured.

The strengthening temperature (unit: ° C.) in Table 10 is a temperature of a molten salt during the chemical strengthening treatment. Furthermore, the salt concentration means the proportion of $KNO_3$ in a weight basis in the molten salt used in the chemical strengthening treatment=$(KNO_3/(KNO_3+Na_2O)) \times 100$ (unit: %). Furthermore, the strengthening time shows a dipping time (unit: hour) of a glass in a molten salt.

Regarding each chemically strengthened glass of Examples 4PB-1 to 4PB-9, surface compressive stress (CS, unit: MPa) and a thickness of the compressive stress layer (DOL, unit: μm) were measured by a surface stress meter FSM-6000 manufactured by Orihara Manufacturing Co., Ltd. and an attachment program Fsm V. Furthermore, the internal tensile stress (CT, unit: MPa) was calculated based on CS and DOL obtained. Those results are shown in Table 10 and Table 11.

TABLE 10

| No. | Sheet thickness | Strengthening temperature 1 | Salt concentration 1 | Strengthening time 1 | Strengthening temperature 2 | Salt concentration 2 | Strengthening time 2 | CS | DOL | CT | $d_h$ |
|---|---|---|---|---|---|---|---|---|---|---|---|
| Ex. 4PB-1 | 1.0 | 550 | 80 | 18 | | | | 239 | 138 | 66.7 | |
| Ex. 4PB-2 | 1.0 | 550 | 100 | 13 | | | | 352 | 127 | 82.9 | |
| Ex. 4PB-3 | 1.0 | 550 | 80 | 37 | | | | 185 | 162 | 71.6 | |
| Ex. 4PB-4 | 1.0 | 500 | 100 | 40 | | | | 475 | 153 | 161 | |
| Ex. 4PB-5 | 1.0 | 450 | 50 | 4 | | | | 270 | 26 | 9.8 | 13 |
| Ex. 4PB-6 | 1.0 | 550 | 80 | 6 | | | | 320 | 91 | 43.9 | |
| Ex. 4PB-7 | 0.8 | 500 | 80 | 578 | | | | 294 | 127 | 70 | 56 |
| Ex. 4PB-8 | 0.8 | 500 | 80 | 578 | 500 | 100 | 1 | 655 | 124 | 86 | 13.5 |
| Ex. 4PB-9 | 0.8 | 500 | 80 | 578 | 500 | 100 | 3 | 647 | 140 | 113 | 22 |

<Four-Point Bending Test after Forming Flaws or without Forming Flaws>

A glass sheet having the same glass composition as in Example S-1 and having a thickness of 1.1 to 1.3 mm was prepared by a float process under the same conditions as in Example S-1. The sheet glass obtained was cut and grinded, and both surfaces thereof were finally mirror-polished to obtain a sheet-shaped glass having a size of 5 mm vertical× 40 mm horizontal×1.1 mm thickness. Thereafter, a chemical strengthening treatment was conducted under each chemical strengthening condition shown in the column of Examples 4PB-1 to 4PB-6 in Table 10, and each chemically strengthened glass of Examples 4PB-1 to 4PB-6 was manufactured.

Figure 11:
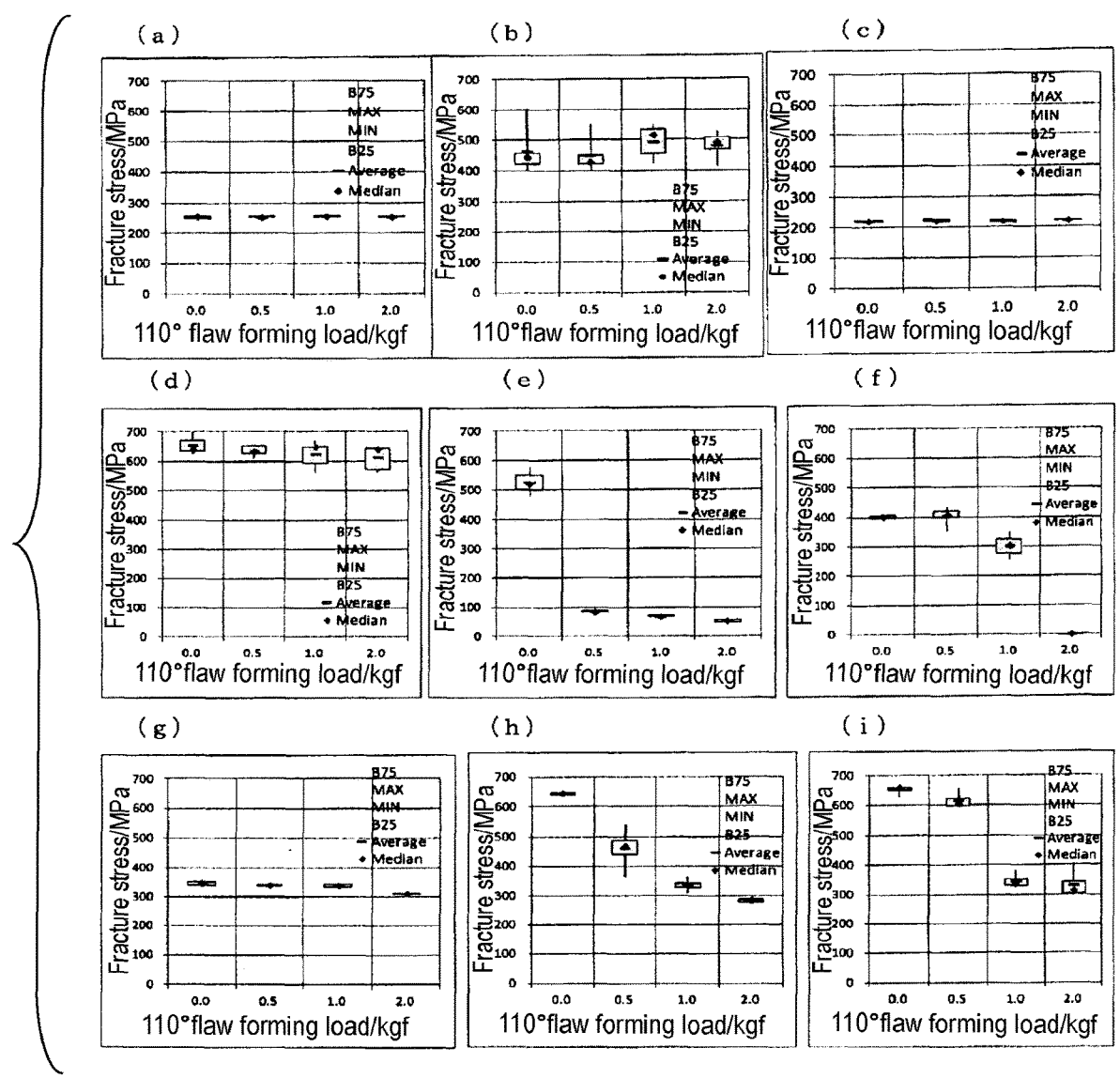
FIG. 11 is a graph showing the test results of a four-point bending test of chemically strengthened glasses.

A diamond indenter (indenter angle of facing angle: 110°) was pressed to each chemically strengthened glass of Examples 4PB-1 to 4PB-9 under a load of 0.5 Kgf, 1 Kgf, 1.5 Kgf, or 2 Kgf for 15 seconds to form flaws on the glass surface. A four-point bending test was then conducted under the conditions of lower span: 30 mm, upper span: 10 mm and crosshead speed: 0.5 mm/min, and fracture stress (MPa) under each flaw forming condition was measured. Fracture stress values (bending strength, unit: MPa) when the four-point bending test was conducted without forming flaws and under each indentation load of an indenter are shown in Table 11 and FIG. 11. In FIG. 11, (a) to (i) show the test results of the chemically strengthened glasses of Examples 4PB-1 to 4PB-9, respectively.

TABLE 11

| | Ex. 4PB-1 | Ex. 4PB-2 | Ex. 4PB-3 | Ex. 4PB-4 | Ex. 4PB-5 | Ex. 4PB-6 | Ex. 4PB-7 | Ex. 4PB-8 | Ex. 4PB-9 |
|---|---|---|---|---|---|---|---|---|---|
| CS | 239 | 352 | 185 | 475 | 270 | 320 | 294 | 655 | 647 |
| DOL | 138 | 127 | 162 | 153 | 26 | 91 | 127 | 124 | 140 |
| CT | 66.7 | 82.9 | 71.6 | 160.5 | 9.8 | 43.9 | 70 | 86 | 113 |

TABLE 11-continued

|  | Ex. 4PB-1 | Ex. 4PB-2 | Ex. 4PB-3 | Ex. 4PB-4 | Ex. 4PB-5 | Ex. 4PB-6 | Ex. 4PB-7 | Ex. 4PB-8 | Ex. 4PB-9 |
|---|---|---|---|---|---|---|---|---|---|
| $d_h$ |  |  |  |  | 13 |  | 56.0 | 13.5 | 22.0 |
| Bending strength without forming flaws MPa | 254 | 465 | 223 | 654 | 526 | 400 | 346 | 646 | 653 |
| Bending strength when flaws are formed under 0.5 kgf MPa | 253 | 450 | 222 | 634 | 86 | 403 | 340 | 459 | 616 |
| Bending strength when flaws are formed under 1 kgf MPa | 257 | 493 | 221 | 624 | 69 | 301 | 339 | 335 | 344 |
| Bending strength when flaws are formed under 2 kgf MPa | 254 | 480 | 222 | 613 | 52 | 0 | 311 | 281 | 330 |

Figure 12:
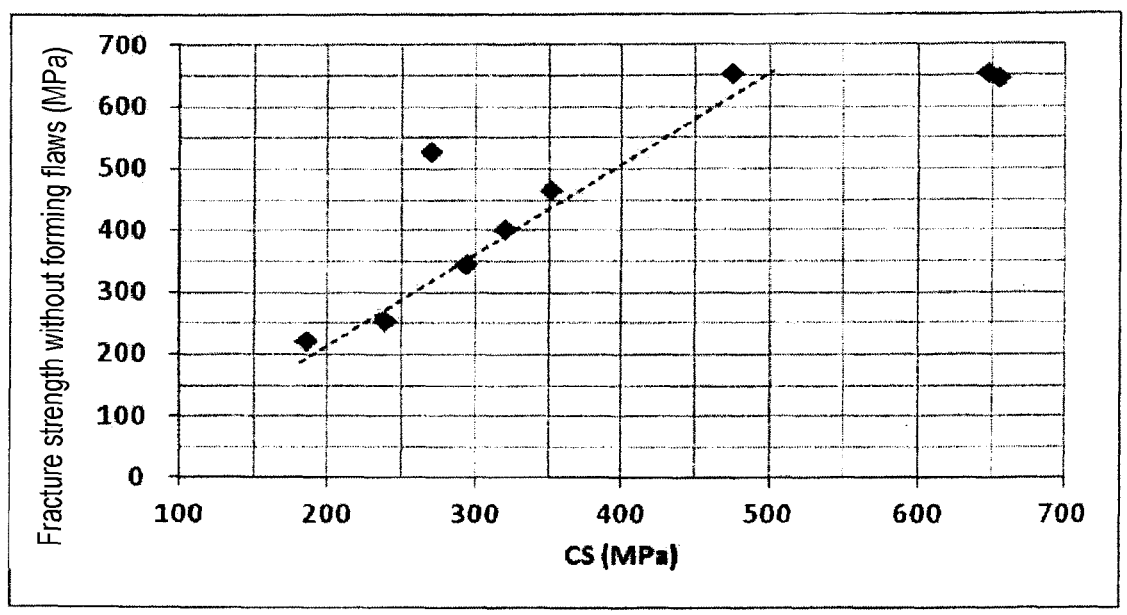
FIG. 12 is a graph plotting the relationship between CS and bending strength, of a chemically strengthened glass.
Figure 13:
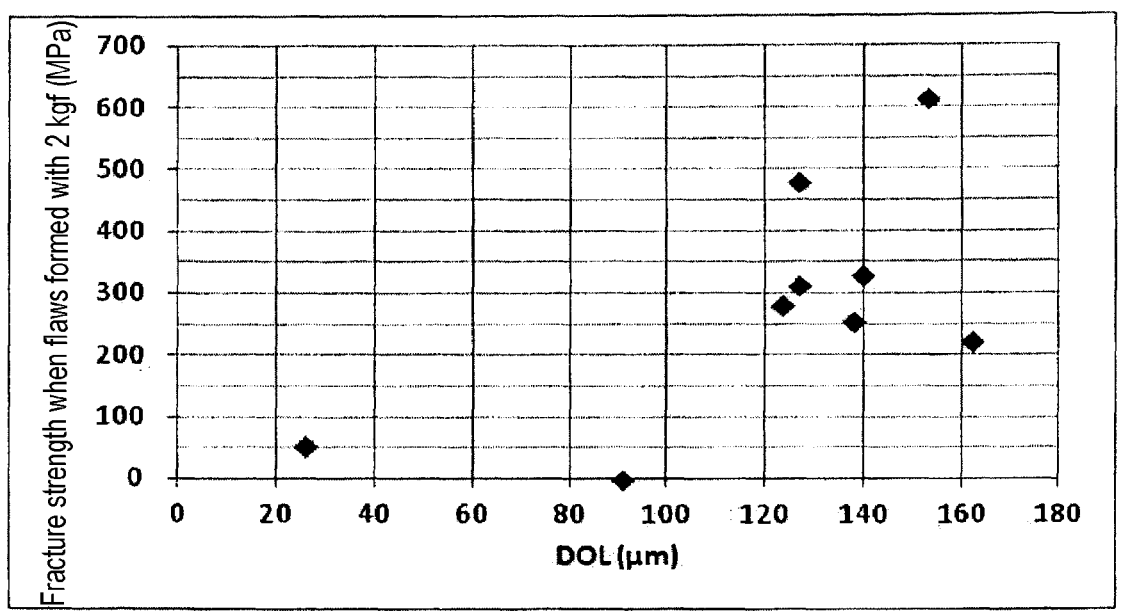
FIG. 13 is a graph plotting the relationship between DOL and bending strength, of a chemically strengthened glass.

A graph plotting the relationship between fracture strength without forming flaws and CS is shown in FIG. 12. It is understood from FIG. 12 that when CS is 300 MPa or more, fracture strength without forming flaws can achieve 350 MPa or more. When a smart phone or a tablet PC has been dropped, tensile stress is generated on the surface of a cover glass, and its magnitude reaches about 350 MPa. Therefore, CS is desirably 300 MPa or more. A graph plotting the relationship between fracture strength when flaws are formed under 2 kgf of Examples 4PB-1 to 4-PB-9 and DOL is shown in FIG. 13. In the chemically strengthened glass having DOL of 100 μm or more, fracture strength is 200 MPa or more even after forming flaws under 2 kgf by a diamond indenter (indenter angle of facing angle: 110°), higher fracture strength is maintained even after forming flaws under larger load, and it is shown to have high reliability as a cover glass even having flaws. DOL is preferably 100 μm or more, more preferably 110 μm or more, still more preferably 120 μm or more, and particularly preferably 130 μm or more.

It is understood from the above results that when $CS_{90}$, $CS_{100}$ and $CS_{100} \times t^2$ are more than 30 MPa, more than 20 MPa and more than 5 MPa·mm², respectively, apparent strength improvement to a drop-on-sand test can be achieved. Furthermore, it is understood that when $CS_9$, $CS_{100}$ and $CS_{100} \times t^2$ are more than 50 MPa, more than 30 MPa and more than 7 MPa·mm², respectively, great strength improvement to a drop-on-sand test can be achieved. Furthermore, it is understood that when CS exceeds 300 MPa, fracture strength sufficiently exceeds 350 MPa and sufficient fracture strength can be achieved as a cover glass.

Figure 14:
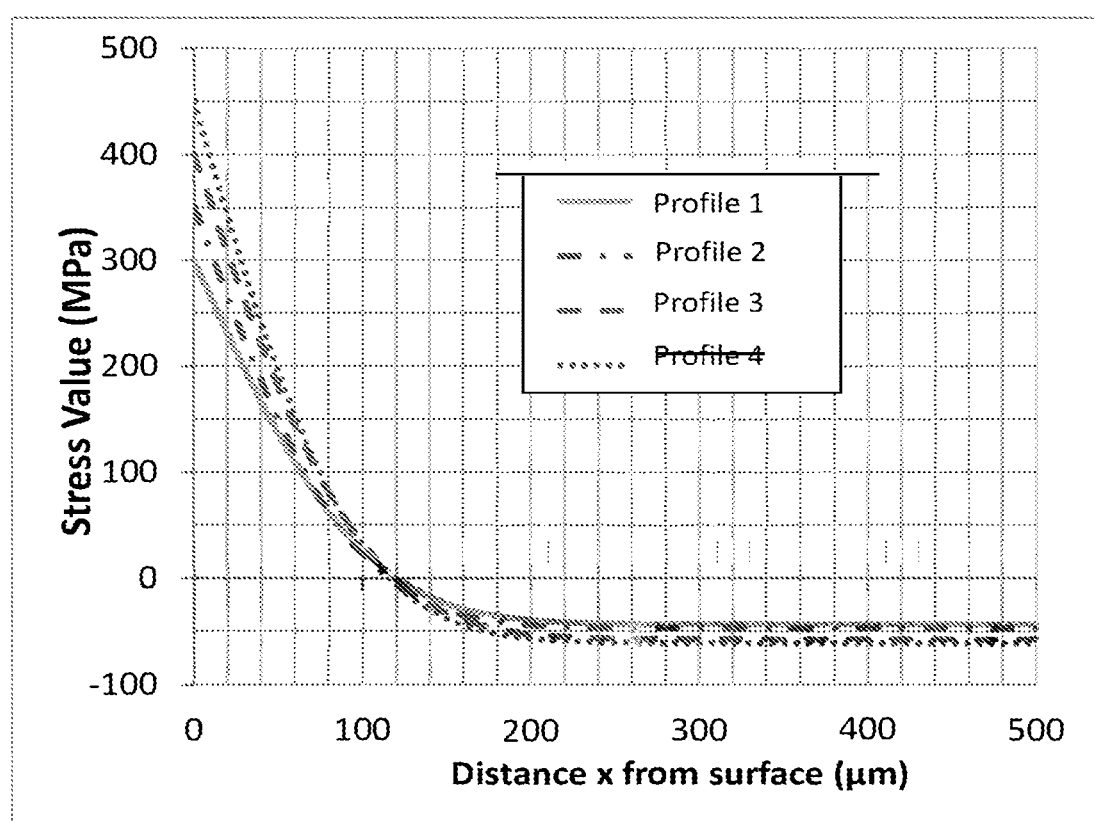
FIG. 14 is a graph showing stress profiles of virtual chemically strengthened glasses.
Figure 15A:
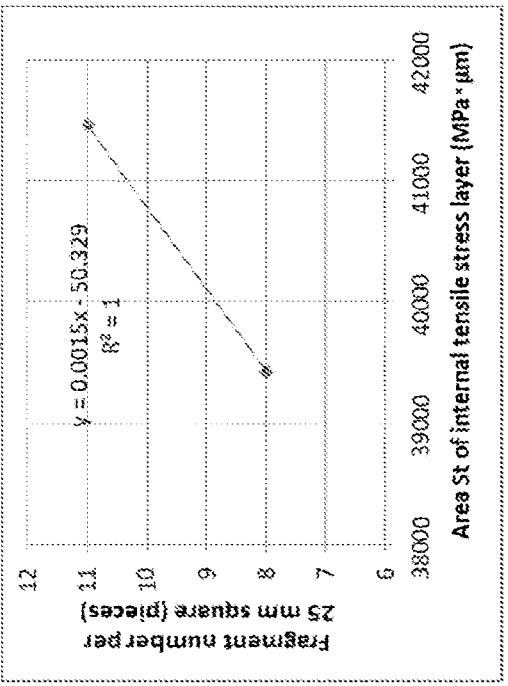
FIG. 15 shows measurement examples of St Limit and CT Limit, in which (a) is a graph showing the relationship between an area St of an internal tensile stress layer and the number of fragments, (b) is an enlarged view of the portion surrounded by a dotted line in (a), (c) is a graph showing the relationship between internal tensile stress CT and the number of fragments, and (d) is an enlarged view of the portion surrounded by a dotted line in (c).
Figure 15B:
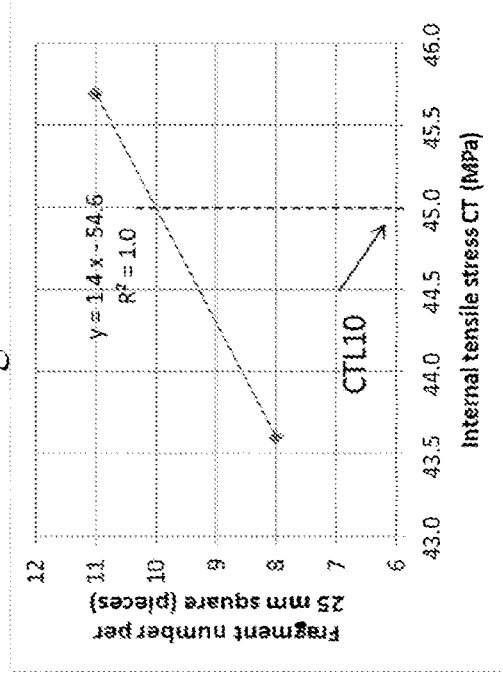
Figure 15C:
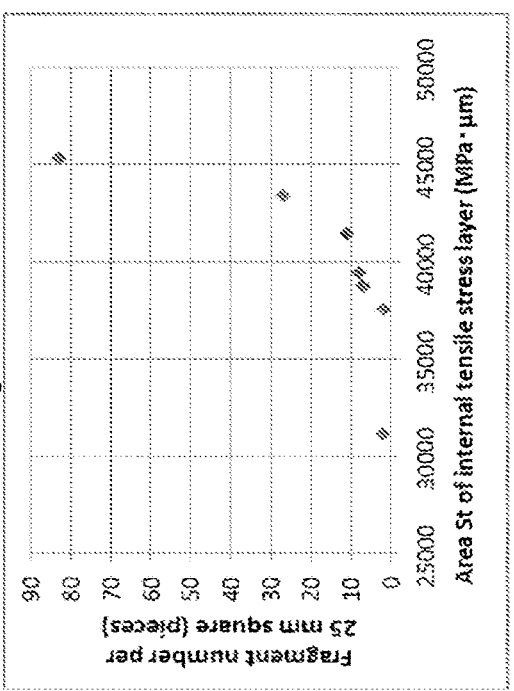
Figure 15D:
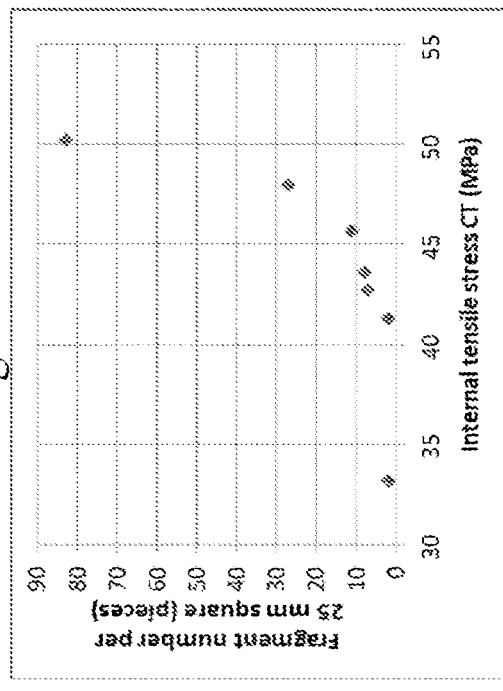

Stress profile of virtual chemically strengthened glass having a sheet thickness of 1 mm is shown in FIG. 14. CS, DOL, CT, Sc, and St of each of the profiles are shown in Table 12. The strengthening profile of FIG. 14 and Table 12 is prepared by the following formula.

$$F(x) = \alpha + ERFC(\beta \times x) - CT$$

x is a depth from a glass surface, the function ERFC (c) is a complementary error function. Values of constants α and β are shown in Table 12.

It is anticipated from the above results that the chemically strengthened glasses having those profiles achieve high strength to the drop-on-sand test and edge bending. It is anticipated that the chemically strengthened glass having introduced higher CS value and higher $CS_{90}$ and $CS_{100}$ values has higher strength and it is understood from Table 12 that Sc value of the chemically strengthened glass of the present invention is about 30000 MPa·μm or more. In this case, St value is the same value as Sc value as described before. If fracture should occur, it is desirable that a glass is safely broken, and to achieve this, it is desirable that St Limit value described hereinafter is higher value.

<Relationship Between X, Y and Z Values and the Number of Fragments of Glass>

To evaluate the relationship between the glass composition and the breaking resistance of the chemically strengthened glass, chemically strengthened glasses having various St values were prepared under various chemical strengthening conditions, and the relationship between the number of fragments when fractured and St value was investigated. Specifically, glasses having a size of 25 mm×25 mm×thickness t (mm) were subjected to the chemical strengthening treatment under various chemical strengthening conditions such that the internal tensile stress area (St, unit: MPa·μm) changes, and the chemically strengthened glasses having various internal tensile stress areas (St, unit: MPa·μm) were prepared. The internal tensile stress area (St, unit: MPa·μm) when the number of fragments was 10 was defined as St Limit value, and the internal tensile stress CT (unit: MPa) when the number of fragments was 10 was defined as CT Limit value. In the case where the number of fragments crosses over 10, St Limit value was defined by the following formula by using Stn value that is St value of the maximum number n of fragments becoming less than 10 and Stm value that is St value of the minimum number m of fragments becoming more than 10.

St Limit value=$Stn+(10-n) \times (Stm-Stn)/(m-n)$

In the case where the number of fragments crosses over 10, CT Limit value was defined by the following formula by using CTn value that is CT value of the maximum number

TABLE 12

|  | α | β | CS MPa | DOL μm | CT MPa | $CS_{90}$ MPa | $CS_{100}$ MPa | Area Sc of compressive stress layer MPa · μm | Area St of internal tensile stress layer MPa · μm |
|---|---|---|---|---|---|---|---|---|---|
| Profile 1 | 344 | 0.009 | 300 | 120 | 43.6 | 43.1 | 26.3 | 30000 | 30200 |
| Profile 2 | 398 | 0.0096 | 350 | 115 | 47.1 | 41.1 | 22.3 | 33300 | 33400 |
| Profile 3 | 458 | 0.0091 | 400 | 119 | 57.6 | 55.5 | 33.2 | 39600 | 40000 |
| Profile 4 | 511 | 0.0095 | 450 | 116 | 60.9 | 54.9 | 30.7 | 43100 | 42900 | n of fragments becoming less than 10 and CTm value that is CT value of the minimum number m of fragments becoming more than 10.

$$CT \text{ Limit value} = CTn + (10-n) \times (CTm - CTn)/(m-n)$$

The St value and CT value are defined as follows by using values $St_F$ and $CT_F$ measured by a surface stress meter FSM-6000 manufactured by Orihara Manufacturing Co., Ltd. and analyzed by an attachment program Fsm V or $St_A$ and $CT_A$ obtained by measuring using a birefringence imaging system Abrio-IM and a thinned sample.

$$St = St_F = 1.515 \times St_A$$

$$CT = CT_F = 1.28 \times CT_A$$

Here, $CT_F$ is a value equal to a value CT_CV analyzed by Fsm V.

Measurement examples when t is 1 mm are shown in FIG. 15 and Table 13. FIG. shows the measurement example of St Limit and CT Limit, in which (a) is a graph showing the relationship between the area St (MPa·μm) of the internal tensile stress layer when the sheet thickness (t) is 1 mm and the number of fragments, and (b) is an enlarged view of the portion surrounded by a dotted line in (a). (c) is a graph showing the relationship between the internal tensile stress CT (MPa) when the sheet thickness (t) is 1 mm and the number of fragments, and (d) is an enlarged view of the portion surrounded by a dotted line in (c). StL10 in (b) and CTL10 in (d) show the internal tensile stress area (St, unit: MPa·μm) and internal tensile tress (CT, unit: MPa), when the number of fragments is 10, respectively.

TABLE 13

| Molten salt | Concentration (%) | Temperature (°C.) | Time (h) | t/μm | CS/MPa | DOL/μm | CT/MPa | Area of internal tensile stress layer St MPa · μm | Number of fragments |
|---|---|---|---|---|---|---|---|---|---|
| KNO$_3$ | 100 | 450 | 4.00 | 1010 | 957.3 | 34.6 | 33.1 | 31129 | 2 |
| KNO$_3$ | 100 | 450 | 7.17 | 1010 | 904.3 | 48.0 | 41.3 | 37524 | 2 |
| KNO$_3$ | 100 | 450 | 7.58 | 1010 | 915.0 | 48.5 | 42.7 | 38775 | 7 |
| KNO$_3$ | 100 | 450 | 8.00 | 1010 | 905.1 | 50.2 | 43.6 | 39432 | 8 |
| KNO$_3$ | 100 | 450 | 8.00 | 1020 | 901.6 | 52.7 | 45.7 | 41460 | 11 |
| KNO$_3$ | 100 | 450 | 9.00 | 1020 | 889.2 | 54.7 | 48.0 | 43398 | 27 |
| KNO$_3$ | 100 | 450 | 10.00 | 1020 | 880.0 | 52.5 | 50.2 | 45312 | 83 |

Glasses having larger St Limit value and CT Limit value are glasses having improved breaking resistance. The St Limit value and CT Limit value are an index showing the degree of breaking resistance, and do not specify an allowable limit of breaking mode.

St Limit value was obtained in the same manner as described above. It is shown in Tables 14 and 15.

Regarding glasses before chemical strengthening, the results of Young's modulus E (unit: GPa) and a fracture toughness value K1c (unit: MPa·m$^{1/2}$) measured by DCDC method are also shown in Tables 14 and 15.

The Young's modulus E was measured by an ultrasonic pulse method (JIS R1602).

Figure 16:
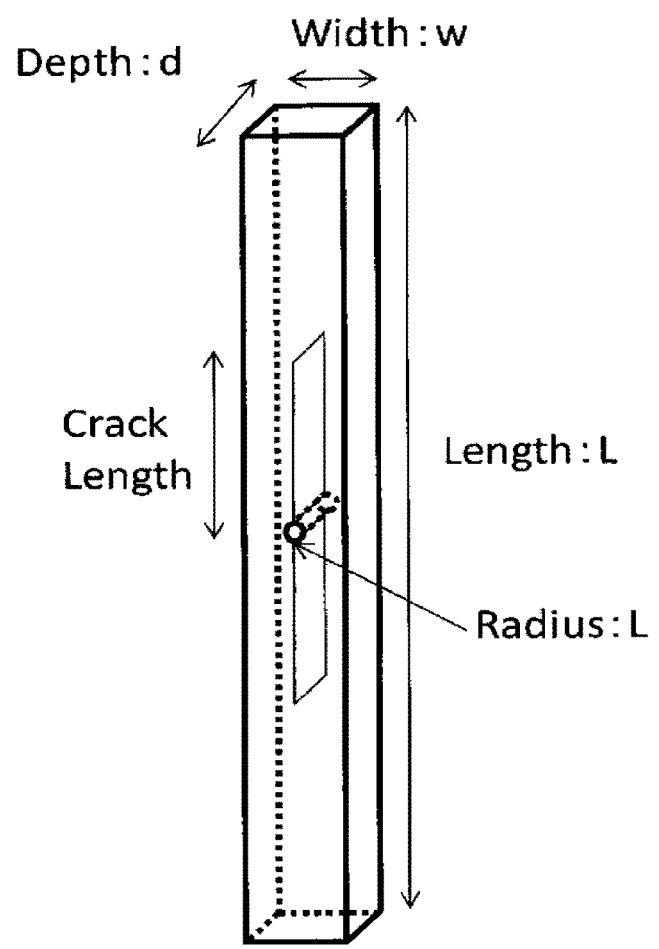
FIG. 16 is an explanatory view of a sample used in the measurement of a fracture toughness value by DCDC method.
Figure 17:
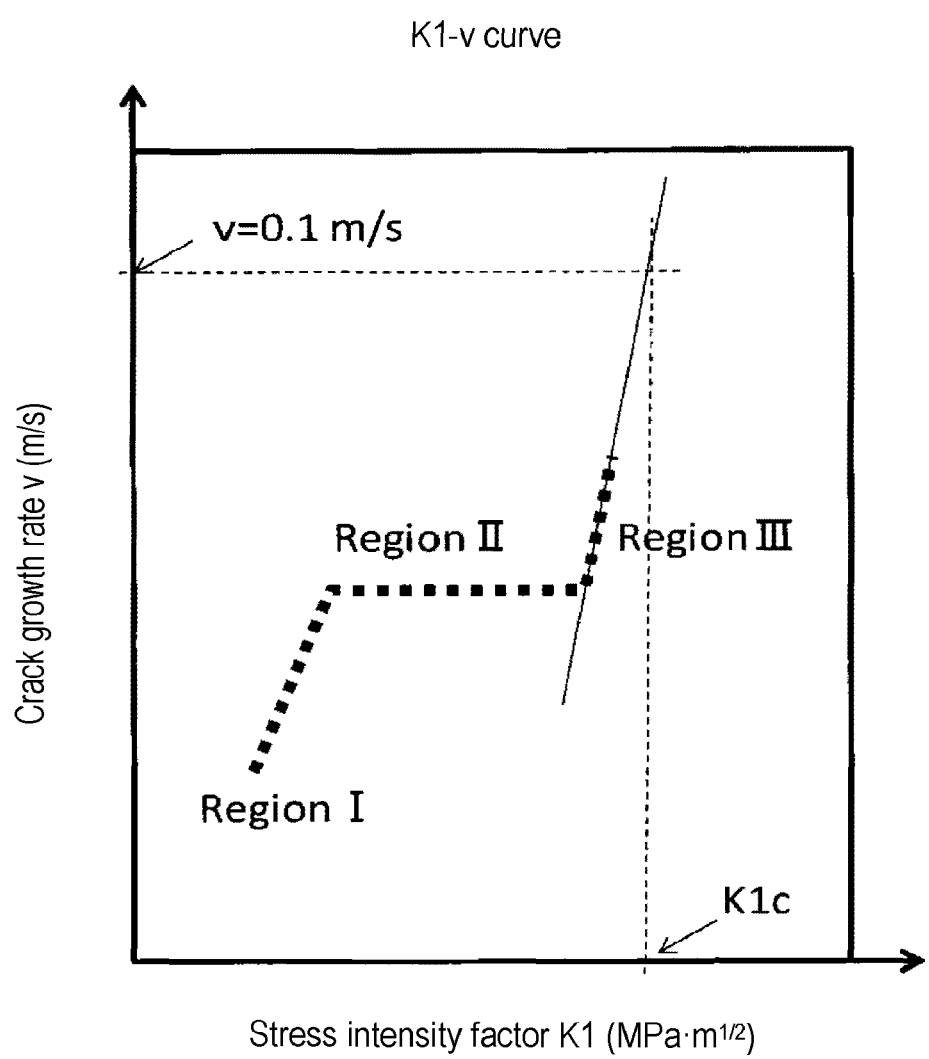
FIG. 17 is a view illustrating K1-v curve indicating the relationship between a stress intensity factor K1 and a crack growth rate v, used in the measurement of a fracture toughness value by DCDC method.

The fracture toughness value was obtained as follows. K1-v curve showing the relationship between a stress intensity factor K1 (unit: MPa·m$^{1/2}$) and a crack growth rate v (unit: m/s), as shown in FIG. 17 was measured by using a sample having a shape shown in FIG. 16 and Tensilon UTA-5 kN manufactured by Orientec according to DCDC method by reference to the method described in M. Y He, M. R. Turner and A. G Evans, Acta Metall. Mater. 43 (1995) 3453, the data of Region III obtained were recurred by a linear equation and extrapolated, and the stress intensity factor K1 of 0.1 m/s was defined as a fracture toughness value K1c.

Regarding each of Examples CT-1 to CT-27, X, Y and Z values were calculated form the following formula based on the composition of the glass before chemical strengthening (matrix composition of chemically strengthened glass). Those results are shown in Tables 14 and 15.

$$X = SiO_2 \times 329 + Al_2O_3 \times 786 + B_2O_3 \times 627 + P_2O_5 \times (-941) + Li_2O \times 927 + Na_2O \times 47.5 + K_2O \times (-371) + MgO \times 1230 + CaO \times 1154 + SrO \times 733 + ZrO_2 \times 51.8$$

$$Y = SiO_2 \times 0.00884 + Al_2O_3 \times 0.0120 + B_2O_3 \times (-0.00373) + P_2O_5 \times 0.000681 + Li_2O \times 0.00735 + Na_2O \times (-0.00234) + K_2O \times (-0.00608) + MgO \times 0.0105 + CaO \times 0.00789 + SrO \times 0.00752 + BaO \times 0.00472 + ZrO_2 \times 0.0202$$

$$Z = SiO_2 \times 237 + Al_2O_3 \times 524 + B_2O_3 \times 228 + P_2O_5 \times (-756) + Li_2O \times 538 + Na_2O \times 44.2 + K_2O \times (-387) + MgO \times 660 + CaO \times 569 + SrO \times 291 + ZrO_2 \times 510$$

Figure 18:
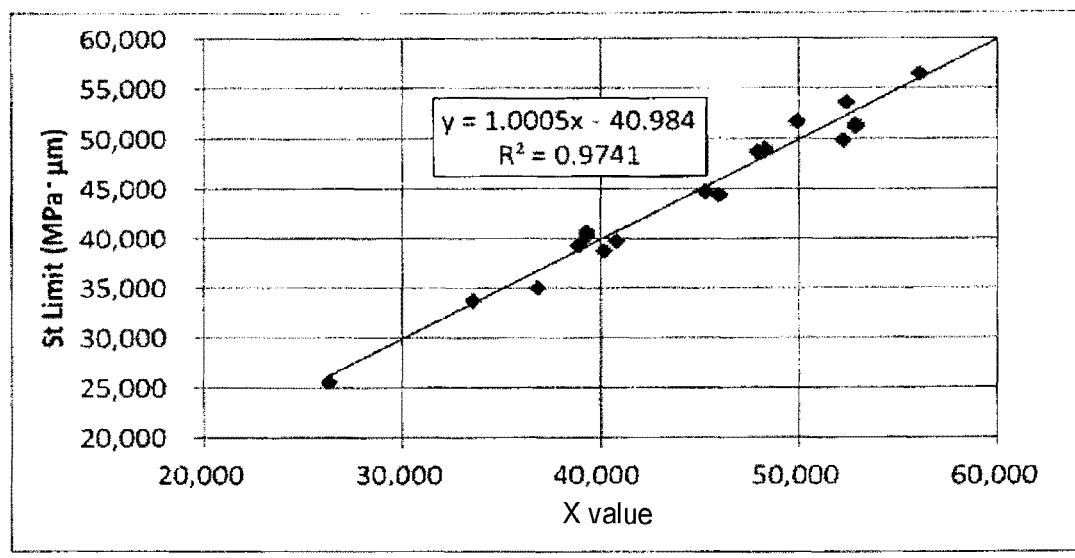
FIG. 18 is a graph plotting the relationship between St Limit and X value, of a chemically strengthened glass.
Figure 19:
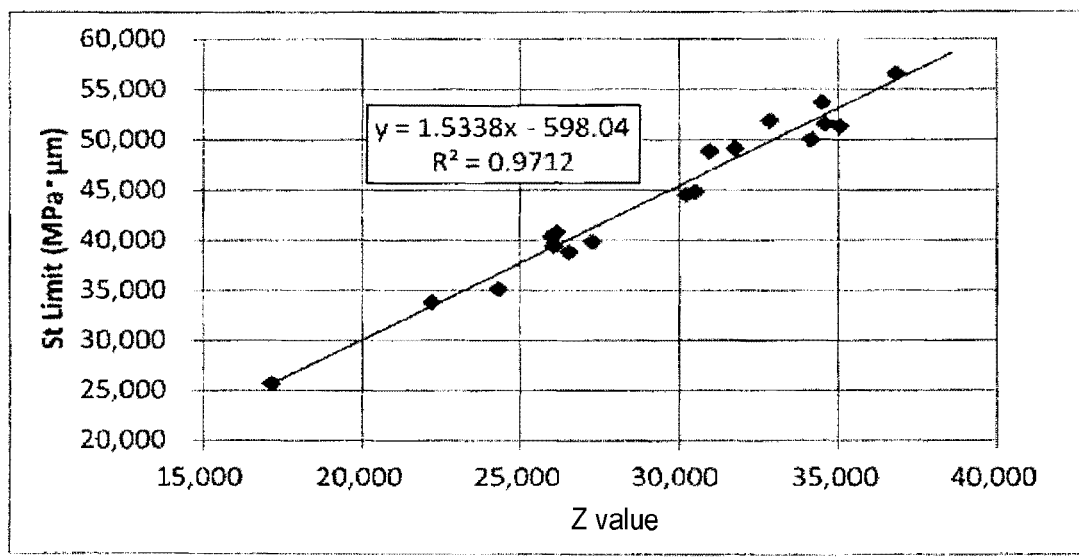
FIG. 19 is a graph plotting the relationship between St Limit and Z value, of a chemically strengthened glass.
Figure 20:
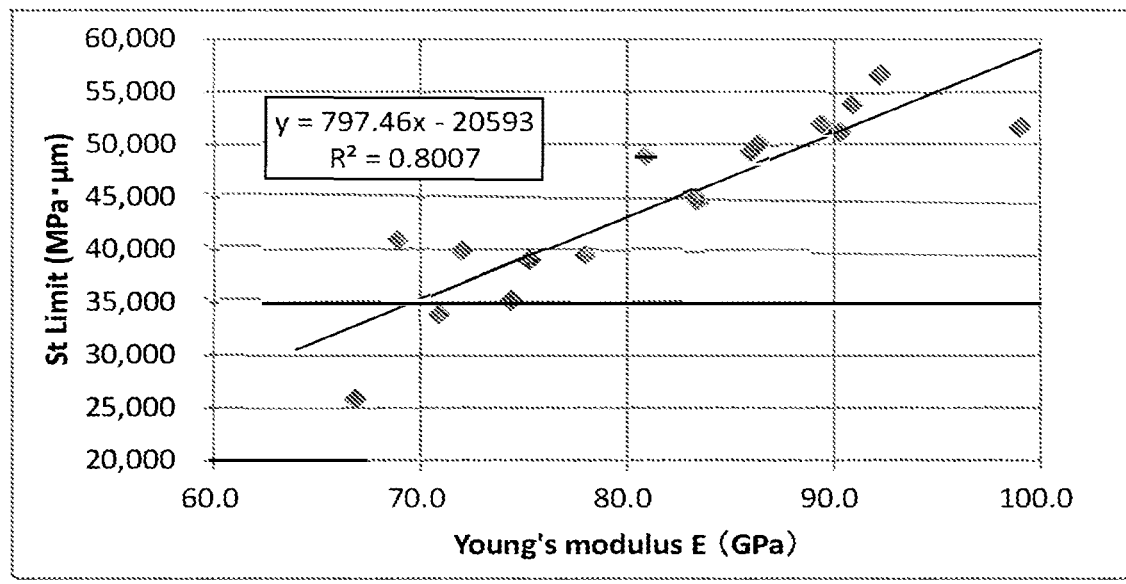
FIG. 20 is a graph plotting the relationship between St Limit and Young's modulus, of a chemically strengthened glass.
Figure 21:
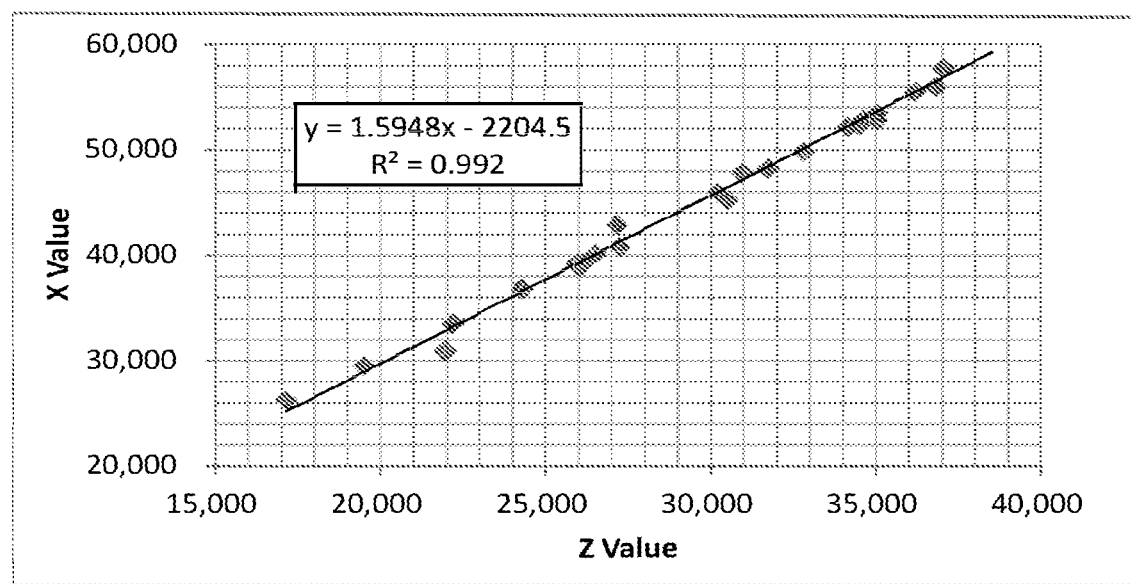
FIG. 21 is a graph plotting the relationship between X value and Z value, of a chemically strengthened glass.

Regarding the chemically strengthened glasses of Examples CT-1, CT-5, CT-7 to CT-12, CT-14 to CT-19, and CT-21 to CT-24, a graph plotting the relationship between St Limit when the thickness t was 1 mm and X value is shown in FIG. 18, a graph plotting the relationship between St Limit when the thickness t was 1 mm and Z value is shown in FIG. 19, a graph plotting the relationship between St Limit when the thickness t was 1 mm and Young's modulus is shown in FIG. 20, and a graph plotting the relationship between X value and Z value is shown in FIG. 21.

TABLE 14

| mol % | Ex. CT-1 | Ex. CT-2 | Ex. CT-3 | Ex. CT-4 | Ex. CT-5 | Ex. CT-6 | Ex. CT-7 |
|---|---|---|---|---|---|---|---|
| $SiO_2$ | 64 | 62 | 58 | 54 | 58 | 58 | 62 |
| $Al_2O_3$ | 12 | 12 | 12 | 12 | 15 | 14 | 12 |
| $B_2O_3$ |  | 2 |  |  |  | 2 | 4 |
| $P_2O_5$ |  |  |  |  |  |  |  |
| $Li_2O$ | 16 | 16 | 16 | 16 | 19 | 18 | 16 |
| $Na_2O$ |  |  |  |  |  |  |  |
| $K_2O$ |  |  |  |  |  |  |  |
| MgO | 6 | 6 | 6 | 8 | 6 | 6 | 4 |
| CaO |  |  | 6 | 8 |  |  |  |
| SrO |  |  |  |  |  |  |  |
| BaO |  |  |  |  |  |  |  |
| $ZrO_2$ | 2 | 2 | 2 | 2 | 2 | 2 | 2 |
| SUM | 100 | 100 | 100 | 100 | 100 | 100 | 100 |
| E | 90.3 | 89.0 | 95.7 | 96.9 | 92.2 | 90.8 | 86.4 |
| K1c | 0.92 | 0.91 | 0.93 |  | 0.93 | 0.92 | 0.88 |
| StA Limit | 33852 |  |  |  | 37356 |  | 32998 |
| StF Limit |  |  |  |  |  |  |  |
| St Limit | 51286 |  |  |  | 56594 |  | 49992 |
| X value | 52804 | 53400 | 57754 | 61206 | 55969 | 55510 | 52194 |
| Y value | 0.93 | 0.91 | 0.93 | 0.93 | 0.94 | 0.91 | 0.88 |
| Z value | 35044 | 35026 | 37036 | 38546 | 36808 | 36202 | 34162 |

| mol % | Ex. CT-8 | Ex. CT-9 | Ex. CT-10 | Ex. CT-11 | Ex. CT-12 | Ex. CT-13 |
|---|---|---|---|---|---|---|
| $SiO_2$ | 62 | 64 | 64 | 64.4 | 64.48 | 56.12 |
| $Al_2O_3$ | 12 | 12 | 12 | 6 | 14.38 | 17.18 |
| $B_2O_3$ |  |  |  |  | 5.06 |  |
| $P_2O_5$ | 4 |  |  |  |  | 6.84 |
| $Li_2O$ | 16 | 16 | 16 |  |  |  |
| $Na_2O$ |  |  |  | 12 | 13.7 | 16.77 |
| $K_2O$ |  |  |  | 4 | 0.01 | 0.30 |
| MgO | 4 |  |  | 11 | 2.31 | 2.66 |
| CaO |  | 6 |  | 0.1 | 0.04 |  |
| SrO |  |  | 6 | 0.1 |  |  |
| BaO |  |  |  |  |  |  |
| $ZrO_2$ | 2 | 2 | 2 | 2.5 |  |  |
| SUM | 100 | 100 | 100 | 100.1 | 99.98 | 99.88 |
| E | 83.4 | 90.9 | 89.4 | 78.0 | 68.9 | 64.0 |
| K1c |  |  |  | 0.76 | 0.71 | 0.69 |
| StA Limit | 29460 | 35501 | 34245 |  |  |  |
| StF Limit |  |  |  | 39443 | 40926 |  |
| St Limit | 44632 | 53785 | 51880 | 39443 | 40926 |  |
| X value | 45922 | 52348 | 49822 | 38838 | 39224 | 29493 |
| Y value | 0.89 | 0.92 | 0.91 | 0.76 | 0.72 | 0.69 |
| Z value | 30226 | 34498 | 32830 | 26010 | 26120 | 19516 |

TABLE 15

| mol % | Ex. CT-14 | Ex. CT-15 | Ex. CT-16 | Ex. CT-17 | Ex. CT-18 | Ex. CT-19 | Ex CT-20 | Ex CT-21 |
|---|---|---|---|---|---|---|---|---|
| $SiO_2$ | 68 | 68 | 68 | 68 | 68 | 68 | 68 | 60 |
| $Al_2O_3$ | 10 | 10 | 10 | 10 | 10 | 10 | 10 | 20 |
| $B_2O_3$ |  |  |  |  |  |  |  |  |
| $P_2O_5$ |  |  |  |  |  |  |  |  |
| $Li_2O$ |  |  |  |  |  |  |  |  |
| $Na_2O$ | 12 | 10 | 8 | 14 | 14 | 14 | 14 | 10 |
| $K_2O$ | 6 | 12 |  |  |  |  |  |  |
| MgO | 4 |  | 14 | 8 |  |  |  | 10 |
| CaO |  |  |  |  | 8 |  |  |  |
| SrO |  |  |  |  |  | 8 |  |  |
| BaO |  |  |  |  |  |  | 8 |  |
| $ZrO_2$ |  |  |  |  |  |  |  |  |
| SUM | 100 | 100 | 100 | 100 | 100 | 100 | 100 | 100 |
| E | 70.9 | 66.9 | 80.9 | 72.0 | 75.3 | 74.4 | 72.6 | 86.0 |
| K1c | 0.69 | 0.63 | 0.84 | 0.78 | 0.75 | 0.75 | 0.73 | 0.89 |

TABLE 15-continued

| | | | | | | | | |
|---|---|---|---|---|---|---|---|---|
| StA Limit | | | 30901 | 28014 | | | | 32109 |
| StF Limit | 33852 | 25829 | 48877 | 39917 | 38987 | 35159 | | 49249 |
| St Limit | 33852 | 25829 | 48877 | 39917 | 38987 | 35159 | | 49249 |
| X value | 33496 | 26255 | 47832 | 40737 | 40129 | 36761 | 30897 | 48235 |
| Y value | 0.70 | 0.62 | 0.85 | 0.77 | 0.75 | 0.75 | 0.73 | 0.85 |
| Z value | 22204 | 17154 | 30950 | 27255 | 26527 | 24303 | 21975 | 31742 |

| mol % | Ex. CT-22 | Ex. CT-23 | Ex. CT-24 | Ex. CT-25 | Ex. CT-26 | Ex. CT-27 |
|---|---|---|---|---|---|---|
| $SiO_2$ | 50 | 60 | 58 | 71.1 | 68.0 | 68.0 |
| $Al_2O_3$ | 30 | 20 | 18 | 1.1 | 10.0 | 10.0 |
| $B_2O_3$ | | | | | | |
| $P_2O_5$ | | | 4 | | | |
| $Li_2O$ | | 10 | 10 | | | |
| $Na_2O$ | 10 | 10 | 10 | 12.4 | 12.0 | 10.0 |
| $K_2O$ | | | | 0.2 | | |
| MgO | 10 | | | 6.9 | 10.0 | 12.0 |
| CaO | | | | 8.3 | | |
| SrO | | | | | | |
| BaO | | | | | | |
| $ZrO_2$ | | | | | | |
| SUM | 100 | 100 | 100 | 100.0 | 100.0 | 100.0 |
| E | 99.1 | 83.3 | | 71.9 | | |
| K1c | 0.87 | | | 0.75 | | |
| StA Limit | | | | | | |
| StF Limit | 51622 | 44950 | 40463 | | 43266 | |
| St Limit | 51622 | 44950 | 40463 | | 43266 | |
| X value | 52805 | 45205 | 39211 | 42834 | 34102 | 45467 |
| Y value | 0.88 | 0.82 | 0.78 | 0.75 | 0.80 | 0.82 |
| Z value | 34612 | 30522 | 25976 | 27172 | 28486 | 29718 |

It is understood from the results of Tables 14 to 15 and FIGS. 18 to 21 that X value and Z value correlate with St Limit at 1 mm in high precision, and are parameters showing breaking resistance in high precision when the chemically strengthened glass is fractured. Furthermore, it has been understood that St Limit increases as X value and Z value increase. As St Limit of the chemically strengthened glass increases, it indicates a more safe fracture such that the number of fragments is small, even if the chemically strengthened glass has been fractured. For example, when the chemically strengthened glass has X value and Z value of 30000 or more and 20000 or more, respectively, St Limit is larger than 30000 MPa. For example, even in the Example of a high strength chemically strengthened glass of 1 mm, having S or St of 30000 MPa or more as described above, it can say that a glass having higher safety in which the number of fragments when a glass is fractured is sufficiently small can be achieved.

Glasses were prepared as follows so as to have each glass composition in mole percentage on an oxide basis shown in Examples 2-1 to 2-53 in Tables 16 to 20. Glass raw materials generally used, such as an oxide, a hydroxide, a carbonate, and a nitrate, were appropriately selected, and weighed so as to be 1000 gas a glass. The mixed raw materials were placed in a platinum crucible, and placed in a resistance heating electric furnace of 1500 to 1700° C. to melt for about 3 hours, followed by defoaming and homogenizing. The molten glass obtained was poured into a mold material, maintained at a temperature of glass transition point+50° C. for 1 hour, and then cooled to room temperature in a rate of 0.5° C./min. Thus, a glass block was obtained. The glass block obtained was cut, grinded, polished, and then subjected to the following measurements.

Density was measured by a hydrostatic weighing method (JIS Z8807, Methods of measuring density and specific gravity of solid).

Linear expansion coefficient α and glass transition point Tg were measured according to the method of JIS R3102 (Testing method for average linear thermal expansion of glass).

Young's modulus E, shear modulus G and Poisson's ratio were measured by an ultrasonic pulse method (JIS R1602).

X value, Y value and Z value in Examples 2-1 to 2-53 are shown.

Similar to the above, the devitrification temperature T was estimated, and the temperature T4 at which a viscosity reaches $10^4$ dPa·s was measured.

Those results are shown in Tables 16 to 20.

Example described in Example 2-51 is the Example described in US 2015/0259244 A1.

Examples 2-1, 2-3 to 2-50 and 2-52 are examples that the X value is 30000 or more, and even when larger CS and DOL were introduced, a glass having higher safety such that the number of fragments when the glass was fractured is sufficiently small can be achieved. On the other hand, the X value in Example 2-2 and Example 2-51 is 30000 or less.

Examples 2-1, 2-3 to 2-50 and 2-52 are examples that the Z value is 20000 or more, and even when larger CS and DOL were introduced, a glass having higher safety such that the number of fragments when the glass was fractured is sufficiently small can be achieved. On the other hand, the Z value in Example 2-2 and Example 2-51 is 20000 or less.

TABLE 16

| (mol %) | Ex. 2-1 | Ex. 2-2 | Ex. 2-3 | Ex. 2-4 | Ex. 2-5 | Ex. 2-6 |
|---|---|---|---|---|---|---|
| $SiO_2$ | 68 | 68 | 68 | 68 | 68 | 68 |
| $Al_2O_3$ | 10 | 10 | 10 | 10 | 10 | 10 |
| $B_2O_3$ | 0 | | | | | |
| $P_2O_5$ | 0 | | | | | |
| $Li_2O$ | 0 | | | | | |
| $Na_2O$ | 12 | 10 | 8 | 14 | 14 | 14 |
| $K_2O$ | 6 | 12 | 0 | 0 | 0 | 0 |
| MgO | 4 | 0 | 14 | | | |
| CaO | 0 | | | 8 | | |
| SrO | 0 | | | | 8 | |
| BaO | 0 | | | | | 8 |
| ZnO | | | | | | |
| $TiO_2$ | | | | | | |
| $ZrO_2$ | 0 | | | | | |
| Sum | 100 | 100 | 100 | 100 | 100 | 100 |
| Density (g/cm³) | 2.44 | 2.45 | 2.45 | 2.48 | 2.61 | 2.73 |
| α50-350 ($10^7$/° C.) | | | 58.0 | | | |
| Tg (° C.) | | | 722 | | | |
| E (GPa) | 70.9 | 66.9 | 80.9 | 75.3 | 74.4 | 72.6 |
| G | 29.1 | 27.3 | 33.0 | 30.3 | 28.5 | 26.6 |
| Poisson's ratio | 0.22 | 0.23 | 0.22 | 0.22 | 0.22 | 0.22 |
| K1c | 0.69 | 0.63 | 0.84 | 0.75 | 0.75 | 0.73 |
| X value | 33496 | 26255 | 47832 | 40129 | 36761 | 30897 |
| Y value | 0.70 | 0.62 | 0.85 | 0.75 | 0.75 | 0.73 |
| Z value | 22204 | 17154 | 30950 | 26527 | 24303 | 21975 |
| T (° C.) | | | 1400 or higher | | | |
| T4 (° C.) | | | *1312 | | | |

| (mol %) | Ex. 2-7 | Ex. 2-8 | Ex. 2-9 | Ex. 2-10 | Ex. 2-11 | Ex. 2-12 |
|---|---|---|---|---|---|---|
| $SiO_2$ | 60 | 50 | 50 | 50 | 60 | 60 |
| $Al_2O_3$ | 20 | 30 | 25 | 30 | 20 | 20 |
| $B_2O_3$ | | | | | | |
| $P_2O_5$ | | | | | | |
| $Li_2O$ | | | | 10 | 10 | 10 |
| $Na_2O$ | 10 | 10 | 10 | | | 10 |
| $K_2O$ | 0 | | | | | 0 |
| MgO | 10 | 10 | 10 | 10 | 5 | 0 |
| CaO | | | | | | |
| SrO | | | | | | |
| BaO | | | | | | |
| ZnO | | | | | | |
| $TiO_2$ | | | | | | |
| $ZrO_2$ | | | 5 | | 5 | 0 |
| Sum | 100 | 100 | 100 | 100 | 100 | 100 |
| Density (g/cm³) | 2.50 | 2.58 | 2.72 | 2.58 | 2.60 | 2.44 |
| α50-350 ($10^7$/° C.) | 57.0 | | | | | |
| Tg (° C.) | 748 | | | | | |
| E (GPa) | 86.0 | 99.1 | 101.0 | 111.0 | 100.3 | 83.3 |
| G | 34.4 | 38.4 | 37.2 | 43.0 | 38.5 | 34.1 |
| Poisson's ratio | 0.23 | 0.22 | 0.21 | 0.23 | 0.23 | 0.22 |
| K1c | 0.89 | 0.87 | | 1.03 | | 0.84 |
| X value | 48235 | 52805 | 49134 | 61600 | 51139 | 45205 |
| Y value | 0.85 | 0.88 | 0.92 | 0.98 | 1.00 | 0.82 |
| Z value | 31742 | 34612 | 34542 | 39550 | 35930 | 30522 |
| T (° C.) | | | | | | |
| T4 (° C.) | | | | | | |

TABLE 17

| (mol %) | Ex. 2-13 | Ex. 2-14 | Ex. 2-15 | Ex. 2-16 | Ex. 2-17 | Ex. 2-18 |
|---|---|---|---|---|---|---|
| $SiO_2$ | 58 | 58 | 58 | 58 | 68 | 68 |
| $Al_2O_3$ | 18 | 18 | 18 | 20 | 10 | 10 |
| $B_2O_3$ | 4 | | | | | |
| $P_2O_5$ | | 4 | 4 | 2 | | |
| $Li_2O$ | 10 | 10 | | | | |
| $Na_2O$ | 10 | 10 | 10 | 8 | 8 | 8 |
| $K_2O$ | | | | 2 | 0 | 0 |
| MgO | | | 10 | 10 | 12 | 12 |
| CaO | | | | | | |
| SrO | | | | | | |
| BaO | | | | | 2 | |
| ZnO | | | | | | |
| $TiO_2$ | | | | | | |
| $ZrO_2$ | | | | | | 2 |
| Sum | 100 | 100 | 100 | 100 | 100 | 100 |
| Density (g/cm³) | | | | | 2.52 | 2.50 |
| α50-350 (10⁷/° C.) | | | | | | |
| Tg (° C.) | | | | | 79.6 | 82.3 |
| E (GPa) | | | | | 31.6 | 32.9 |
| G | | | | | | |
| Poisson's ratio | | | | | 0.22 | 0.22 |
| K1c | | 0.78 | | | | |
| X value | 45483 | 39211 | 42241 | 44858 | 45372 | 45476 |
| Y value | 0.76 | 0.78 | 0.81 | 0.83 | 0.84 | 0.87 |
| Z value | 29912 | 25976 | 27196 | 28894 | 29630 | 30650 |
| T (° C.) | | | | | | |
| T4 (° C.) | | | | | | |

| (mol %) | Ex. 2-19 | Ex. 2-20 | Ex. 2-21 | Ex. 2-22 | Ex. 2-23 | Ex. 2-24 |
|---|---|---|---|---|---|---|
| $SiO_2$ | 62 | 58 | 54 | 58 | 58 | 62 |
| $Al_2O_3$ | 12 | 12 | 12 | 15 | 14 | 12 |
| $B_2O_3$ | 2 | 0 | 0 | 0 | 2 | 4 |
| $P_2O_5$ | | | | | | |
| $Li_2O$ | 16 | 16 | 16 | 19 | 18 | 16 |
| $Na_2O$ | 0 | 0 | 0 | 0 | 0 | 0 |
| $K_2O$ | 0 | 0 | 0 | 0 | | 0 |
| MgO | 6 | 6 | 8 | 6 | 6 | 4 |
| CaO | 0 | 6 | 8 | 0 | 0 | 0 |
| SrO | 0 | 0 | 0 | 0 | 0 | 0 |
| BaO | 0 | 0 | 0 | 0 | 0 | 0 |
| ZnO | | | | | | |
| $TiO_2$ | | | | | | |
| $ZrO_2$ | 2 | 2 | 2 | 2 | 2 | 2 |
| Sum | 100 | 100 | 100 | 100 | 100 | 100 |
| Density (g/cm³) | 2.47 | 2.56 | 2.58 | 2.50 | 2.49 | 2.45 |
| α50-350 (10⁷/° C.) | | | | | | |
| Tg (° C.) | | | | | | |
| E (GPa) | 89.0 | 95.7 | 96.9 | 92.2 | 90.8 | 86.4 |
| G | 36.0 | 37.3 | 37.5 | 36.9 | 36.5 | 35.3 |
| Poisson's ratio | 0.23 | 0.24 | 0.24 | 0.23 | 0.23 | 0.23 |
| K1c | 0.91 | 0.93 | | 0.93 | 0.92 | 0.88 |
| X value | 53400 | 57754 | 61206 | 55969 | 55510 | 52194 |
| Y value | 0.91 | 0.93 | 0.93 | 0.94 | 0.91 | 0.88 |
| Z value | 35026 | 37036 | 38546 | 36808 | 36202 | 34162 |
| T (° C.) | | | | | | |
| T4 (° C.) | | | | | | |

TABLE 18

| (mol %) | Ex. 2-25 | Ex. 2-26 | Ex. 2-27 | Ex. 2-28 | Ex. 2-29 | Ex. 2-30 |
|---|---|---|---|---|---|---|
| $SiO_2$ | 62 | 64 | 64 | 64 | 70 | 70 |
| $Al_2O_3$ | 12 | 12 | 12 | 12 | 10 | 10 |

TABLE 18-continued

|  |  |  |  |  |  |  |
|---|---|---|---|---|---|---|
| B₂O₃ |  | 0 |  |  |  |  |
| P₂O₅ | 4 |  |  |  |  |  |
| Li₂O | 16 | 16 | 16 | 16 | 12 | 12 |
| Na₂O | 0 | 0 | 0 | 0 | 3 | 1 |
| K₂O | 0 | 0 | 0 | 0 |  |  |
| MgO | 4 | 0 | 0 | 0 | 4 | 6 |
| CaO | 0 | 6 | 0 | 0 |  |  |
| SrO | 0 | 0 | 6 | 0 |  |  |
| BaO | 0 | 0 | 0 | 6 |  |  |
| ZnO |  |  |  |  |  |  |
| TiO₂ |  |  |  |  |  |  |
| ZrO₂ | 2 | 2 | 2 | 2 | 1 | 1 |
| Sum | 100 | 100 | 100 | 100 | 100 | 100 |
| Density (g/cm³) | 2.44 | 2.52 | 2.61 | 2.70 | 2.42 | 2.42 |
| α50-350 (10⁷/° C.) |  |  |  |  |  |  |
| Tg (° C.) |  |  |  |  |  |  |
| E (GPa) | 83.4 | 90.9 | 89.4 | 87.4 | 87.3 | 86.5 |
| G | 34.2 | 36.1 | 34.3 | 32.3 | 36.1 | 35.7 |
| Poisson's ratio | 0.21 | 0.23 | 0.23 | 0.23 | 0.23 | 0.22 |
| K1c |  |  |  |  |  |  |
| X value | 45922 | 52348 | 49822 | 45424 | 47128 | 49493 |
| Y value | 0.89 | 0.92 | 0.91 | 0.90 | 0.88 | 0.91 |
| Z value | 30226 | 34498 | 32830 | 31084 | 31569 | 32800 |
| T (° C.) |  |  |  |  | 1250 or higher |  |
| T4 (° C.) |  |  |  |  | *1161 |  |

| (mol %) | Ex. 2-31 | Ex. 2-32 | Ex. 2-33 | Ex. 2-34 | Ex. 2-35 | Ex. 2-36 |
|---|---|---|---|---|---|---|
| SiO₂ | 70 | 70 | 70 | 70 | 70 | 70 |
| Al₂O₃ | 10 | 8 | 11 | 11 | 10 | 10 |
| B₂O₃ |  |  | 2 | 2 |  |  |
| P₂O₅ |  |  |  |  |  |  |
| Li₂O | 10 | 8 | 11 | 11 | 10 | 8 |
| Na₂O | 1 | 1 | 1 |  | 4 | 5 |
| K₂O |  |  |  |  | 1 | 2 |
| MgO | 8 | 12 | 4 | 5 | 4 | 4 |
| CaO |  |  |  |  |  |  |
| SrO |  |  |  |  |  |  |
| BaO |  |  |  |  |  |  |
| ZnO |  |  |  |  |  |  |
| TiO₂ |  |  |  |  |  |  |
| ZrO₂ | 1 | 1 | 1 | 1 | 1 | 1 |
| Sum | 100 | 100 | 100 | 100 | 100 | 100 |
| Density (g/cm³) | 2.43 | 2.45 | 2.40 | 2.40 | 2.43 | 2.43 |
| α50-350 (10⁷/° C.) |  |  |  |  |  |  |
| Tg (° C.) |  |  |  |  |  |  |
| E (GPa) | 87.3 | 88.3 | 83.7 | 83.9 | 83.5 | 81.7 |
| G | 35.9 | 36.1 | 34.9 | 35.0 | 34.4 | 33.6 |
| Poisson's ratio | 0.22 | 0.22 | 0.21 | 0.22 | 0.21 | 0.21 |
| K1c |  |  |  |  |  |  |
| X value | 50099 | 51593 | 48146 | 49329 | 44951 | 42773 |
| Y value | 0.91 | 0.92 | 0.88 | 0.90 | 0.86 | 0.84 |
| Z value | 33044 | 33560 | 31922 | 32538 | 30150 | 28731 |
| T (° C.) |  | 1300 or higher |  | 1300 or higher | 1140-1150 | 1091-1110 |
| T4 (° C.) |  | *1223 |  | *1225 | 1195 | 1219 |

TABLE 19

| (mol %) | Ex. 2-37 | Ex. 2-38 | Ex. 2-39 | Ex. 2-40 | Ex. 2-41 | Ex. 2-42 |
|---|---|---|---|---|---|---|
| SiO₂ | 70 | 70 | 70 | 70 | 70 | 70 |
| Al₂O₃ | 10 | 10 | 11 | 11 | 12 | 12 |
| B₂O₃ |  |  | 2 | 2 |  |  |
| P₂O₅ |  |  |  |  |  |  |
| Li₂O | 10 | 8 | 8 | 6 | 8 | 6 |

TABLE 19-continued

| | | | | | | |
|---|---|---|---|---|---|---|
| Na$_2$O | 2 | 3 | 2 | 3 | 3 | 4 |
| K$_2$O | 1 | 2 | 1 | 2 | 1 | 2 |
| MgO | 6 | 6 | 5 | 5 | 6 | 6 |
| CaO | | | | | | |
| SrO | | | | | | |
| BaO | | | | | | |
| ZnO | | | | | | |
| TiO$_2$ | | | | | | |
| ZrO$_2$ | 1 | 1 | 1 | 1 | | |
| Sum | 100 | 100 | 100 | 100 | 100 | 100 |
| Density (g/cm$^3$) | 2.43 | 2.43 | 2.41 | 2.41 | 2.40 | 2.41 |
| α50-350 (10$^7$/° C.) | | | | | | |
| Tg (° C.) | | | | | | |
| E (GPa) | 85.0 | 83.2 | 82.4 | 80.6 | 83.8 | 81.9 |
| G | 35.0 | 34.2 | 34.3 | 33.4 | 34.9 | 34.0 |
| Poisson's ratio | 0.22 | 0.21 | 0.22 | 0.21 | 0.22 | 0.21 |
| K1c | | | | | | |
| X value | 47316 | 45138 | 46272 | 44094 | 47030 | 44852 |
| Y value | 0.88 | 0.86 | 0.86 | 0.84 | 0.87 | 0.85 |
| Z value | 31381 | 29963 | 30625 | 29207 | 30888 | 29469 |
| T (° C.) | 1230-1238 | | | | | |
| T4 (° C.) | *1210 | | | | | |

| (mol %) | Ex. 2-43 | Ex. 2-44 | Ex. 2-45 | Ex. 2-46 | Ex. 2-47 | Ex. 2-48 |
|---|---|---|---|---|---|---|
| SiO$_2$ | 70 | 70 | 67 | 65 | 70 | 66 |
| Al$_2$O$_3$ | 12 | 12 | 16 | 18 | 10 | 14 |
| B$_2$O$_3$ | 2 | 2 | | | | |
| P$_2$O$_5$ | | | | | | |
| Li$_2$O | 7 | 6 | 9 | 10 | 10 | 8 |
| Na$_2$O | 3 | 3 | 4 | 4 | 3 | 5 |
| K$_2$O | 1 | 1 | 3 | 2 | 1 | 2 |
| MgO | 4 | 4 | | | 5 | 4 |
| CaO | | | | | | |
| SrO | | | | | | |
| BaO | | | | | | |
| ZnO | | | | | | |
| TiO$_2$ | | | | | | |
| ZrO$_2$ | 1 | 2 | 1 | 1 | 1 | 1 |
| Sum | 100 | 100 | 100 | 100 | 100 | 100 |
| Density (g/cm$^3$) | 2.40 | 2.43 | 2.42 | 2.44 | 2.42 | 2.45 |
| α50-350 (10$^7$/° C.) | | | | | | |
| Tg (° C.) | | | | | | |
| E (GPa) | 81.7 | 82.6 | 81.3 | 83.7 | 84.2 | 83.6 |
| G | 34.0 | 34.0 | 33.6 | 34.4 | 34.7 | 34.2 |
| Poisson's ratio | 0.22 | 0.22 | 0.21 | 0.22 | 0.21 | 0.22 |
| K1c | | | | | | |
| X value | 44948 | 44073 | 42091 | 44303 | 46133 | 44601 |
| Y value | 0.86 | 0.87 | 0.84 | 0.86 | 0.87 | 0.85 |
| Z value | 29996 | 29968 | 28631 | 30130 | 30766 | 29879 |
| T (° C.) | | | | | 1194-1200 | |
| T4 (° C.) | | | | | 1211 | |

TABLE 20

| (mol %) | Ex. 2-49 | Ex. 2-50 | Ex. 2-51 | Ex. 2-52 | Ex. 2-53 |
|---|---|---|---|---|---|
| SiO$_2$ | 65 | 60 | 57.43 | 69 | 70 |
| Al$_2$O$_3$ | 14 | 10 | 16.1 | 9 | 7.5 |
| B$_2$O$_3$ | | | | | |
| P$_2$O$_5$ | | | 6.54 | | |
| Li$_2$O | 8 | 8 | | 9.5 | 8 |
| Na$_2$O | 6 | 4 | 17.05 | 4.5 | 5.3 |
| K$_2$O | 2 | 2 | | 1 | 1 |

TABLE 20-continued

| (mol %) | Ex. 2-49 | Ex. 2-50 | Ex. 2-51 | Ex. 2-52 | Ex. 2-53 |
|---|---|---|---|---|---|
| MgO | 4 | 8 | 2.81 | 6 | 7 |
| CaO |  | 8 |  |  | 0.2 |
| SrO |  |  |  |  |  |
| BaO |  |  |  |  |  |
| ZnO |  |  |  |  |  |
| TiO$_2$ |  |  |  | 0.04 | 0.04 |
| ZrO$_2$ | 1 |  |  | 1 | 1 |
| Sum | 100 | 100 | 99.9 | 100.0 | 100.0 |
| Density (g/cm$^3$) | 2.46 | 2.53 |  | 2.44 | 2.44 |
| α50-350 (10$^7$/° C.) |  |  |  | 70 | 72 |
| Tg (° C.) |  |  |  | 552 | 548 |
| E (GPa) | 83.6 | 88.5 |  | 84 | 82.6 |
| G | 34.0 | 34.9 |  |  | 33.8 |
| Poisson's ratio | 0.22 | 0.23 |  | 0.22 | 0.22 |
| K1c |  |  |  |  |  |
| X value | 44320 | 53536 | 29661 | 45856 |  |
| Y value | 0.84 | 0.83 | 0.69 | 0.85 |  |
| Z value | 29686 | 32999 | 19711 | 30462 |  |
| T (° C.) | 1250 or higher | 1120-1133 |  | 1116-1130 | 1090-1100 |
| T4 (° C.) | 1227 | 1027 |  | 1163 | 1159 |

<Relationship Among Glass Sheet Thickness, St, CT, and the Number of Fragments of Glass>

To evaluate the relationship between the glass sheet thickness and breaking resistance of the chemically strengthened glass, chemically strengthened glasses having various St values and CT values were prepared with various compositions under various chemical strengthening conditions, and the relationship among the sheet thickness when fractured, the number of fragments, St value, and CT value was investigated. Specifically, glasses having a size of 25 mm×25 mm×thickness t (mm) were subjected to the chemical strengthening treatment under various chemical strengthening conditions such that internal tensile stress area (St, unit: MPa·μm) or internal tensile stress CT (unit: MPa) changes, and chemically strengthened glasses having various internal tensile stress area (St, unit: MPa·μm) or internal tensile stress CT (unit: MPa) were prepared. By using a diamond indenter having an indenter angle 60° of a facing angle, those chemically strengthened glasses were fractured by an indentation fracture test in which a load of 3 kgf is maintained for 15 seconds, and the number of pieces (the number of fragments) after being fractured was counted, respectively. The internal tensile stress area (St, unit: MPa·μm) when the number of fragments was 10 was defined as St Limit value, and the internal tensile stress CT (unit: MPa) when the number of fragments was 10 was defined as CT Limit value. In the case where the number of fragments crosses over 10, St Limit value was defined by the following formula by using Stn value that is St value of the maximum number n of fragments becoming less than 10 and Stm value that is St value of the minimum number m of fragments becoming more than 10.

$$St \text{ Limit value} = Stn + (10-n) \times (Stm - Stn)/(m-n)$$

In the case where the number of fragments crosses over 10, CT Limit value was defined by the following formula by using CTn value that is CT value of the maximum number n of fragments becoming less than 10 and CTm value that is CT value of the minimum number m of fragments becoming more than 10.

$$CT \text{ Limit value} = CTn + (10-n) \times (CTm - CTn)/(m-n)$$

The St value and CT value are defined as follows by using values $St_F$ and $CT_F$ measured by a surface stress meter FSM-6000 manufactured by Orihara Manufacturing Co., Ltd. and analyzed by an attachment program Fsm V or the values $St_A$ and $CT_A$ obtained by measuring using a birefringence imaging system Abrio-IM and a thinned sample.

$$St = St_F = 1.515 \times St_A$$

$$CT = CT_F = 1.28 \times CT_A$$

Here, $CT_F$ is a value equal to a value CT_CV analyzed by Fsm V.

The chemically strengthened glasses of Examples CT-5, CT-16, CT-17, and CT-26 and St Limit and CT Limit values relating to the sheet thicknesses thereof are shown in Tables 21 and 22. Furthermore, graphs plotting St Limit and CT Limit of the chemically strengthened glasses of Examples CT-5, CT-16, CT-17, and CT-26 to the each sheet thickness t (mm) are shown in FIGS. 22 and 23.

Figure 22:
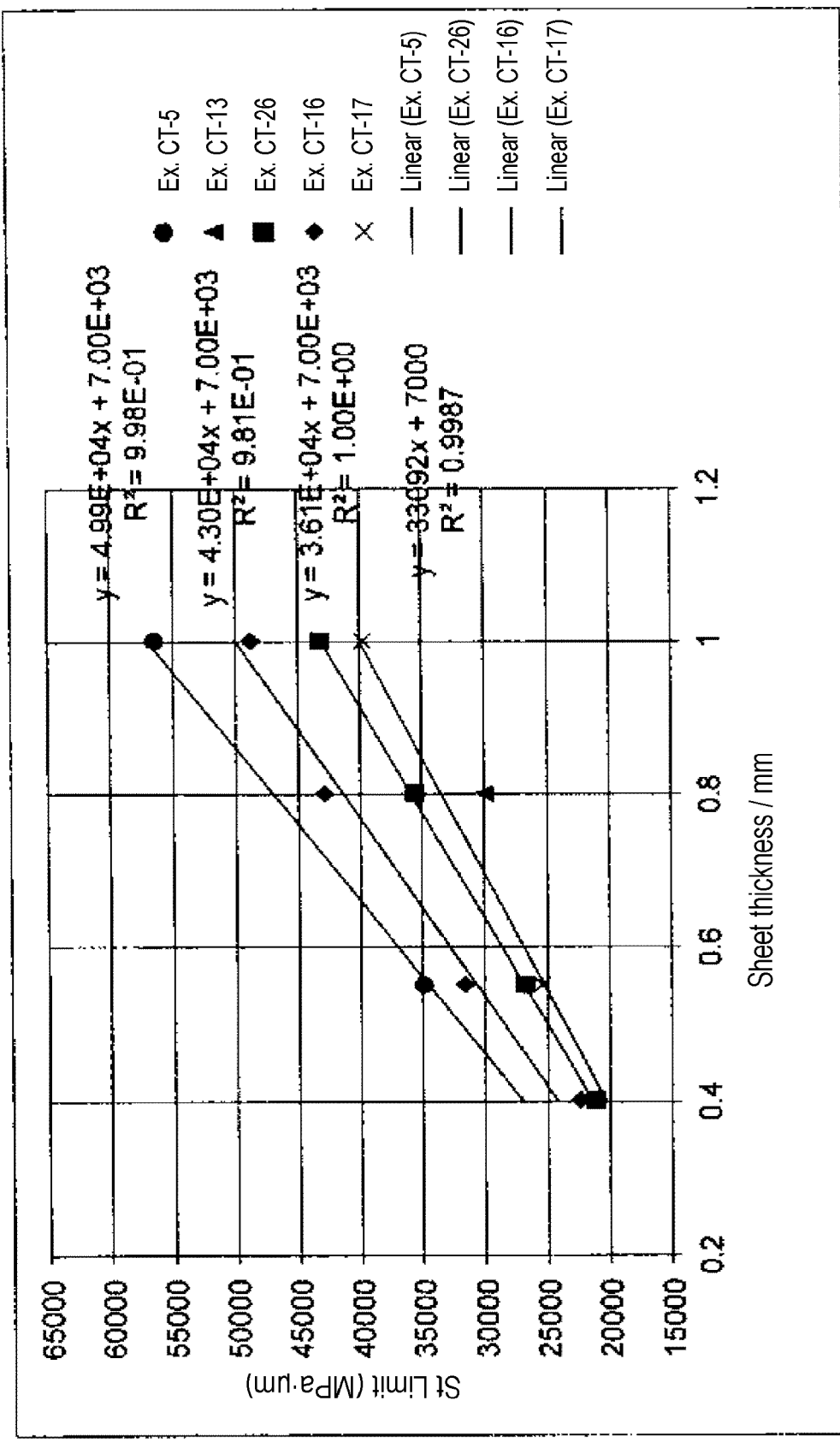
FIG. 22 is a graph plotting St Limit to a sheet thickness t, of a chemically strengthened glass.
Figure 23:
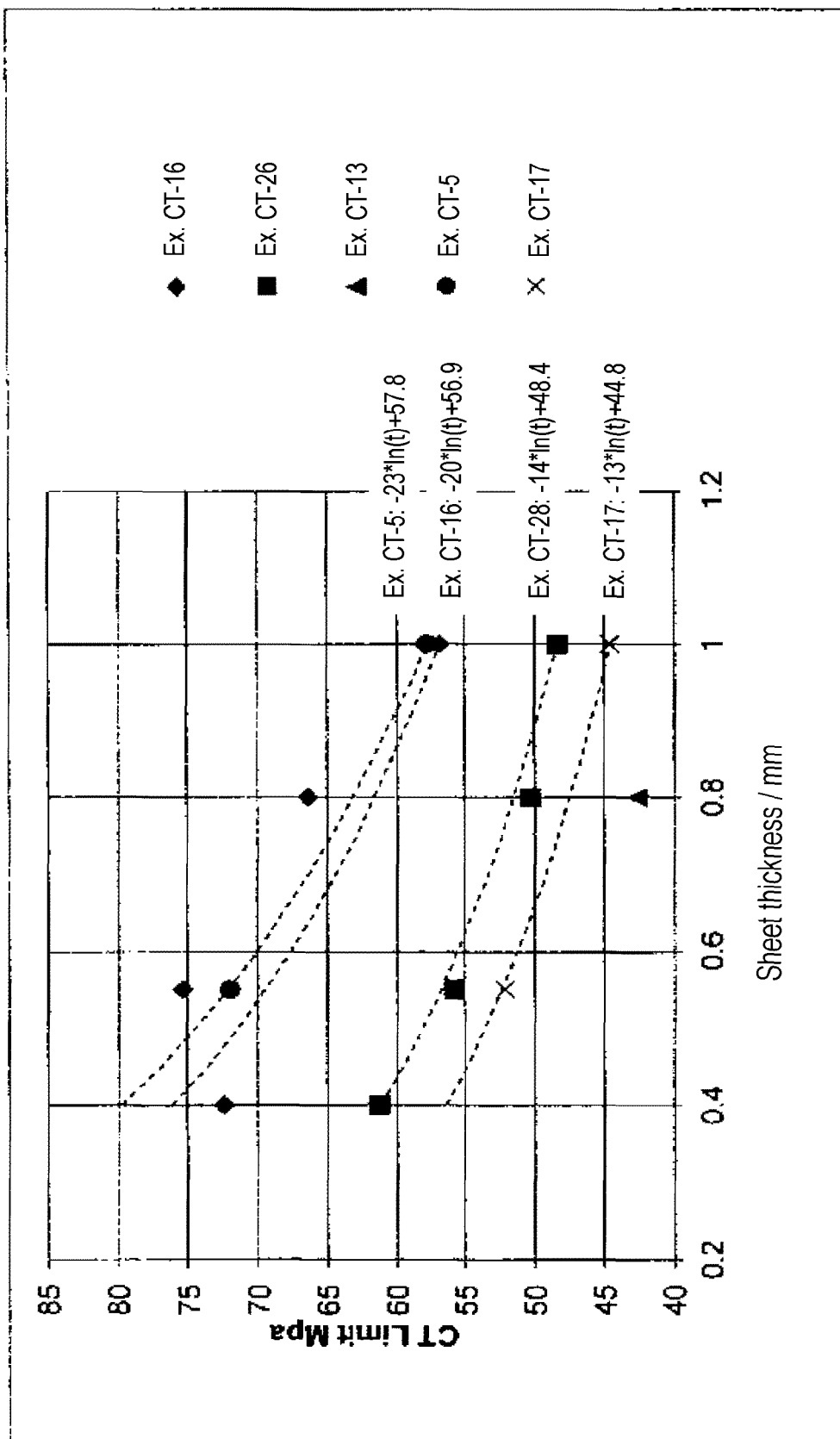
FIG. 23 is a graph plotting CT Limit to a sheet thickness t, of a chemically strengthened glass.

It is understood from Table 21 and FIG. 22 that St Limit tends to linearly increase to the sheet thickness and is approximately represented by the following formula.

$$St(a,t) = a \times t + 7000 \text{(unit:MPa·μm)}$$

It is understood that the constant a in the above formula changes depending on the chemically strengthened glass. St Limit are large in each sheet thickness as the value a increases, and even though larger CS and DOL are introduced, the chemically strengthened glass can be used as one generating less number of fragments.

It is understood from Table 22 and FIG. 23 that CT Limit tends to decrease with increasing a sheet thickness, and is approximately represented by the following formula.

$$CT(b,c,t) = -b \times \ln(t) + c \text{(unit:MPa)}$$

It is understood that the constants b and c in the above formula change depending on the chemically strengthened glass and b tends to monotonically increase to c. From FIG. 23, CT Limit is large in each sheet thickness as the values b and c increase, and even though larger CS and DOL are introduced, the chemically strengthened glass can be used as one generating less number of fragments.

TABLE 21

| Sheet Thickness (mm) | Ex. CT-13 | Ex. CT-17 | Ex. CT-16 | Ex. CT-26 | Ex. CT-5 |
|---|---|---|---|---|---|
| 0.4 | | | | 22476 | 21252 |
| 0.55 | | 25519 | 31734 | 26847 | 35000 |
| 0.8 | 30107 | | 43007 | 35680 | |
| 1 | | 39917 | 48877 | 43266 | 56594 |
| a | | 33092 | 43000 | 36100 | 49900 |

TABLE 22

| Sheet Thickness (mm) | Ex. CT-13 | Ex. CT-17 | Ex. CT-16 | Ex. CT-26 | Ex. CT-5 |
|---|---|---|---|---|---|
| 0.4 | | | | 72.4 | 61.3 |
| 0.55 | | 52.2 | 75.4 | 55.8 | 72 |
| 0.8 | 42.6 | | 66.4 | 50.3 | |
| 1 | | 44.6 | 56.9 | 48.4 | 57.8 |
| b | | | 13 | 21 | 14 | 23 |
| c | | | 44.6 | 56.9 | 48.4 | 57.8 |

While the present invention has been described in detail and with reference to specific embodiments thereof, it will be apparent to one skilled in the art that various changes and modifications can be made therein without departing from the spirit and scope of the present invention.

The present application is based on a Japanese patent application (Application No. 2016-010002) filed on Jan. 21, 2016 and a Japanese patent application (Application No. 2016-204745) filed on Oct. 18, 2016, the whole thereof being incorporated herein by reference.

DESCRIPTION OF REFERENCE NUMERALS AND SIGNS

1 Measurement sample
11 Mock plate
12 Sponge double-sided tape
13 Glass
21 SUS plate
22 Silica sand

The invention claimed is:

1. A glass for chemical strengthening, comprising, in mole percentage on an oxide basis, 54 to 62% of $SiO_2$, 16 to 20% of $Al_2O_3$, 0.5 to 5% of $B_2O_3$, 0 to 4% of $P_2O_5$, 5 to 13% of $Li_2O$, 7 to 14% of $Na_2O$, 0 to 2% of $K_2O$, 0 to 10% of MgO, 0 to 1% of CaO, 0 to 1% of SrO, 0 to 1% of BaO, 0 to 5% of ZnO, 0 to 1% of $TiO_2$, and 0 to 4% of $ZrO_2$,
wherein a value of X is at least 40,000, the value of X being calculated based on the following formula by using contents in mole percentage on an oxide basis of components of $SiO_2$, $Al_2O_3$, $B_2O_3$, $P_2O_5$, $Li_2O$, $Na_2O$, $K_2O$, MgO, CaO, SrO, BaO, and $ZrO_2$:

$X = SiO_2 \times 329 + Al_2O_3 \times 786 + B_2O_3 \times 627 + P_2O_5 \times (-941) + Li_2O \times 927 + Na_2O \times 47.5 + K_2O \times (-371) + MgO \times 1230 + CaO \times 1154 + SrO \times 733 + ZrO_2 \times 51.8.$ 2. The glass for chemical strengthening according to claim 1, wherein a value of Y is at least 0.7, the value of Y being calculated based on the following formula by using contents in mole percentage on an oxide basis of components of $SiO_2$, $Al_2O_3$, $B_2O_3$, $P_2O_5$, $Li_2O$, $Na_2O$, $K_2O$, MgO, CaO, SrO, BaO, and $ZrO_2$:

$Y = SiO_2 \times 0.00884 + Al_2O_3 \times 0.0120 + B_2O_3 \times (-0.00373) + P_2O_5 \times 0.000681 + Li_2O \times 0.00735 + Na_2O \times (-0.00234) + K_2O \times (-0.00608) + MgO \times 0.0105 + CaO \times 0.00789 + SrO \times 0.00752 + BaO \times 0.00472 + ZrO_2 \times 0.0202.$ 3. The glass for chemical strengthening according to claim 1, wherein a devitrification temperature T is equal to or lower than a temperature T4 at which a viscosity reaches $10^4$ dPa·s.

4. The glass for chemical strengthening according to claim 1, having a fracture toughness value of at least 0.7 MPa·m$^{1/2}$.

5. The glass for chemical strengthening according to claim 1, having a Young's modulus of at least 74 GPa.

6. A chemically strengthened glass, having a surface compressive stress (CS) of at least 450 MPa,
wherein
the chemically strengthened glass has a matrix composition comprising, in mole percentage on an oxide basis, 54 to 62% of $SiO_2$, 16 to 20% of $Al_2O_3$, 0.5 to 5% of $B_2O_3$, 0 to 4% of $P_2O_5$, 5 to 13% of $Li_2O$, 7 to 14% of $Na_2O$, 0 to 2% of $K_2O$, 0 to 10% of MgO, 0 to 1% of CaO, 0 to 1% of SrO, 0 to 1% of BaO, 0 to 5% of ZnO, 0 to 1% of $TiO_2$, and 0 to 4% of $ZrO_2$; and
a value of X is at least 40,000, the value of X being calculated based on the following formula by using contents in mole percentage on an oxide basis of components of $SiO_2$, $Al_2O_3$, $B_2O_3$, $P_2O_5$, $Li_2O$, $Na_2O$, $K_2O$, MgO, CaO, SrO, BaO, and $ZrO_2$ in the matrix composition of the chemically strengthened glass:

$X = SiO_2 \times 329 + Al_2O_3 \times 786 + B_2O_3 \times 627 + P_2O_5 \times (-941) + Li_2O \times 927 + Na_2O \times 47.5 + K_2O \times (-371) + MgO \times 1230 + CaO \times 1154 + SrO \times 733 + ZrO_2 \times 51.8.$ 7. The chemically strengthened glass according to claim 6, having a value of $\Delta CS_{DOL-20}$, in MPa/μm, of at least 0.4, the value of $\Delta CS_{DOL-20}$ being calculated by the following formula by using a compressive stress value $CS_{DOL-20}$ at a depth of 20 μm glass surface side from a depth (DOL) from a glass surface of a portion at which stress is zero in a stress profile of the chemically strengthened glass:

$\Delta CS_{DOL-20} = CS_{DOL-20}/20.$

8. The chemically strengthened glass according to claim 6, wherein the value of $\Delta CS_{DOL-20}$, in MPa/μm, is 4.0 or less.

9. The chemically strengthened glass according to claim 6, wherein a compressive stress value ($CS_{100}$) in a portion at a depth of 100 μm from the glass surface is at least 15 MPa.

10. The chemically strengthened glass according to claim 9, wherein a product ($CS_{100} \times t^2$) of the $CS_{100}$ and a square of a sheet thickness t in mm, is 120 MPa·mm$^2$ or less.

11. The chemically strengthened glass according to claim 6, having a sheet shape with a sheet thickness t of 2 mm or less.

* * * * *